US008743082B2

(12) United States Patent
Ganapathi et al.

(10) Patent No.: US 8,743,082 B2
(45) Date of Patent: Jun. 3, 2014

(54) CONTROLLER ARCHITECTURE FOR COMBINATION TOUCH, HANDWRITING AND FINGERPRINT SENSOR

(75) Inventors: Srinivasan Kodaganallur Ganapathi, Palo Alto, CA (US); Nicholas Ian Buchan, San Jose, CA (US); David William Burns, San Jose, CA (US); Thad William Smith, Antioch, CA (US); Ion Elinor Opris, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 213 days.

(21) Appl. No.: 13/271,039

(22) Filed: Oct. 11, 2011

(65) Prior Publication Data

US 2012/0092293 A1    Apr. 19, 2012

Related U.S. Application Data

(60) Provisional application No. 61/394,054, filed on Oct. 18, 2010.

(51) Int. Cl.
    *G06F 3/045* (2006.01)
(52) U.S. Cl.
    USPC .......................... 345/174; 345/173; 178/18.01
(58) Field of Classification Search
    USPC ..................... 345/173–179; 178/18.01–18.09
    See application file for complete search history.

(56) References Cited

U.S. PATENT DOCUMENTS

| 4,066,853 A | 1/1978 | Zenk |
| 4,293,734 A | 10/1981 | Pepper, Jr. |
| 4,570,149 A | 2/1986 | Thornburg et al. |
| 4,733,222 A | 3/1988 | Evans |
| 4,734,034 A | 3/1988 | Maness et al. |

(Continued)

FOREIGN PATENT DOCUMENTS

| EP | 2352169 A1 | 8/2011 |
| EP | 2369456 A2 | 9/2011 |

(Continued)

OTHER PUBLICATIONS

International Preliminary Report on Patentability—PCT/US2011/030558, The International Bureau of WIPO—Geneva, Switzerland, Jul. 26, 2012.

(Continued)

*Primary Examiner* — Premal Patel
(74) *Attorney, Agent, or Firm* — Weaver Austin Villeneuve & Sampson, LLP

(57) ABSTRACT

A separate control system may be configured for a combined sensor device. Alternatively, at least part of the control system may be included in another device, such as a processor of a mobile device. Software for handwriting, touch and fingerprint detection may be included in the control system. Low, medium and high resolution may be obtained with a single combined sensor device by scanning a subset of the sensels, or by aggregating lines or columns. Power consumption may be reduced by aggregating sensor pixels (or rows or columns) electrically using the controller, so that they perform as a low power small array until higher resolution with a larger array is needed. Power consumption may be reduced by turning off portions or all of the sensor device, turning off parts of the control system, and/or employing first-level screening at a reduced frame rate.

26 Claims, 35 Drawing Sheets

(56) References Cited

U.S. PATENT DOCUMENTS

| | | |
|---|---|---|
| 4,856,993 A | 8/1989 | Maness et al. |
| 4,963,702 A | 10/1990 | Yaniger et al. |
| 5,033,291 A | 7/1991 | Podoloff et al. |
| 5,053,585 A | 10/1991 | Yaniger |
| 5,060,527 A | 10/1991 | Burgess |
| 5,241,308 A | 8/1993 | Young |
| 5,296,837 A | 3/1994 | Yaniger |
| 5,302,936 A | 4/1994 | Yaniger |
| 5,400,160 A | 3/1995 | Takahashi et al. |
| 5,420,936 A | 5/1995 | Fitzpatrick et al. |
| 5,429,006 A | 7/1995 | Tamori |
| 5,505,072 A | 4/1996 | Oreper |
| 5,510,783 A | 4/1996 | Findlater et al. |
| 5,541,570 A | 7/1996 | McDowell |
| 5,756,904 A | 5/1998 | Oreper et al. |
| 5,796,858 A | 8/1998 | Zhou et al. |
| 5,905,209 A | 5/1999 | Oreper |
| 5,940,526 A | 8/1999 | Setlak et al. |
| 5,943,044 A | 8/1999 | Martinelli et al. |
| 5,963,679 A | 10/1999 | Setlak |
| 5,982,894 A | 11/1999 | McCalley et al. |
| 5,989,700 A | 11/1999 | Krivopal |
| 6,021,211 A | 2/2000 | Setlak et al. |
| 6,032,542 A | 3/2000 | Warnick et al. |
| 6,035,398 A | 3/2000 | Bjorn |
| 6,047,281 A | 4/2000 | Wilson et al. |
| 6,047,282 A | 4/2000 | Wilson et al. |
| 6,067,368 A | 5/2000 | Setlak et al. |
| 6,069,970 A | 5/2000 | Salatino et al. |
| 6,070,159 A | 5/2000 | Wilson et al. |
| 6,088,471 A | 7/2000 | Setlak et al. |
| 6,088,585 A | 7/2000 | Schmitt et al. |
| 6,097,035 A | 8/2000 | Belongie et al. |
| 6,098,330 A | 8/2000 | Schmitt et al. |
| 6,114,862 A | 9/2000 | Tartagni et al. |
| 6,122,737 A | 9/2000 | Bjorn et al. |
| 6,125,192 A | 9/2000 | Bjorn et al. |
| 6,181,807 B1 | 1/2001 | Setlak et al. |
| 6,211,860 B1 | 4/2001 | Bunsen |
| 6,239,790 B1 | 5/2001 | Martinelli et al. |
| 6,259,804 B1 | 7/2001 | Setlak et al. |
| 6,272,936 B1 | 8/2001 | Oreper et al. |
| 6,291,568 B1 | 9/2001 | Lussey |
| 6,305,073 B1 | 10/2001 | Badders, Jr. |
| 6,320,394 B1 | 11/2001 | Tartagni |
| 6,346,739 B1 | 2/2002 | Lepert et al. |
| 6,360,004 B1 | 3/2002 | Akizuki |
| 6,400,836 B2 | 6/2002 | Senior |
| 6,408,087 B1 | 6/2002 | Kramer |
| 6,437,583 B1 | 8/2002 | Tartagni et al. |
| 6,440,814 B1 | 8/2002 | Lepert et al. |
| 6,483,931 B2 | 11/2002 | Kalnitsky et al. |
| 6,495,069 B1 | 12/2002 | Lussey et al. |
| 6,496,021 B2 | 12/2002 | Tartagni et al. |
| 6,501,284 B1 | 12/2002 | Gozzini |
| 6,512,381 B2 | 1/2003 | Kramer |
| 6,555,024 B2 | 4/2003 | Ueda et al. |
| 6,578,436 B1 | 6/2003 | Ganapathi et al. |
| 6,628,812 B1 | 9/2003 | Setlak et al. |
| 6,643,389 B1 | 11/2003 | Raynal et al. |
| 6,646,540 B1 | 11/2003 | Lussey |
| 6,647,133 B1 | 11/2003 | Morita et al. |
| 6,667,439 B2 | 12/2003 | Salatino et al. |
| 6,672,174 B2 | 1/2004 | Deconde et al. |
| 6,683,971 B1 | 1/2004 | Salatino et al. |
| 6,694,822 B1 | 2/2004 | Ganapathi et al. |
| 6,731,120 B2 | 5/2004 | Tartagni |
| 6,737,329 B2 | 5/2004 | Lepert et al. |
| 6,741,729 B2 | 5/2004 | Bjorn et al. |
| 6,795,569 B1 | 9/2004 | Setlak |
| 6,799,275 B1 | 9/2004 | Bjorn |
| 6,819,784 B1 | 11/2004 | Sabatini et al. |
| 6,829,950 B2 | 12/2004 | Ganapathi et al. |
| 6,889,555 B1 | 5/2005 | Ganapathi |
| 6,889,565 B2 | 5/2005 | DeConde et al. |
| 6,927,581 B2 | 8/2005 | Gozzini |
| 6,941,001 B1 | 9/2005 | Bolle et al. |
| 6,950,539 B2 | 9/2005 | Bjorn et al. |
| 6,950,541 B1 | 9/2005 | Setlak et al. |
| 6,964,205 B2 | 11/2005 | Papakostas et al. |
| 6,970,584 B2 | 11/2005 | O'Gorman et al. |
| 6,987,871 B2 | 1/2006 | Kalnitsky et al. |
| 6,998,855 B2 | 2/2006 | Tartagni |
| 7,030,860 B1 | 4/2006 | Hsu et al. |
| 7,049,166 B2 | 5/2006 | Salatino et al. |
| 7,050,045 B2 | 5/2006 | Baker et al. |
| 7,059,201 B2 | 6/2006 | Prakash et al. |
| 7,068,142 B2 | 6/2006 | Watanabe et al. |
| 7,073,397 B2 | 7/2006 | Ganapathi |
| 7,076,089 B2 | 7/2006 | Brandt et al. |
| 7,077,010 B2 | 7/2006 | Ganapathi |
| 7,081,888 B2 | 7/2006 | Cok et al. |
| 7,084,642 B2 | 8/2006 | Gozzini |
| 7,088,114 B2 | 8/2006 | Gozzini |
| 7,099,496 B2 | 8/2006 | Benkley, III |
| 7,113,179 B2 | 9/2006 | Baker et al. |
| 7,116,209 B2 | 10/2006 | Hermann et al. |
| 7,145,432 B2 | 12/2006 | Lussey et al. |
| 7,146,024 B2 | 12/2006 | Benkley, III |
| 7,197,168 B2 | 3/2007 | Russo |
| 7,213,323 B2 | 5/2007 | Baker et al. |
| 7,214,953 B2 | 5/2007 | Setlak et al. |
| 7,231,070 B2 | 6/2007 | Bjorn et al. |
| 7,239,227 B1 | 7/2007 | Gupta et al. |
| 7,256,589 B2 | 8/2007 | Andrade |
| 7,256,768 B2 | 8/2007 | Bathiche |
| 7,258,026 B2 | 8/2007 | Papakostas et al. |
| 7,259,573 B2 | 8/2007 | Andrade |
| 7,274,413 B1 | 9/2007 | Sullivan et al. |
| 7,280,101 B2 | 10/2007 | Miyamoto |
| 7,280,677 B2 | 10/2007 | Chandler et al. |
| 7,280,679 B2 | 10/2007 | Russo |
| 7,290,323 B2 | 11/2007 | Deconde et al. |
| 7,301,435 B2 | 11/2007 | Lussey et al. |
| 7,316,167 B2 | 1/2008 | DeConde et al. |
| 7,321,701 B2 | 1/2008 | Setlak et al. |
| 7,348,966 B2 | 3/2008 | Hong et al. |
| 7,351,974 B2 | 4/2008 | Setlak |
| 7,358,514 B2 | 4/2008 | Setlak et al. |
| 7,358,515 B2 | 4/2008 | Setlak et al. |
| 7,361,919 B2 | 4/2008 | Setlak |
| 7,373,843 B2 | 5/2008 | Ganapathi et al. |
| 7,409,543 B1 | 8/2008 | Bjorn |
| 7,409,876 B2 | 8/2008 | Ganapathi et al. |
| 7,418,117 B2 | 8/2008 | Kim et al. |
| 7,424,136 B2 | 9/2008 | Setlak et al. |
| 7,433,729 B2 | 10/2008 | Setlak et al. |
| 7,437,953 B2 | 10/2008 | DeConde et al. |
| 7,460,109 B2 | 12/2008 | Safai et al. |
| 7,460,697 B2 | 12/2008 | Erhart et al. |
| 7,463,756 B2 | 12/2008 | Benkley, III |
| 7,474,772 B2 | 1/2009 | Russo et al. |
| 7,505,613 B2 | 3/2009 | Russo |
| 7,519,204 B2 | 4/2009 | Bjorn et al. |
| 7,522,753 B2 | 4/2009 | Kalnitsky et al. |
| 7,574,022 B2 | 8/2009 | Russo |
| 7,587,072 B2 | 9/2009 | Russo et al. |
| 7,590,837 B2 | 9/2009 | Bhansali et al. |
| 7,591,165 B2 | 9/2009 | Papakostas et al. |
| 7,594,442 B2 | 9/2009 | Kaiserman et al. |
| 7,599,530 B2 | 10/2009 | Boshra |
| 7,599,532 B2 | 10/2009 | Setlak et al. |
| 7,616,786 B2 | 11/2009 | Setlak |
| 7,616,787 B2 | 11/2009 | Boshra |
| 7,629,871 B2 | 12/2009 | Schrum et al. |
| 7,638,350 B2 | 12/2009 | Deconde et al. |
| 7,643,950 B1 | 1/2010 | Getzin et al. |
| 7,671,351 B2 | 3/2010 | Setlak et al. |
| 7,683,641 B2 | 3/2010 | Hargreaves et al. |
| 7,684,953 B2 | 3/2010 | Feist et al. |
| 7,689,012 B2 | 3/2010 | Neil et al. |
| 7,693,314 B2 | 4/2010 | Tykowski et al. |
| 7,697,729 B2 | 4/2010 | Howell et al. |
| 7,698,565 B1 | 4/2010 | Bjorn et al. |

(56) References Cited

U.S. PATENT DOCUMENTS

| | | |
|---|---|---|
| 7,708,191 B2 | 5/2010 | Vega |
| 7,728,959 B2 | 6/2010 | Waldman et al. |
| 7,734,074 B2 | 6/2010 | Setlak et al. |
| 7,751,595 B2 | 7/2010 | Russo |
| 7,751,601 B2 | 7/2010 | Benkley, III |
| 7,768,273 B1 | 8/2010 | Kalnitsky et al. |
| 7,773,139 B2 | 8/2010 | den Boer et al. |
| 7,801,766 B2 | 9/2010 | Bunger et al. |
| 2001/0032319 A1 | 10/2001 | Setlak |
| 2002/0018584 A1 | 2/2002 | Johnson |
| 2002/0027634 A1 | 3/2002 | Kang et al. |
| 2002/0041146 A1 | 4/2002 | Kim et al. |
| 2002/0166388 A1 | 11/2002 | Ganapathi et al. |
| 2002/0180923 A1 | 12/2002 | Aoyagi et al. |
| 2003/0086049 A1 | 5/2003 | Yamazaki et al. |
| 2003/0117543 A1 | 6/2003 | Chang |
| 2003/0215116 A1 | 11/2003 | Brandt et al. |
| 2004/0252867 A1 | 12/2004 | Lan et al. |
| 2005/0063571 A1 | 3/2005 | Setlak et al. |
| 2005/0063572 A1 | 3/2005 | Setlak et al. |
| 2005/0063573 A1 | 3/2005 | Setlak et al. |
| 2005/0069180 A1 | 3/2005 | Setlak et al. |
| 2005/0069181 A1 | 3/2005 | Setlak et al. |
| 2005/0078855 A1 | 4/2005 | Chandler et al. |
| 2005/0089202 A1 | 4/2005 | Setlak et al. |
| 2005/0089203 A1 | 4/2005 | Setlak |
| 2005/0100199 A1 | 5/2005 | Boshra |
| 2005/0110103 A1 | 5/2005 | Setlak |
| 2005/0117785 A1 | 6/2005 | Boshra |
| 2005/0129291 A1 | 6/2005 | Boshra |
| 2005/0179657 A1 | 8/2005 | Russo et al. |
| 2005/0199071 A1 | 9/2005 | Ganapathi |
| 2005/0199072 A1 | 9/2005 | Ganapathi |
| 2005/0231215 A1 | 10/2005 | Gozzini |
| 2005/0231216 A1 | 10/2005 | Gozzini |
| 2005/0244038 A1 | 11/2005 | Benkley, III |
| 2005/0244039 A1 | 11/2005 | Geoffroy et al. |
| 2006/0008128 A1 | 1/2006 | Setlak et al. |
| 2006/0011997 A1 | 1/2006 | Kalnitsky et al. |
| 2006/0062437 A1 | 3/2006 | O'Gorman et al. |
| 2006/0062439 A1 | 3/2006 | Setlak |
| 2006/0066586 A1* | 3/2006 | Gally et al. ............... 345/173 |
| 2006/0078174 A1 | 4/2006 | Russo |
| 2006/0083411 A1 | 4/2006 | Benkley, III |
| 2006/0088195 A1 | 4/2006 | Tykowski et al. |
| 2006/0093191 A1 | 5/2006 | Neil et al. |
| 2006/0097991 A1* | 5/2006 | Hotelling et al. ............ 345/173 |
| 2006/0103633 A1 | 5/2006 | Gioeli |
| 2006/0181521 A1 | 8/2006 | Perreault et al. |
| 2006/0182319 A1 | 8/2006 | Setlak et al. |
| 2006/0197753 A1 | 9/2006 | Hotelling |
| 2006/0273417 A1* | 12/2006 | Ganapathi et al. ............ 257/415 |
| 2007/0031011 A1 | 2/2007 | Erhart et al. |
| 2007/0086630 A1 | 4/2007 | Setlak et al. |
| 2007/0086634 A1 | 4/2007 | Setlak et al. |
| 2007/0098228 A1 | 5/2007 | Perreault |
| 2007/0122013 A1 | 5/2007 | Setlak et al. |
| 2007/0143715 A1* | 6/2007 | Hollins et al. ............... 715/863 |
| 2007/0207681 A1 | 9/2007 | Zabroda et al. |
| 2007/0236618 A1 | 10/2007 | Maag et al. |
| 2007/0289392 A1 | 12/2007 | Deconde et al. |
| 2007/0290124 A1 | 12/2007 | Neil et al. |
| 2007/0292007 A1 | 12/2007 | Neil |
| 2008/0013805 A1 | 1/2008 | Sengupta et al. |
| 2008/0030302 A1 | 2/2008 | Franza et al. |
| 2008/0060086 A1 | 3/2008 | Bhansali et al. |
| 2008/0062139 A1* | 3/2008 | Hotelling et al. ............ 345/173 |
| 2008/0063245 A1 | 3/2008 | Benkley et al. |
| 2008/0094690 A1 | 4/2008 | Luo et al. |
| 2008/0098483 A1 | 4/2008 | Bhansali et al. |
| 2008/0119069 A1 | 5/2008 | Ichiyama |
| 2008/0127308 A1 | 5/2008 | Bhansali et al. |
| 2008/0134284 A1 | 6/2008 | Bhansali et al. |
| 2008/0137843 A1 | 6/2008 | Bhansali et al. |
| 2008/0141383 A1 | 6/2008 | Bhansali et al. |
| 2008/0165139 A1 | 7/2008 | Hotelling et al. |
| 2008/0189792 A1 | 8/2008 | Bhansali et al. |
| 2008/0205714 A1 | 8/2008 | Benkley et al. |
| 2008/0219521 A1 | 9/2008 | Benkley et al. |
| 2008/0219522 A1 | 9/2008 | Hook |
| 2008/0226132 A1 | 9/2008 | Gardner |
| 2008/0228707 A1 | 9/2008 | Bhansali et al. |
| 2008/0240523 A1 | 10/2008 | Benkley et al. |
| 2008/0267462 A1 | 10/2008 | Nelson et al. |
| 2008/0270602 A1 | 10/2008 | Bhansali et al. |
| 2008/0273770 A1 | 11/2008 | Kohout |
| 2008/0276326 A1 | 11/2008 | Bhansali et al. |
| 2008/0279373 A1 | 11/2008 | Erhart et al. |
| 2008/0309631 A1 | 12/2008 | Westerman et al. |
| 2009/0003664 A1 | 1/2009 | Setlak et al. |
| 2009/0021487 A1 | 1/2009 | Tien |
| 2009/0067685 A1 | 3/2009 | Boshra et al. |
| 2009/0067686 A1 | 3/2009 | Boshra et al. |
| 2009/0067687 A1 | 3/2009 | Boshra et al. |
| 2009/0067688 A1 | 3/2009 | Boshra et al. |
| 2009/0067689 A1 | 3/2009 | Porter et al. |
| 2009/0070592 A1 | 3/2009 | Boshra et al. |
| 2009/0070593 A1 | 3/2009 | Boshra et al. |
| 2009/0123039 A1 | 5/2009 | Gozzini |
| 2009/0134966 A1 | 5/2009 | Baker |
| 2009/0150993 A1 | 6/2009 | Tilley |
| 2009/0153297 A1 | 6/2009 | Gardner |
| 2009/0154779 A1 | 6/2009 | Satyan et al. |
| 2009/0155456 A1 | 6/2009 | Benkley et al. |
| 2009/0164797 A1 | 6/2009 | Kramer |
| 2009/0166411 A1 | 7/2009 | Kramer et al. |
| 2009/0169071 A1 | 7/2009 | Bond et al. |
| 2009/0225396 A1 | 9/2009 | Sampsell |
| 2009/0237374 A1 | 9/2009 | Li et al. |
| 2009/0243817 A1 | 10/2009 | Son |
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0257626 A1 | 10/2009 | Sherlock et al. |
| 2009/0273573 A1* | 11/2009 | Hotelling ............... 345/173 |
| 2009/0279162 A1 | 11/2009 | Chui |
| 2009/0300771 A1 | 12/2009 | Bhansali et al. |
| 2009/0303196 A1 | 12/2009 | Furukawa |
| 2009/0316963 A1 | 12/2009 | Boshra |
| 2010/0026451 A1 | 2/2010 | Erhart et al. |
| 2010/0044121 A1* | 2/2010 | Simon et al. ............... 178/18.03 |
| 2010/0062148 A1 | 3/2010 | Lussey et al. |
| 2010/0083000 A1 | 4/2010 | Kesanupalli |
| 2010/0096710 A1 | 4/2010 | Chou |
| 2010/0098303 A1 | 4/2010 | Chen |
| 2010/0102939 A1 | 4/2010 | Stewart |
| 2010/0110039 A1 | 5/2010 | Li |
| 2010/0119124 A1 | 5/2010 | Satyan |
| 2010/0127366 A1 | 5/2010 | Bond et al. |
| 2010/0141608 A1 | 6/2010 | Huang et al. |
| 2010/0176823 A1 | 7/2010 | Thompson et al. |
| 2010/0177940 A1 | 7/2010 | Dean et al. |
| 2010/0180136 A1 | 7/2010 | Thompson et al. |
| 2010/0189314 A1 | 7/2010 | Benkley et al. |
| 2010/0225607 A1 | 9/2010 | Kim |
| 2010/0262591 A1* | 10/2010 | Lee et al. ............... 707/706 |
| 2010/0279738 A1 | 11/2010 | Kim et al. |
| 2010/0321326 A1 | 12/2010 | Grunthaner et al. |
| 2011/0017524 A1 | 1/2011 | Chen et al. |
| 2011/0018826 A1 | 1/2011 | Shoji |
| 2011/0025617 A1 | 2/2011 | Hsih et al. |
| 2011/0026202 A1 | 2/2011 | Kai et al. |
| 2011/0037721 A1 | 2/2011 | Cranfill et al. |
| 2011/0050624 A1 | 3/2011 | Lee et al. |
| 2011/0074717 A1* | 3/2011 | Yamashita ............... 345/173 |
| 2011/0198712 A1 | 8/2011 | Okumura et al. |
| 2011/0254758 A1 | 10/2011 | Lin et al. |
| 2011/0273394 A1 | 11/2011 | Young et al. |
| 2012/0090757 A1 | 4/2012 | Buchan et al. |
| 2012/0092127 A1 | 4/2012 | Ganapathi et al. |
| 2012/0092279 A1 | 4/2012 | Martin |
| 2012/0092293 A1 | 4/2012 | Ganapathi et al. |
| 2012/0092294 A1 | 4/2012 | Ganapathi et al. |

(56) References Cited

U.S. PATENT DOCUMENTS

| | | |
|---|---|---|
| 2012/0092324 A1 | 4/2012 | Buchan et al. |
| 2012/0092350 A1 | 4/2012 | Ganapathi et al. |
| 2013/0278542 A1 | 10/2013 | Stephanou et al. |

FOREIGN PATENT DOCUMENTS

| | | |
|---|---|---|
| JP | 2000187239 A | 7/2000 |
| WO | 03046777 A3 | 6/2003 |
| WO | WO2011122347 A1 | 10/2011 |
| WO | WO 2011133301 | 10/2011 |
| WO | WO 2012054350 | 4/2012 |
| WO | WO 2012054353 | 4/2012 |
| WO | WO 2012054354 | 4/2012 |
| WO | WO 2012054355 | 4/2012 |
| WO | WO 2012054357 | 4/2012 |
| WO | WO 2012054358 | 4/2012 |
| WO | WO 2012054359 | 4/2012 |

OTHER PUBLICATIONS

International Preliminary Report on Patentability—PCT/US2011/056436, The International Bureau of WIPO—Geneva, Switzerland, Oct. 18, 2012.
International Preliminary Report on Patentability—PCT/US2011/056443, The International Bureau of WIPO—Geneva, Switzerland, Oct. 17, 2012.
International Preliminary Report on Patentability—PCT/US2011/056445, The International Bureau of WIPO—Geneva, Switzerland, Oct. 18, 2012.
International Preliminary Report on Patentability—PCT/US2011/056462, The International Bureau of WIPO—Geneva, Switzerland, Oct. 24, 2012.
International Preliminary Report on Patentability—PCT/US2011/056454, The International Bureau of WIPO—Geneva, Switzerland, Oct. 24, 2012.
International Preliminary Report on Patentability—PCT/US2011/056461, The International Bureau of WIPO—Geneva, Switzerland, Oct. 18, 2012.
International Preliminary Report on Patentability—PCT/US2011/056464, The International Bureau of WIPO—Geneva, Switzerland, Oct. 24, 2012.
International Search Report and Written Opinion—PCT/US2011/056436- ISA/EPO—Feb. 28, 2012.
International Search Report and Written Opinion—PCT/US2011/056443- ISA/EPO—Feb. 28, 2012.
International Search Report and Written Opinion—PCT/US2011/056445—ISA/EPO—Feb. 28, 2012.
International Search Report and Written Opinion—PCT/US2011/056454—ISA/EPO—Feb. 28, 2012.
International Search Report and Written Opinion—PCT/US2011/056461—ISA/EPO—Feb. 28, 2012.
International Search Report and Written Opinion—PCT/US2011/056462—ISA/EPO—Feb. 28, 2012.
International Search Report and Written Opinion—PCT/US2011/056464—ISA/EPO—Feb. 28, 2012.
International Search Report and Written Opinion dated May 25, 2011, from Application No. PCT/US2011/030558.
U.S. Appl. No. 61/394,054, filed Oct. 18, 2010, Entitled "Combination Touch Handwriting and Fingerprint Sensor".
Co-pending U.S. Appl. No. 12/975,025, filed Dec. 21, 2010.
Written Opinion of the International Preliminary Examining Authority dated May 22, 2012, from Application No. PCT/US2011/030558.
U.S. Office Action dated Aug. 23, 2013, from U.S. Appl. No. 12/763,025.
U.S. Office Action dated Apr. 2, 2013, from U.S. Appl. No. 13/271,057.
U.S. Office Action dated Aug. 5, 2013, from U.S. Appl. No. 13/271,057.
U.S. Office Action dated Apr. 11, 2013, from U.S. Appl. No. 13/271,065.
U.S. Office Action dated Aug. 15, 2013, from U.S. Appl. No. 13/271,065.

\* cited by examiner

| | Common Voltages | | | | |
|---|---|---|---|---|---|
| Segment Voltages | $VC_{ADD\_H}$ | $VC_{HOLD\_H}$ | $VC_{REL}$ | $VC_{HOLD\_L}$ | $VC_{ADD\_L}$ |
| $VS_H$ | Stable | Stable | Relax | Stable | Actuate |
| $VS_L$ | Actuate | Stable | Relax | Stable | Stable |

FIGURE 13
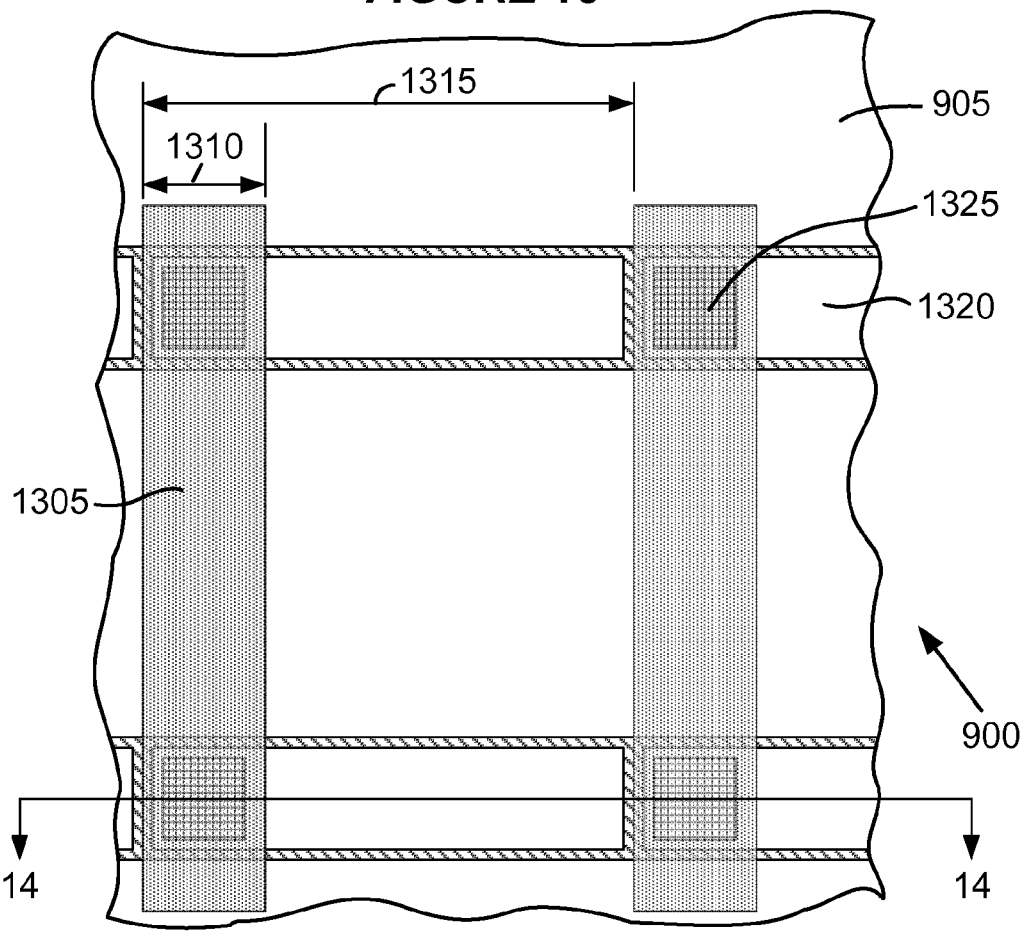
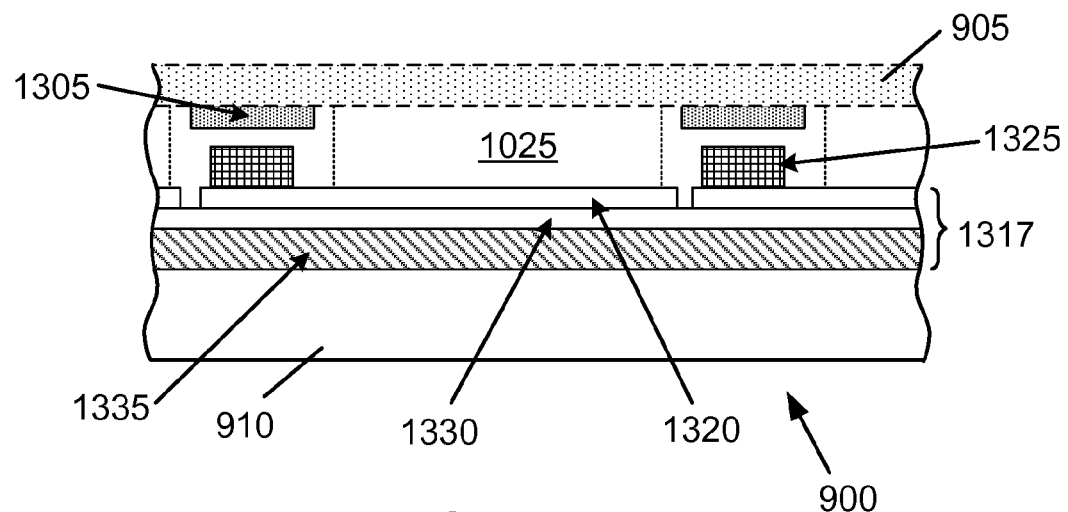
FIGURE 14

CONTROLLER ARCHITECTURE FOR COMBINATION TOUCH, HANDWRITING AND FINGERPRINT SENSOR

CROSS-REFERENCE TO RELATED APPLICATIONS

This application claims priority to U.S. Provisional Patent Application No. 61/394,054, entitled "COMBINATION TOUCH, HANDWRITING AND FINGERPRINT SENSOR" and filed on Oct. 18, 2010, which is hereby incorporated by reference and for all purposes. This application is related to U.S. patent application Ser. No. 13/271,049, entitled "COMBINATION TOUCH, HANDWRITING AND FINGERPRINT SENSOR" and filed on Oct. 11, 2011, to U.S. patent application Ser. No. 13/271,054, entitled "FABRICATION OF TOUCH, HANDWRITING AND FINGERPRINT SENSOR" and filed on Oct. 11, 2011, to U.S. patent application Ser. No. 13/271,057, entitled "TOUCH, HANDWRITING AND FINGERPRINT SENSOR WITH ELASTOMERIC SPACER LAYER" and filed on Oct. 11, 2011, to U.S. patent application Ser. No. 13/271,063, entitled "TOUCH SENSOR WITH FORCE-ACTUATED SWITCHED CAPACITOR" and filed on Oct. 11, 2011, to U.S. patent application Ser. No. 13/271,065, entitled "WRAPAROUND ASSEMBLY FOR COMBINATION TOUCH, HANDWRITING AND FINGERPRINT SENSOR" and filed on Oct. 11, 2011, to U.S. patent application Ser. No. 13/271,069, entitled "MULTIFUNCTIONAL INPUT DEVICE FOR AUTHENTICATION AND SECURITY APPLICATIONS" and filed on Oct. 11, 2011, all of which are hereby incorporated by reference and for all purposes.

TECHNICAL FIELD

This disclosure relates to display devices, including but not limited to display devices that incorporate multifunctional touch screens.

DESCRIPTION OF THE RELATED TECHNOLOGY

Electromechanical systems (EMS) include devices having electrical and mechanical elements, actuators, transducers, sensors, optical components (including mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of EMS device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

The increased use of touch screens in handheld devices causes increased complexity and cost for modules that now include the display, the touch panel and a cover glass. Each layer in the device adds thickness and requires costly glass-to-glass bonding solutions for attachment to the neighboring substrates. These problems can be further exacerbated for reflective displays when a frontlight also needs to be integrated, adding to the thickness and cost of the module.

SUMMARY

The systems, methods and devices of the disclosure each have several innovative aspects, no single one of which is solely responsible for the desirable attributes disclosed herein. Some implementations described herein provide a combined sensor device that combines aspects of capacitive and resistive technologies for touch sensing, handwriting input and fingerprint imaging. Some such implementations provide a touch sensor that combines capacitive and resistive technologies to enable a multi-feature user input sensor overlaid on a display.

In some such implementations, a cover glass apparatus of a consumer device such as a cell phone, an e-reader, or a tablet computer serves additionally as part of a combined sensor device having a single or multi-touch sensor, a handwriting or stylus input device, and/or a fingerprint sensor. The cover glass apparatus may include 2, 3 or more layers. The substrates used to form a cover glass apparatus may be formed of various suitable substantially transparent materials, such as actual glass, plastic, polymer, etc. Such a cover glass apparatus with touch, handwriting and/or fingerprint detection capability may, for example, be overlaid on a display.

One innovative aspect of the subject matter described in this disclosure can be implemented in an apparatus that includes a substantially transparent substrate. In some implementations, a handwriting and touch sensor may be formed in a first zone of the substantially transparent substrate and a fingerprint sensor may be formed in a second zone of the substantially transparent substrate. The handwriting and touch sensor may include a first plurality of substantially transparent electrodes and the fingerprint sensor may include a second plurality of substantially transparent electrodes. However, in alternative implementations, the handwriting and touch sensor may also be configured to operate as a fingerprint sensor. Such implementations may not have a designated fingerprint sensor zone.

The apparatus may include a control system configured for communication with the first plurality of substantially transparent electrodes and the second plurality of substantially transparent electrodes. The control system may be further configured for controlling the apparatus to function as a touch sensor, a handwriting sensor, and/or as a fingerprint sensor. The control system may be configured to control the apparatus to function as a touch sensor according to changes in capacitance received via the first plurality of substantially transparent electrodes. The control system may be configured to control the apparatus to function as a fingerprint sensor according to changes in resistance received via the second plurality of substantially transparent electrodes.

The control system may be configured to reduce power consumption by employing first level screening at a reduced frame rate on the touch sensor before activating the fingerprint sensor. The control system may be further configured to determine when the fingerprint sensor is not in use and to deactivate the fingerprint sensor when the fingerprint sensor is not in use. The control system may be configured to activate or deactivate fingerprint sensor functionality according to one or more fingerprint sensor indicia. The control system may be further configured to reduce power consumption by aggregating rows or columns of the first plurality of substantially transparent electrodes or of the second plurality of substantially transparent electrodes.

The control system may be configured to control the apparatus to function as a handwriting sensor according to changes in parallel plate capacitance received via the first plurality of substantially transparent electrodes. The control system may be configured to control the apparatus to function as a handwriting sensor according to an indication, received via the first plurality of substantially transparent electrodes, that a switch is open or closed. The control system may be further configured to activate or deactivate handwriting sensor functionality according to one or more handwriting sensor indicia.

In some implementations, the second plurality of substantially transparent electrodes may have a pitch that is smaller than that of the first plurality of substantially transparent electrodes. However, in alternative implementations the second plurality of substantially transparent electrodes may have a pitch that is substantially the same as that of the first plurality of substantially transparent electrodes.

At least part of the control system may be configured to be switchable from a touch mode configuration to a handwriting mode configuration. In some implementations, the control system may include an operational amplifier circuit. The operational amplifier circuit may be configured to be switchable from an integrator configuration to a charge amplifier configuration.

The apparatus may include a display and a processor that is configured to communicate with the display and with the control system. The processor may be configured to process image data. The apparatus may include a second memory device that is configured to communicate with the processor. The apparatus may include a driver circuit configured to send at least one signal to the display and a controller configured to send at least a portion of the image data to the driver circuit. The apparatus may include an image source module configured to send the image data to the processor, wherein the image source module includes at least one of a receiver, a transceiver, and a transmitter. The apparatus may include an input device configured to receive input data and to communicate the input data to the processor.

Another innovative aspect of the subject matter described in this disclosure can be implemented in an alternative apparatus that includes a substantially transparent substrate. A handwriting and touch sensor may be formed in a first zone of the substantially transparent substrate. The handwriting and touch sensor may include a first plurality of substantially transparent electrodes. A fingerprint sensor may be formed in a second zone of the substantially transparent substrate. The fingerprint sensor may include a second plurality of substantially transparent electrodes.

The apparatus may include a control system configured for communication with the first plurality of substantially transparent electrodes and the second plurality of substantially transparent electrodes. The control system may be further configured for controlling the apparatus to function as a touch sensor, a handwriting sensor, and/or a fingerprint sensor. The control system may be configured to control the apparatus to function as a handwriting sensor according to first indications of changes in parallel plate capacitance or according to second indications of the opening or closure of a switch. The first and second indications may be received via the first plurality of substantially transparent electrodes.

The control system may be configured to be switchable between functioning in a first state and functioning in a second state. In some implementations, the control system may be configured to control the apparatus to function as a touch sensor by processing the first indications when functioning in the first state. The control system may be configured to control the apparatus to function as a handwriting sensor by processing the second indications when functioning in the second state.

The control system may be further configured to receive one or more fingerprint sensor indicia and to determine whether to activate or deactivate fingerprint sensor functionality according to the fingerprint sensor indicia. The control system may be further configured to receive one or more handwriting sensor indicia and to determine whether to activate or deactivate handwriting sensor functionality according to the handwriting sensor indicia. The control system may be further configured to reduce power consumption by aggregating rows or columns of the first plurality of substantially transparent electrodes.

Details of one or more implementations of the subject matter described in this specification are set forth in the accompanying drawings and the description below. Although the examples provided in this summary are primarily described in terms of MEMS-based displays, the concepts provided herein may apply to other types of displays, such as liquid crystal displays, organic light-emitting diode ("OLED") displays and field emission displays. Other features, aspects, and advantages will become apparent from the description, the drawings, and the claims. Note that the relative dimensions of the following figures may not be drawn to scale.

BRIEF DESCRIPTION OF THE DRAWINGS

FIG. 13 shows an example of a top view of a force-sensitive switch implementation.

FIG. 14 shows an example of a cross-section through a row of the force-sensitive switch implementation shown in FIG. 13.

Like reference numbers and designations in the various drawings indicate like elements.

DETAILED DESCRIPTION

Figure 1:
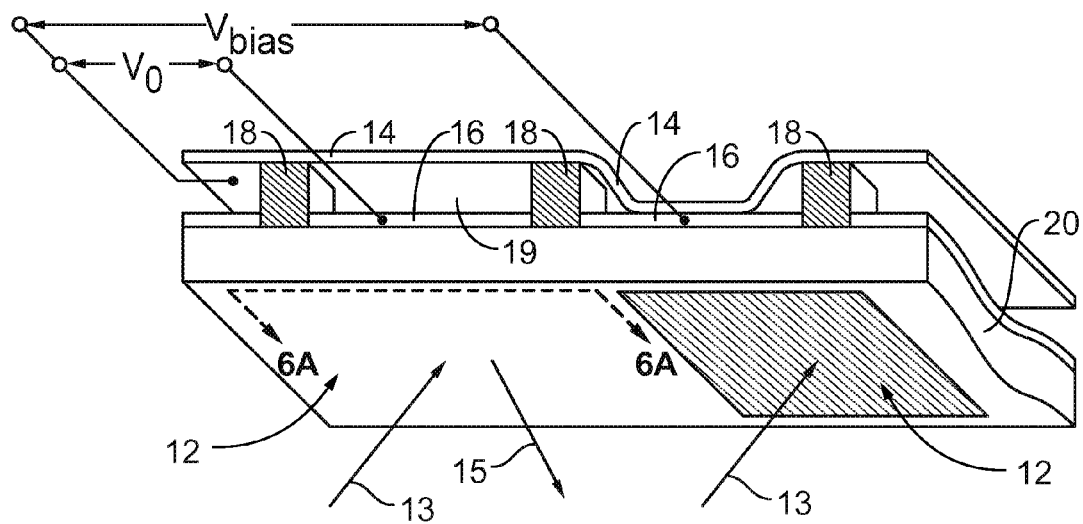
FIG. 1 shows an example of an isometric view depicting two adjacent pixels in a series of pixels of an interferometric modulator (IMOD) display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device or system that can be configured to display an image, whether in motion (e.g., video) or stationary (e.g., still image), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (i.e., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems, microelectromechanical systems, and non-MEMS applications), aesthetic structures (e.g., display of images on a piece of jewelry) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Some implementations described herein combine novel aspects of capacitive and resistive technologies for touch sensing, stylus detection for handwriting input, and fingerprint imaging. Some such implementations provide a combined sensor device, at least part of which is incorporated in a cover glass apparatus that may be overlaid on or otherwise combined with a display. The cover glass apparatus may have 2, 3 or more layers. In some implementations, the cover glass apparatus includes a substantially transparent and flexible upper substrate and a substantially transparent and relatively more rigid lower substrate. In some such implementations, the lower substrate of the cover glass apparatus may be overlaid on a display substrate. In alternative implementations, the lower substrate of the cover glass apparatus may be a display substrate. For example, the lower substrate of the cover glass apparatus may be the same transparent substrate on which IMOD devices are fabricated, as described below.

Various implementations of such sensor devices are described herein. In some implementations, the cover glass of a display device serves as a single or multi-touch sensor, as a handwriting (or note capture) input device, and as a fingerprint sensor. Sensor functionality and resolution can be tailored to specific locations on the cover glass. In some such implementations, the area in which the fingerprint sensing elements are located may provide not only fingerprint detection, but also handwriting and touch functionality. In some other implementations, the fingerprint sensor may be segregated in a separate, high-resolution zone that only provides fingerprint functionality. In some implementations, the sensor device serves as a combination touch and stylus input device. Various methods of fabrication are described herein, as well as methods for using a device that includes a combined sensor device.

Particular implementations of the subject matter described in this disclosure can be implemented to realize one or more of the following potential advantages. Some implementations described herein combine aspects of capacitive and resistive technologies for touch sensing, handwriting input and in some cases fingerprint imaging. Some such implementations provide a touch sensor that combines capacitive and resistive technologies to enable a multi-functional user input sensor that can be overlaid on a display. Some implementations of the combined sensor device eliminate a middle touch sensor layer that is disposed between the cover glass and the display glass in some conventional projected capacitive touch (PCT)-based devices. Accordingly, some such implementations can mitigate or eliminate at least some drawbacks of PCT and resistive technologies.

A hybrid PCT and digital resistive touch (DRT) implementation allows, for example, detection of a narrow stylus tip pressing onto the display with the DRT aspect while also allowing the detection of very light brushing or close hovering over the display with a finger using the PCT aspect. The sensor device can accept any form of stylus or pen input, regardless of whether it is conducting or non-conducting. Transparent or effectively transparent force-sensitive resistors may be included within some or all of the sensels to improve optical and electrical performance.

According to some implementations, the combination sensor may include two or more patterned layers, some of which may be on a different substrate. The upper (or outer) substrate may, for example, be formed of a plastic such as polyethylene terephthalate (PET), polyethylene naphthalate (PEN), polyimide, or a similar material. The upper substrate also may be substantially transparent and have a substantially transparent conductor such as indium-tin-oxide (ITO) patterned on its underside. The lower substrate may be formed of a substantially transparent substrate material, such as glass, with another suitable material. The top surface of the substantially transparent substrate can be a patterned layer of substantially transparent conductor material such as ITO. In some implementations, the conductors on the underside of the upper substrate and the upper side of the lower substrate may be patterned into diamond-shaped electrodes, connected as rows or columns on each of the two different layers Some such implementations include a wrap-around configuration wherein a flexible upper substrate of the sensor device has patterned metallization on an extended portion to allow routing of signal lines, electrical ground, and power. This flexible upper substrate may be wrapped around an edge of a relatively more rigid lower substrate of the cover glass apparatus. One or more ICs or passive components including connecting sockets may be mounted onto the flexible layer to reduce cost and complexity. Signal lines that address sensor electrodes on the lower substrate may be routed and connected to corresponding patterns on the underside of the flexible upper substrate. Such implementations have the potential advantage of eliminating the need for a flex cable for electrically connecting signal lines of the upper layer to integrated circuits and/or other devices. The approach allows a bezel-less configuration for some versions of the final cover glass apparatus.

Fabrication methods include predominantly transparent substrates and materials to increase the optical performance of underlying displays. The fabrication processes may utilize flexible substrates for at least a portion of the sensor device, and lend themselves to roll-to-roll processing for low cost.

Use of a compliant, elastomeric layer between upper and lower portions of the combination sensor can increase the sensitivity to applied pressure or force from a stylus, while increasing the lateral resolution for a given sensel pitch. The elastomeric material may include open regions for the inclusion of force-sensitive resistors. With careful selection of the elastomeric and FSR materials, the loss of transmissivity that can accompany air gaps is minimized.

An array of force-sensitive switches and local capacitors may be used to connect the local capacitor into associated PCT detection circuitry, where each capacitor is formed with a thin dielectric layer to achieve a high capacitance increase when the force-sensitive switch is closed by the pressing of a stylus or finger. The same PCT detection circuitry can therefore be used to detect changes in mutual capacitance when touched with a finger (touch mode) and changes in sensel capacitance when the force-sensitive switch is depressed (stylus or fingerprint mode).

The combined, multi-functional sensor device enables a single touchscreen to perform additional functions such as handwriting input and fingerprint recognition. In some implementations, these multiple features allow increased security through user authentication, and allow better capture of handwriting and a more interactive approach to user interfaces. A handheld mobile device such as a cell phone with the sensor device enables an array of applications, including using the mobile device as a gateway for user authentication to enable transactions and physical access; using the handwriting input function for signature recognition and transmittal for transaction applications; and using the handwriting input feature to automatically capture notes and other documents of students in an academic setting or employees in a corporate setting.

In some such implementations, a separate controller may be configured for the sensor device, or the controller may be included as part of an applications processor. Software for handwriting, touch and fingerprint detection may be included on one or more controllers or the applications processor. Low, medium and high resolution can be obtained with a single sensor device by scanning a subset of the sensels, or by aggregating lines or columns. Power consumption may be reduced by aggregating sensor pixels (or rows or columns) electrically using the controller, so that they perform as a low power small array until higher resolution with a larger array is needed. Power consumption may be reduced by turning off portions or all of the sensor device, turning off parts of the controller, or employing first-level screening at a reduced frame rate. In some such implementations, a combination PCT sensor and digital resistive touch (DRT) sensor has a passive array of capacitors (PCT) and a passive array of resistive switches (DRT). While the touch sensor and stylus sensor systems generally use different sensing techniques, a holistic approach with a common structure saves on PCB part count, reduces area in an ASIC implementation, reduces power, and eliminates the need for isolation between touch and stylus subsystems.

An example of a suitable EMS or MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity. One way of changing the optical resonant cavity is by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, absorbing and/or destructively interfering light within the visible range. In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12 (i.e., IMOD pixels). In the IMOD 12 on the left (as illustrated), a movable reflective layer 14 is illustrated in a relaxed position at a distance (which may be predetermined based on design parameters) from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near, adjacent or touching the optical stack 16. The voltage $V_{bias}$ applied across the IMOD 12 on the right is sufficient to move and can maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. A person having ordinary skill in the art will readily recognize that most of the light 13 incident upon the pixels 12 may be transmitted through the transparent substrate 20, toward the optical stack 16. A portion of the light incident upon the optical stack 16 may be transmitted through the partially reflective layer of the optical stack 16, and a portion will be reflected back through the transparent substrate 20. The portion of light 13 that is transmitted through the optical stack 16 may be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, such as chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and electrical conductor, while different, more electrically conductive layers or portions (e.g., of the optical stack 16 or of other structures of the IMOD) can serve to bus signals between IMOD pixels. The optical stack 16 also can include one or more insulating or dielectric layers covering one or more conductive layers or an electrically conductive/optically absorptive layer.

In some implementations, the layer(s) of the optical stack 16 can be patterned into parallel strips, and may form row electrodes in a display device as described further below. As will be understood by one having ordinary skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be approximately less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
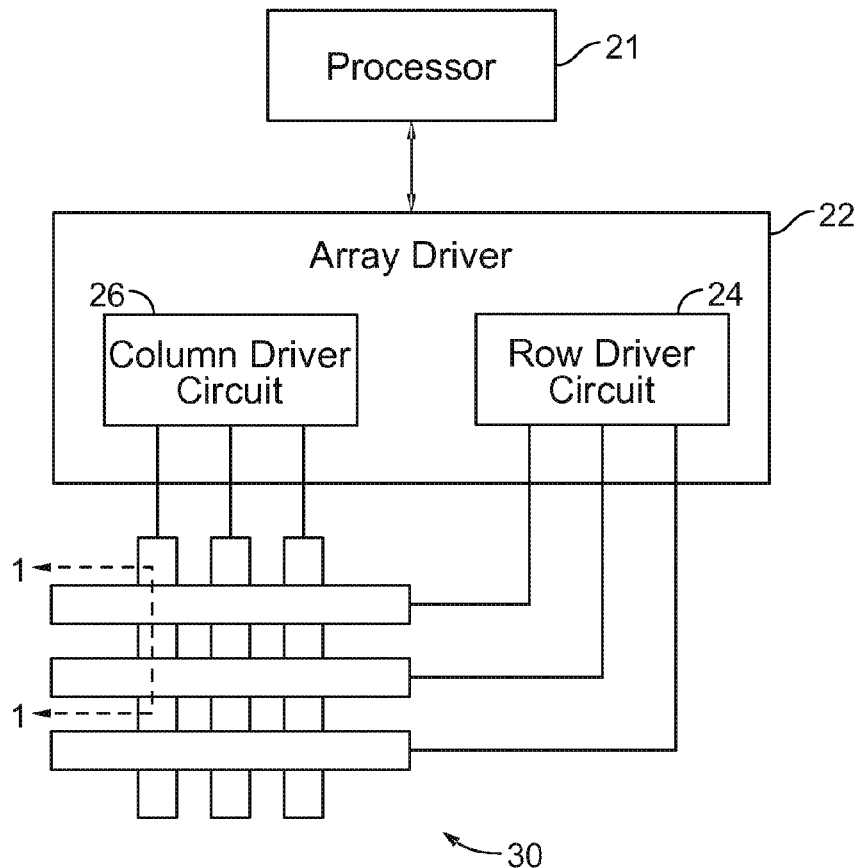
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
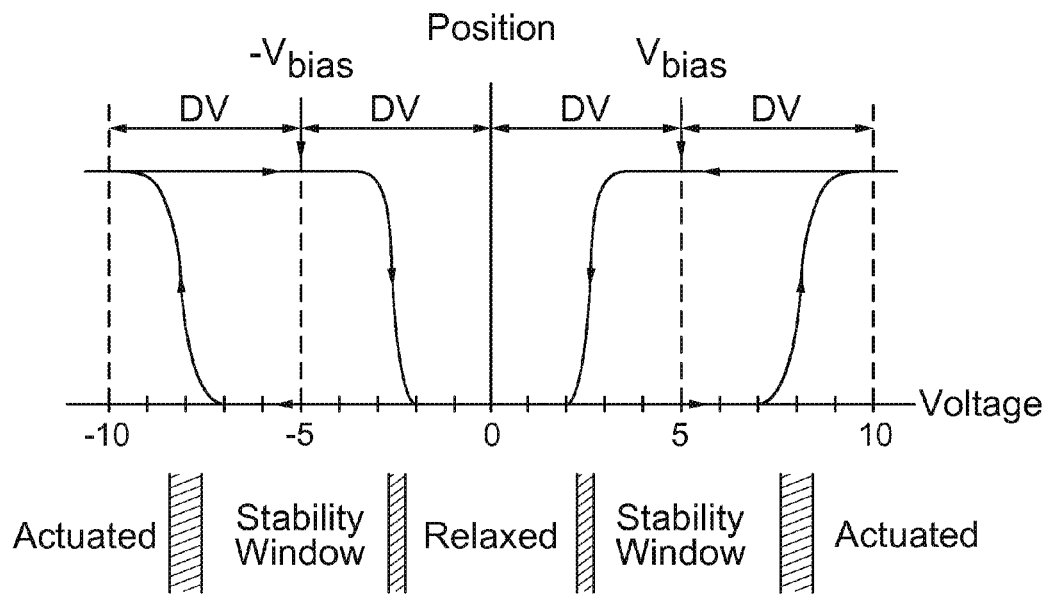
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
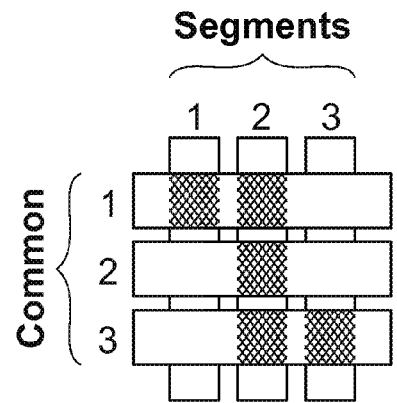
FIG. 5A shows an example of a diagram illustrating a frame of display data in the 3×3 interferometric modulator display of FIG. 2.
Figure 5B:
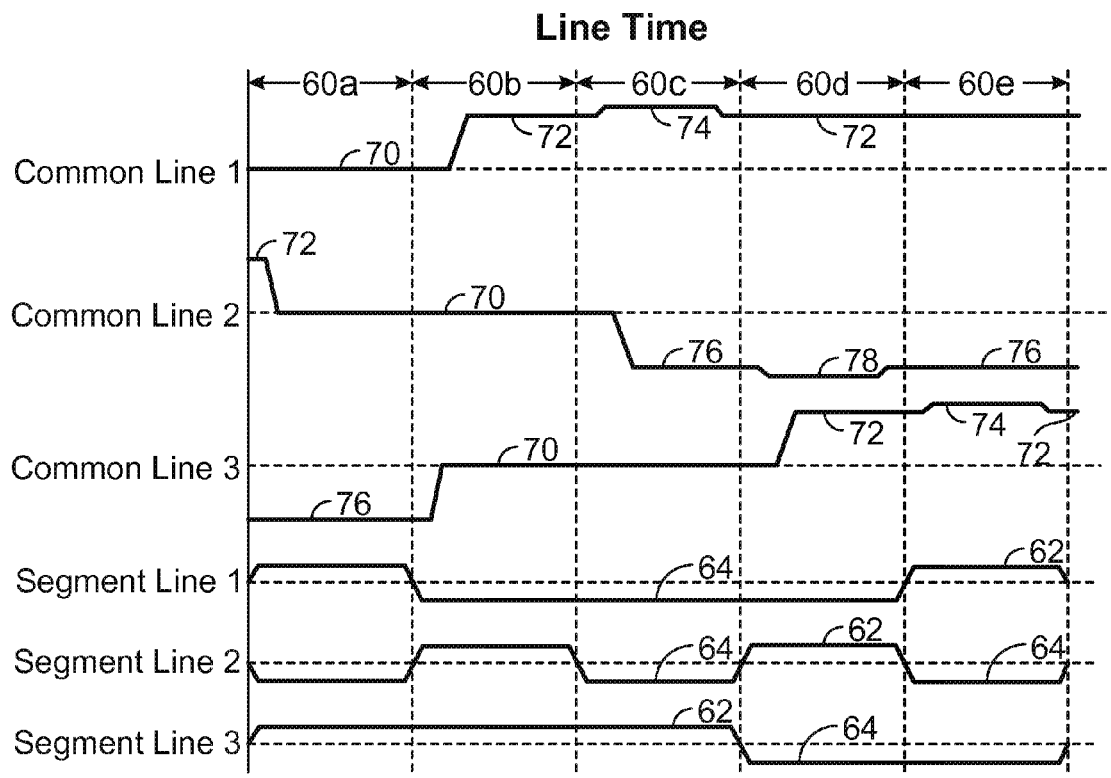
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$–relax and $VC_{HOLD\_L}$–stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state. Then the voltage on common line 2 transitions back to low hold voltage 76.

Finally, during the fifth line time 60e, the voltage on common line 1 remains at high hold voltage 72, and the voltage on common line 2 remains at low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
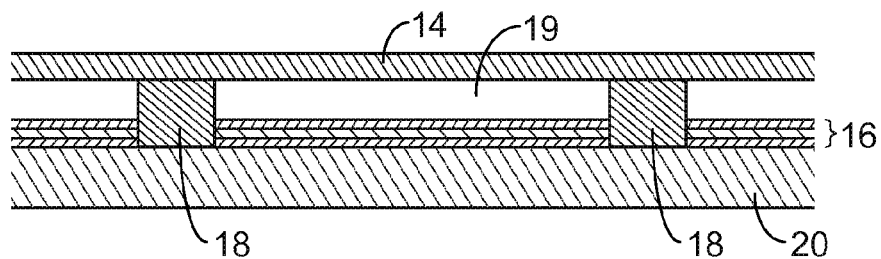
FIG. 6A shows an example of a partial cross-section of the interferometric modulator display of FIG. 1.
Figure 6B:
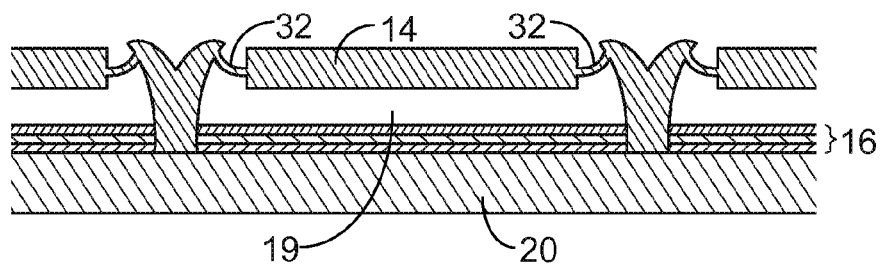
FIGS. 6B-6E show examples of cross-sections of varying implementations of interferometric modulators.
Figure 6C:
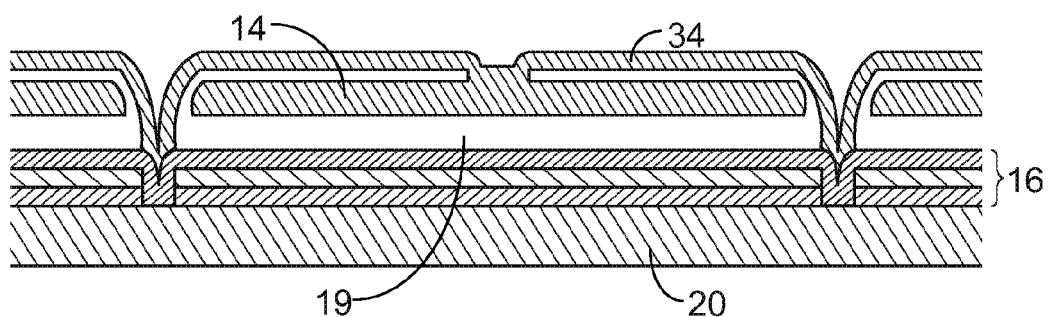

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
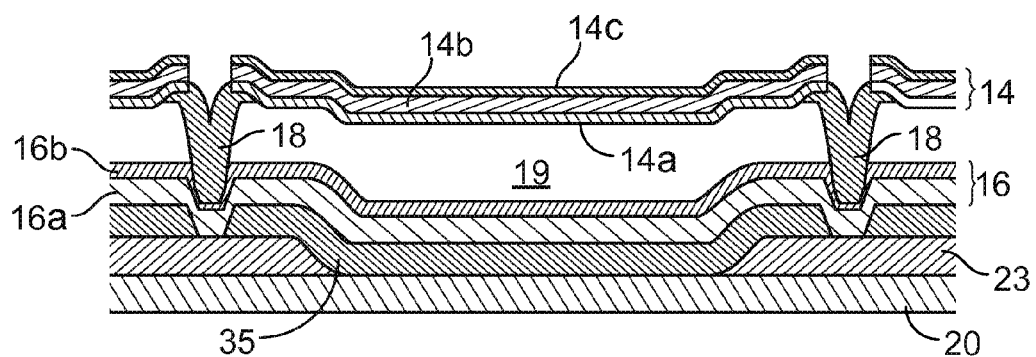

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a $SiO_2$ layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoromethane ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
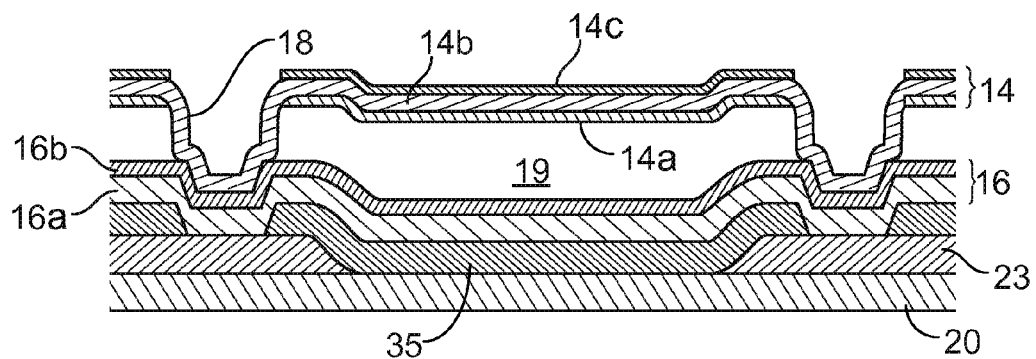

FIG. 6E shows another example of an IMOD, where the movable reflective layer 14 is self-supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as patterning.

Figure 7:
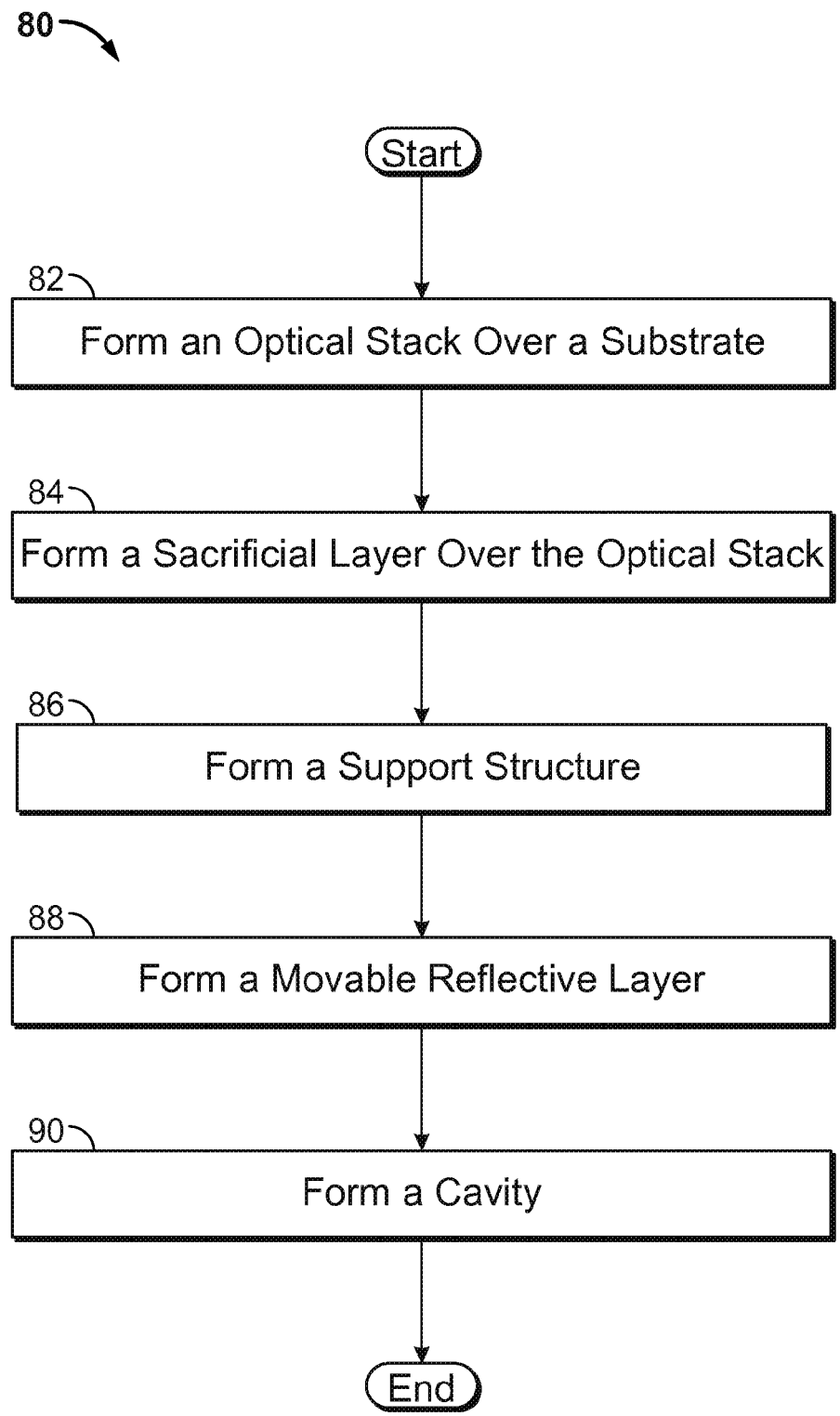
FIG. 7 shows an example of a flow diagram illustrating a manufacturing process for an interferometric modulator.
Figure 8A:
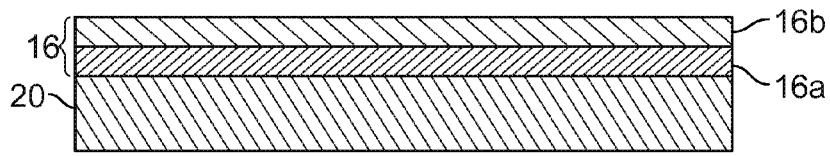
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
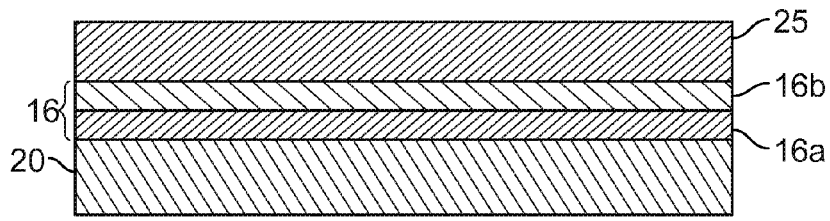

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
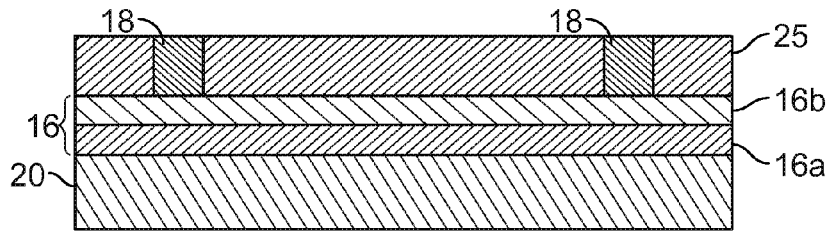

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
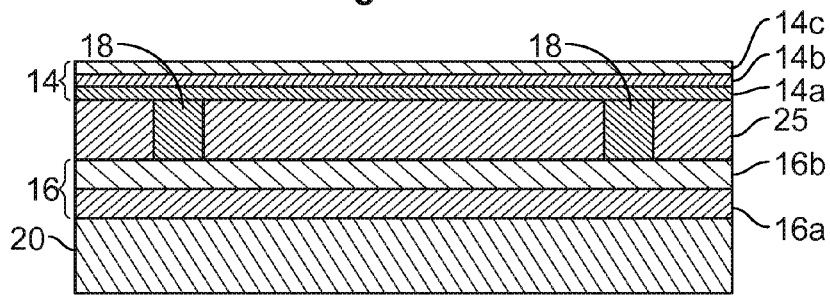
Figure 8E:
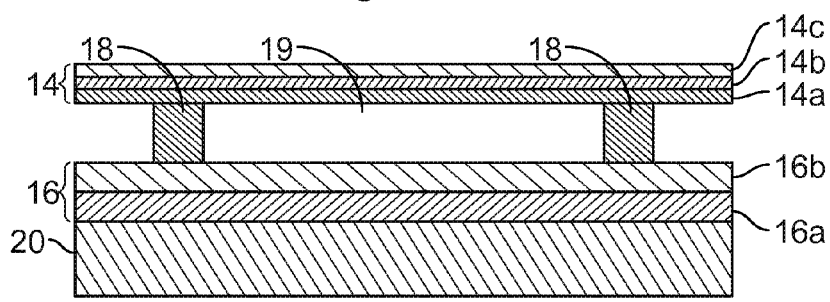

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps, e.g., reflective layer (e.g., aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 also may be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

In some implementations described herein, at least part of a combined sensor device may be incorporated in a cover glass apparatus that can be overlaid on or otherwise combined with a display. The cover glass apparatus may have 2, 3 or more layers. In some implementations, the cover glass apparatus may include a substantially transparent and flexible upper substrate and a substantially transparent and relatively more rigid lower substrate. The cover glass may include intermediate layers disposed on and/or between the substrates, such as electrodes, a substantially transparent elastomeric layer and/or force-sensitive resistor material. In some such implementations, the lower substrate of the cover glass apparatus may be overlaid on a display substrate.

Figure 9A:
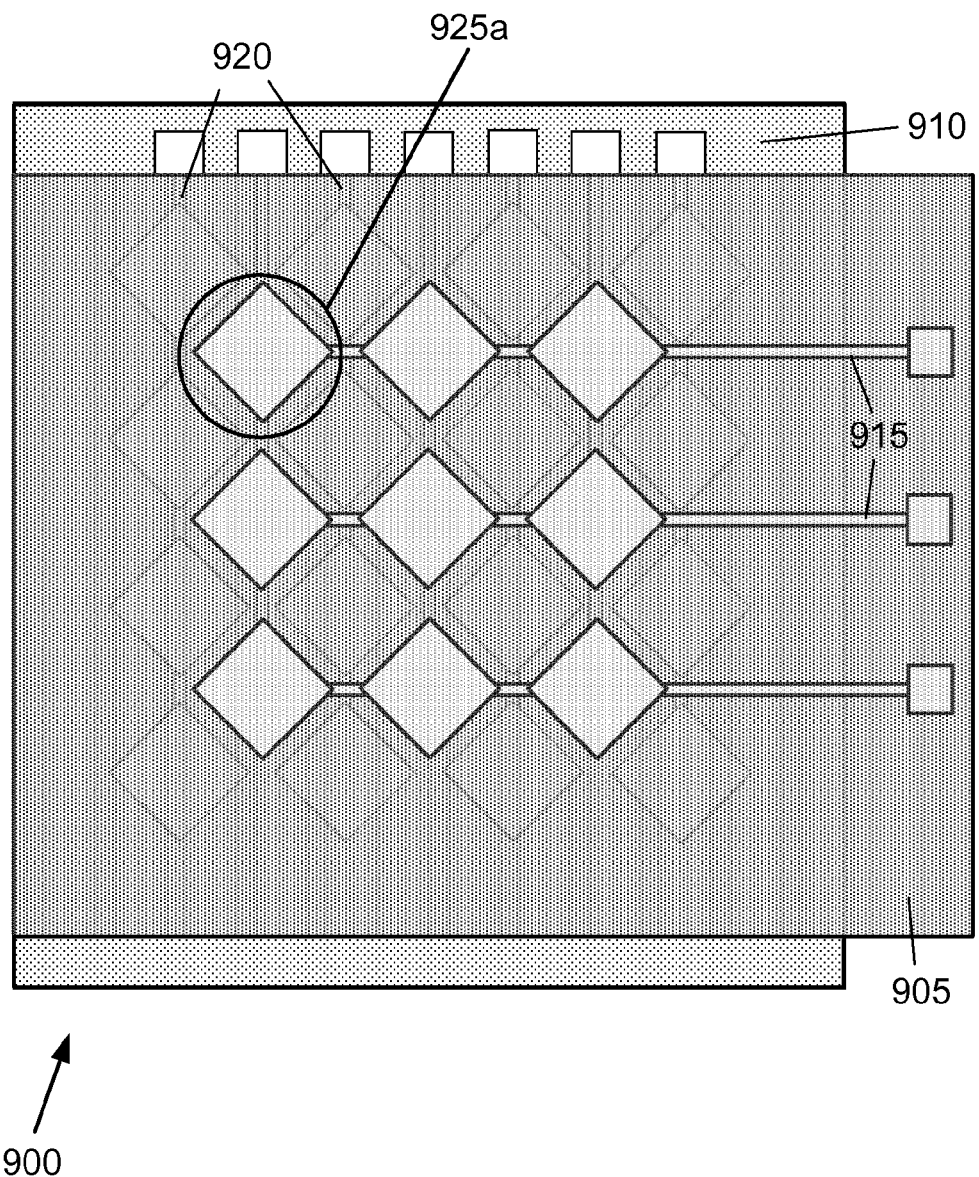
FIG. 9A shows an example of sensor electrodes formed on a cover glass.

FIG. 9A shows an example of sensor electrodes formed on substrates of a cover glass apparatus. In the example shown in FIG. 9A, three rows 915 of diamond-shaped substantially transparent electrodes are depicted on the substantially transparent upper substrate 905 and seven columns 920 of substantially transparent diamond-shaped electrodes are located on the substantially transparent lower substrate 910. Relatively few rows and columns are shown here for illustrative purposes, while in actual sensor devices the number of rows and columns may extend from tens to hundreds or even a thousand or more. One may note that the rows and columns are largely interchangeable, and no limitation is intended here. In some implementations, the upper substrate 905 of the combined sensor device 900 may be formed of a relatively flexible material, such as a flexible polymer. In some such examples, the upper substrate 905 may be a clear plastic film made of polyethylene terephthalate (PET), polyethylene naphthalate (PEN), polyimide, or a similar material. In some implementations, the upper substrate 905 may have a modulus of elasticity in the range of 0.5-5 GPa. The lower substrate 910 may be formed of glass, plastic, a polymer, etc. In some implementations, the lower substrate 910 may be a display substrate. For example, in some implementations the lower substrate 910 may be the same substrate as the transparent substrate 20 described above.

In this example, every other column electrode 920 includes diamond electrodes that are located directly under corresponding diamonds of the row electrodes 915 in overlapping regions 925a. Some implementations have offsets of the diamonds of the row electrodes 915 and the column electrodes 920, whereby the diamonds in the row electrodes 915 and the columns 920 partially overlie each other.

In some implementations, the row electrodes 915 and/or the column electrodes 920 may be formed into other shapes, such as squares, rectangles, triangles, circles, ovals, etc., and shapes that include predominantly open regions in the center of the shape such as a frame, a ring, or a series of connected line segments. A description of some such shapes is included in various parts of pending U.S. patent application Ser. No. 12/975,025 filed Dec. 21, 2010 and entitled "Capacitive Touch Sensing Devices and Methods of Manufacturing Thereof," (see, e.g., FIGS. 11A-11J and the corresponding description) the contents of which are hereby incorporated by reference in their entirety. Moreover, in alternative implementations the row electrodes 915 may be formed on the lower substrate 910 and the column electrodes 920 may be formed on the upper substrate 905. In some implementations, such as that described below with reference to FIGS. 10C and 10D including a compressible material 1025 positioned between the row electrodes 915 and the column electrodes 920, a light touch may be detected by measuring the change in mutual capacitance between adjacent diamonds (also referred to as projective capacitive touch (PCT)). In such implementations, contact with a stylus may be detected when the upper substrate 905 is depressed by measuring the change in capacitance between the row electrodes 915 and the column electrodes 920.

In implementations with a patterned dielectric material between the row electrodes 915 and the column electrodes 920, gaps may be formed between corresponding row electrodes 915 and column electrodes 920. In such implementations, light touches can be detected with PCT measurements between adjacent electrodes, and stylus depressions can be detected either by a change in the effective parallel plate capacitance between the row electrodes 915 and the column electrodes 920 (see FIG. 10B) or by measuring changes in resistance that occur when the row electrodes 915 and the column electrodes 920 come in direct mechanical and electrical contact (see FIG. 10A), or by measuring changes in a force-sensitive resistor positioned between row electrodes 915 and column electrodes 920 when pressed with a finger, a stylus tip, ridges of a finger, or the like (see FIG. 10D). The force-sensitive resistors may be included between row electrodes 915 and column electrodes 920 in a handwriting and touch sensor zone 1005, in a fingerprint sensor zone 1010, or both. In some such implementations, a high resistivity layer may be formed on the row electrodes 915 or the column electrodes 920 to minimize the effect of parasitic signals during the sensing of the location of the stylus.

Figure 9B:
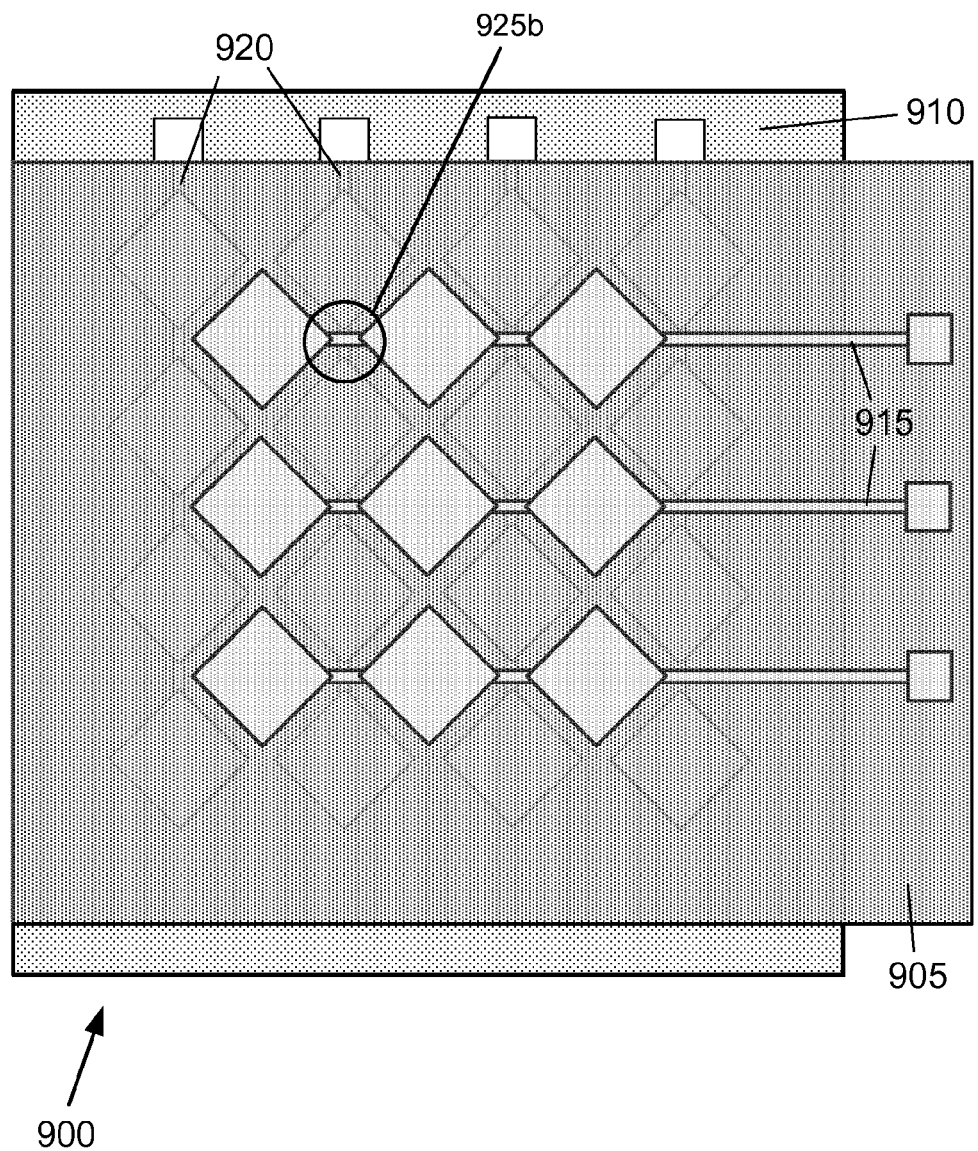
FIG. 9B shows an alternative example of sensor electrodes formed on a cover glass.

FIG. 9B shows an alternative example of sensor electrodes formed on a cover glass. In the example shown in FIG. 9B, the column electrodes 920 in which diamonds lay beneath the diamonds of the row electrodes 915 have been removed from the design. Ohmic membrane switches, resistive membrane switches, resistive switches with force-sensitive resistive (FSR) material, FSR switches with a fixed series resistor, or capacitive membranes of the combined sensor device 900 may be formed at the intersections between the row electrodes 915 and the column electrodes 920 (in overlapping regions 925b) for detecting stylus contact and, in some cases, a fingertip or ridges of a finger. Such implementations can reduce the number of column electrodes 920 (note that the number of column electrodes 920 and associated connection pads in FIG. 9B is fewer than the column electrodes 920 and connection pads in FIG. 9A) that need to be connected to the external processing circuitry, because the same columns can serve the purpose of detecting a light touch through the PCT method or detecting the stylus contact through either a capacitance change method or a resistive change method.

For example, in the touch mode, only a very light force may be required to register a touch. However, in the handwriting mode, the sensor may be configured to accept many forms of stylus, pen, or other pointer input, regardless of whether or not the pointing device is conducting or non-conducting. Some implementations described herein provide sensors capable of distinguishing a large number of multi-touch events simultaneously, such as may occur when reading a fingerprint while operating in a fingerprint sensor mode, or detecting and rejecting an inadvertent palm touch when operating in a handwriting sensor mode.

Figure 10A:
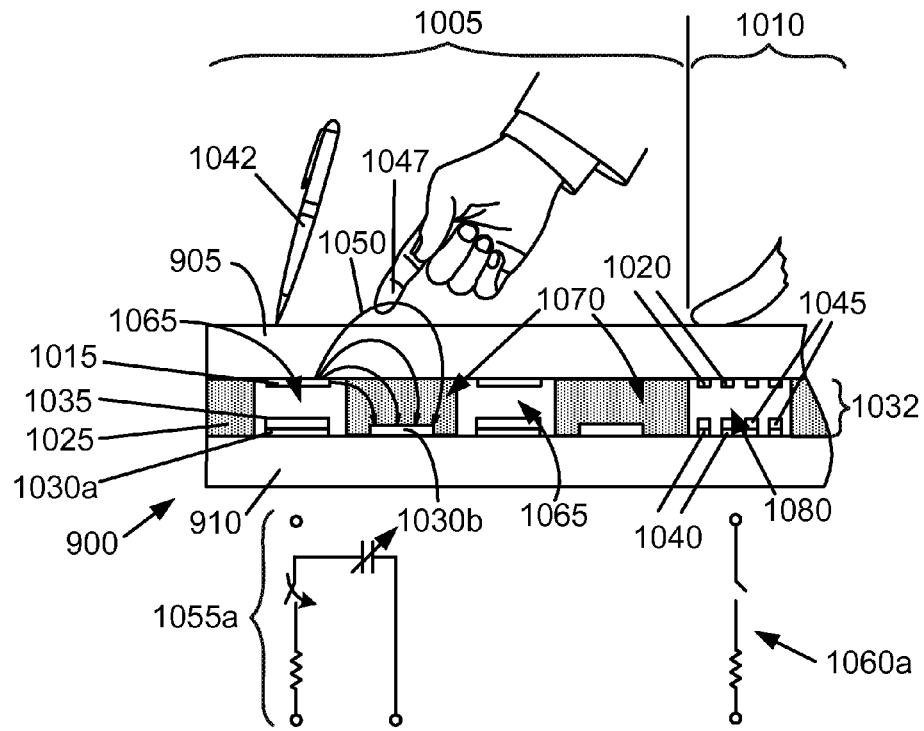
FIG. 10A shows an example of a cross-sectional view of a combined sensor device.
Figure 10B:
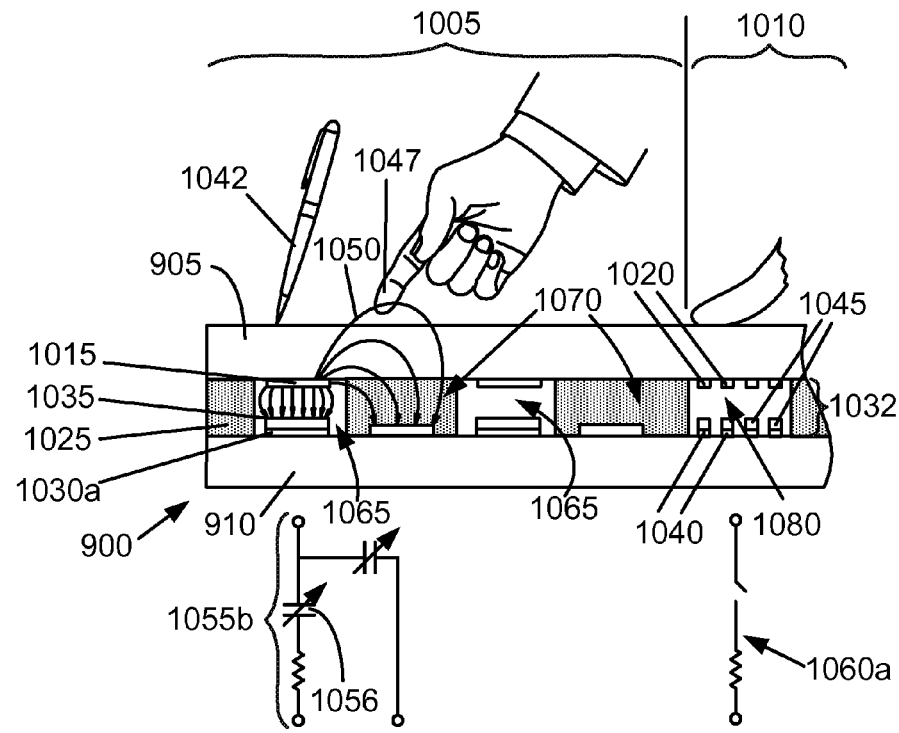
FIGS. 10B-10D show examples of cross-sectional views of alternative combined sensor devices.
Figure 10C:
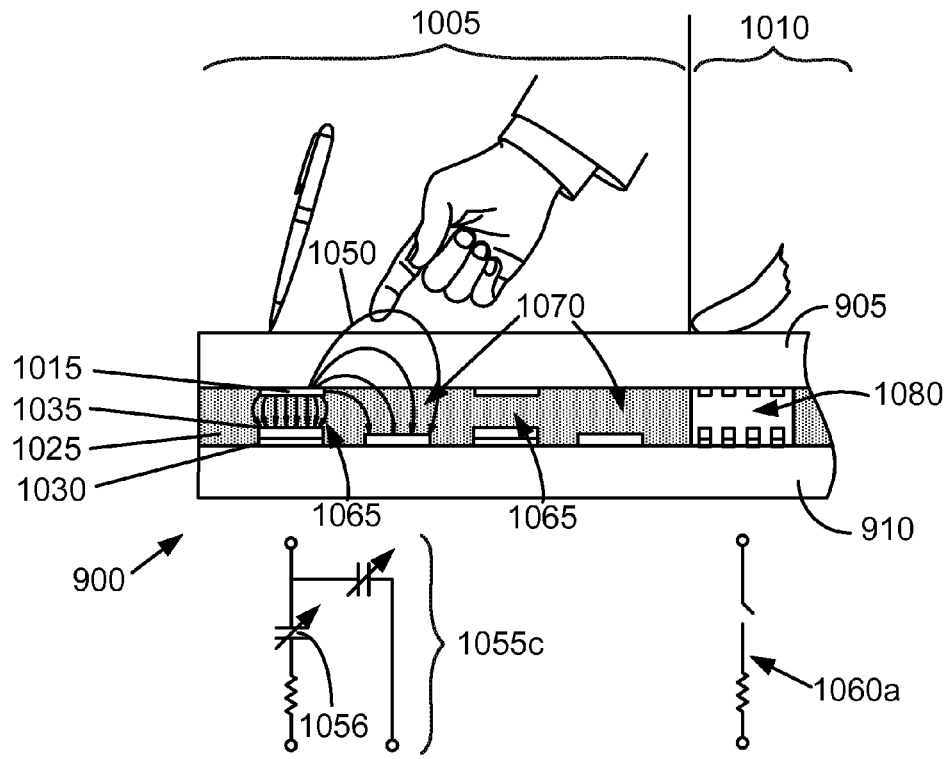
Figure 10D:
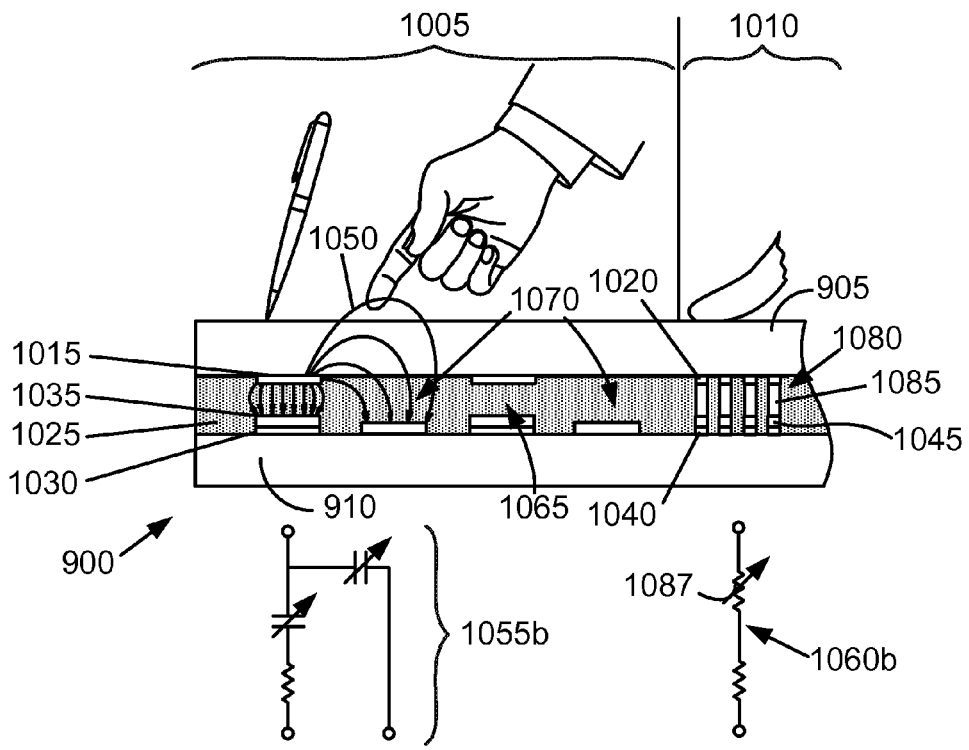

FIG. 10A shows an example of a cross-sectional view of a combined sensor device. While the sensor array shown in FIG. 10A is depicted as a combination touch, stylus, and fingerprint sensor, it should be noted that the configuration of FIG. 10A and other configurations described below may serve as only a touch sensor, a stylus sensor, a fingerprint sensor, or a combination thereof. In the example shown in FIG. 10A, two repeating cells are shown in a first region referred to as a handwriting and touch sensor zone 1005. Such sensing elements may be referred to herein as "sensels." An optional second region, referred to as a fingerprint sensor zone 1010, generally has a finer pitch between electrodes to allow for higher resolution often needed for fingerprint detection. As noted elsewhere herein, in some implementations the fingerprint sensor and the handwriting and touch sensor are not in different zones. FIGS. 10B-10D show examples of cross-sectional views of alternative combined sensor devices. FIGS. 10A-10D, like many other drawings provided herein, may not be drawn to scale. Touch, handwriting, and fingerprint zones are shown in FIGS. 10A-10D, although not all zones would normally be activated simultaneously. Nor may all zones and operating modes be available in a sensor device. Single or multi-touching using one or more fingers is depicted as being sensed using PCT in handwriting and touch sensor zone 1005, where particularly light touches as well as moderate and heavy touches may be detected. In the example shown in FIG. 10A, proximity of a finger 1047 alters the electric field 1050 between the upper electrode 1015 and the lower electrode 1030b, producing a change in mutual capacitance. This effect is schematically depicted by the variable capacitor of the associated circuit diagram 1055a. In some implementations, the upper electrode 1015 may be a row electrode and, as mentioned above, in some other implementations the upper electrode 1015 may be a column electrode (see FIGS. 9A and 9B).

High forces or high localized pressure (such as that incurred when a tip of a stylus such as a pen, pencil, or pointer is pressed against the surface of the combined sensor device 900) may be detected with ohmic or resistive membrane switches. One example is shown in FIG. 10A, in which high localized pressure produced by a pen or stylus 1042 can be detected by a mechanical switch that includes the upper electrode 1015 and the lower electrode 1030a. A resistor 1035, sometimes referred to as a fixed resistor, may be positioned between upper electrode 1015 and lower electrode 1030a to prevent direct shorting of the upper electrode 1015 and the lower electrode 1030a. The switch including a vertical or serpentine fixed resistor is represented schematically in the circuit diagram 1055a. The resistor 1035 may have an additional metal layer disposed thereon (not shown) to aid in electrical contact between it and the upper electrode 1015. While a resistive membrane switch as defined here includes at least a fixed resistor in each sensel (the resistive membrane switch also may include a force-sensitive resistor in series with the fixed resistor or in lieu of the fixed resistor), an ohmic membrane switch does not require an additional fixed resistor in series with the upper and lower electrodes. The fixed resistor may be formed of an ohmic material in some implementations. In some other implementations, the fixed resistor may be a non-linear device such as a leaky diode or other device that provides a relatively high resistance to current flow. The fixed resistor may include a thin-film conductive cap that serves as a conductive contact surface. Whereas a one-to-one correspondence with digital resistive touch (DRT) lower electrodes 1030a and PCT lower electrodes 1030b is shown in FIG. 10A, in some configurations the PCT lower electrodes 1030b could span one or more adjacent sensels. In some configurations, the PCT lower electrode 1030b is wider and longer than the DRT lower electrode 1030a.

In some implementations, the upper electrodes 1015 and the lower electrodes 1030a may be configured to form two plates of a deformable parallel plate capacitor, instead of the mechanical switch described above. In some implementations, the electrodes 1015 and 1030a may be separated by an air gap, as shown in areas 1065 of FIG. 10B, and may have a spacing corresponding to a baseline capacitance in the normal unpressed state. Upon the application of force or pressure, upper electrode 1015 is displaced and the electrodes 1015 and 1030a come closer. When the inter-electrode distance between the electrodes 1015 and 1030a is reduced, the capacitance changes (e.g., increases), enabling the sensing of an analog change in the displacement and allowing inference of the presence of the applied force or pressure. Accordingly, high localized pressure or force from a pen, a stylus, etc., may be detected via parallel plate capacitance changes between upper electrodes 1015 and lower electrodes 1030a. The capacitance changes caused by such localized changes in pressure are represented schematically by the variable capacitor 1056 of the circuit diagram 1055b. In the configuration shown, the fixed resistor 1035 is in series with the variable capacitor 1056. In other configurations (not shown), the fixed resistor 1035 may be omitted.

In some implementations, an interlayer separation 1032 may be formed between the upper substrate 905 and the lower substrate 910 by disposing a compressible layer 1025 between the upper and lower electrodes. In some implementations, the compressible layer 1025 may be a patternable, thin (e.g., 1 to 10 microns) polymer with a low elastic modulus, such as an elastomer. In some such implementations, the compressible layer 1025 may allow direct measurement of capacitance changes when the upper substrate 905 is depressed by a touch of a pen, a stylus, a finger, etc. and the distance between an upper electrode 1015 and a lower electrode 1030a changes. The compressible layer 1025 may have a lower modulus of elasticity than the upper substrate 905. For example, the upper substrate 905 may be a clear plastic film made of PET, PEN, polyimide, or a similar material having a modulus of elasticity in the range of 0.5-5 GPa. The compressible layer 1025 may have a significantly lower modulus of elasticity, such as in the range of 0.5-50 MPa.

In some implementations, the compressible layer 1025 may be patterned to include spaces or voids (which also may be referred to herein as "air gaps") between the upper substrate 905 and the lower substrate 910. Some implementations, such as those shown in FIGS. 10A and 10B, include voids in the areas 1065, wherein the compressible layer 1025 is not formed between the upper electrodes 1015 and the lower electrodes 1030a. However, in these examples the compressible layer 1025 extends without voids between the upper substrate 905 and the lower electrodes 1030b in the areas 1070. According to some such implementations, the compressible layer 1025 may be patterned such that there are air gaps in the areas 1065 and 1080. The indicated thickness and spacing of the compressible layer 1025 regions are merely indicated by way of example. The locations and lateral dimensions of the air gaps in the areas 1065 and 1080 may be selected according to desired parameters of force sensitivity, reliability and/or optical performance, as a person having ordinary skill in the art will readily comprehend. For example, the interlayer separation 1032 may be a fraction of a micron to several microns. The thickness of the air gaps in the areas 1065 and 1080 also may be a fraction of a micron to several microns thick. The pitch or spacing between adjacent upper electrodes 1015 (adjacent sensels) may range from a few tenths of a millimeter to over five millimeters in the handwriting and touch sensor zone 1005 (with the pitch between lower electrodes 1030a and 1030b approximately half that), while the pitch or spacing between adjacent electrodes 1040 in the fingerprint sensor zone 1010 may be as small as 50 microns or so.

The compressible layer 1025 may aid in enabling measurable deflections of the upper substrate 905. In some implementations, the compressible layer 1025 also may be formed in the areas 1065, as shown in FIG. 10C and described below. In some such implementations, the compressible layer 1025 may include an elastomeric material (or a similar material) that allows direct measurement of capacitance changes when the upper substrate 905 is depressed by a touch of a pen, a stylus, a finger, etc. and the distance between an upper electrode 1015 and a lower electrode 1030a changes. Alternatively the mutual capacitance between an upper electrode 1015 and a laterally displaced lower electrode 1030b also may change to allow the detection of a pen, stylus, finger, etc.

The fingerprint sensor zone 1010 may be configured for fingerprint detection. In the implementation shown in FIG. 10A, the upper fingerprint electrodes 1020 and the lower fingerprint electrodes 1040 form an array of resistive membrane switches, one of which is schematically represented in the circuit diagram 1060a. In the examples shown in FIGS. 10A-10C, the compressible layer 1025 is not formed between the upper fingerprint electrodes 1020 and the lower fingerprint electrodes 1040 in the area 1080. However, in the implementation depicted in FIG. 10D (which will be described in more detail below), the compressible layer 1025 is formed in the area 1080 except for regions where FSR material 1085 is located.

In the examples shown in FIGS. 10A-10D, the upper fingerprint electrodes 1020 and the lower fingerprint electrodes 1040 have a smaller pitch than that of the upper electrodes 1015 and the lower electrodes 1030 in the handwriting and touch sensor zone 1005, in order to provide relatively higher resolution in the fingerprint sensor zone 1010. However, in some alternative implementations, the pitch of the upper fingerprint electrodes 1020 and the lower fingerprint electrodes 1040 may be substantially the same as that of the upper electrodes 1015 and the lower electrodes 1030 in the handwriting and touch sensor zone 1005.

The compressible layer 1025 may be patterned using lithography and etch techniques (or other lithography-based techniques). In some implementations, the compressible layer 1025 can keep the ohmic or resistive switches of areas 1065 and 1080 open until a suitable force is applied to the outer surface of the sensor (which is the top surface of the upper substrate 905 in this example). Because the compressible layer 1025 is part of a sensor that would overlay a display, the compressible layer 1025 can be substantially transparent.

In some implementations, the compressible layer 1025 may have an index of refraction closely matched to that of the lower substrate 910 and the upper substrate 905. In some implementations, the compressible layer 1025 may have an index of refraction that differs from that of the lower substrate 910 and the upper substrate 905 by less than 5%, by less than 10%, by less than 20%, etc. For example, a 6% or less difference in the index of refraction may result in less than 0.2% reduction in transmission through the material stack. Such implementations can provide good optical transmission in areas where the compressible layer 1025 extends from the upper substrate 905 to the lower substrate 910. However, the optical transmission may be reduced in the air gap regions, caused by reflections at each air-material interface. Such reflections may be greater than, e.g., 4%, as calculated using the index of refraction of the upper substrate 905 (which may be approximately n=~1.5) and the index of refraction of air ($n_o=1$), in Equation 1:

$$(n-n_o)^2/(n+n_o)^2 = R, \text{where } R \text{ is reflectance.} \quad \text{(Equation 1)}$$

Accordingly, implementations having air gaps with minimal lateral dimensions can provide better optical performance. However, some such implementations may result in less deflection for a given pressure and may therefore be less sensitive to pressure or applied forces.

Therefore, some implementations provide an index-matched compressible layer 1025, which can improve the optical performance. Even in some implementations having air gaps in the areas 1065, the optical performance may already be quite good due to an architecture having the areas 1065 occupy a relatively small fraction of the handwriting and touch sensor zone 1005. For example, the areas 1065 with air gaps may occupy less than about 50% of the total area, whereas in other examples the areas 1065 may occupy less than about 10% of the total area. In such implementations, the majority of the sensor area will not have an air gap, and therefore will exhibit much reduced reflection at the layer 905/layer 1025 and the layer 1025/layer 910 interfaces, i.e., such that the total reflection for both interfaces may be <<1%, as estimated per Equation 1.

The sensitivity to pressure or force from a pen, stylus, or finger of the individual sensing elements (regardless of whether they are used in a resistive switch mode or in a deformable parallel plate capacitor mode) may be increased by the use of a low-modulus compressible layer 1025, as shown in FIGS. 11A-11D. The low-modulus compressible layer 1025 may remove the clamped boundary condition that can be imposed by a higher-modulus material. Having a low modulus compressible layer 1025 can effectively increase the diameter of an area 1110 of the compressible layer 1025 that is deflected by the stylus tip 1105, thereby increasing the deflection of the upper substrate 905 in the area 1110.

Figure 11A:
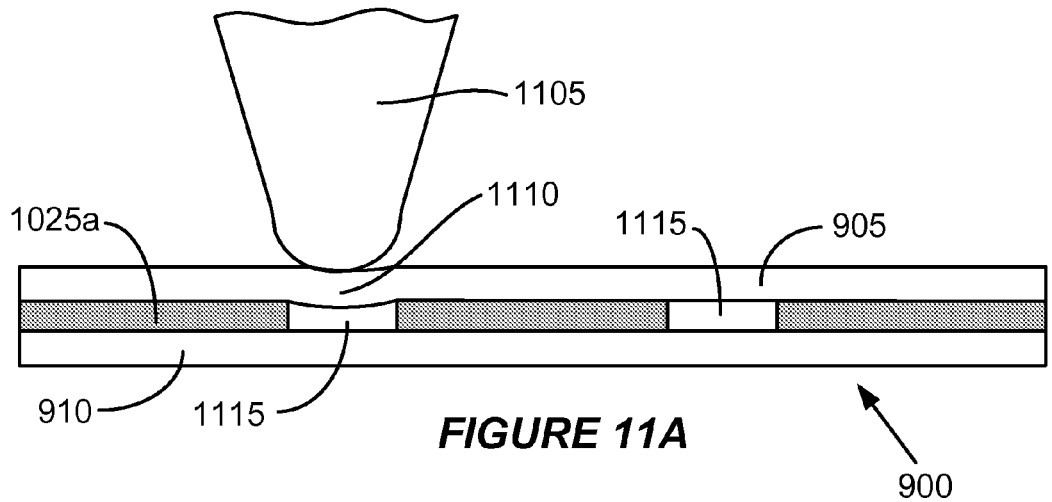
FIGS. 11A-11D show examples of cross-sectional views of combined sensor devices having high-modulus and low-modulus compressible layers.

FIGS. 11A-11D show examples of cross-sectional views of combined sensor devices having high-modulus and low-modulus compressible layers. FIG. 11A shows a stylus tip 1105 in contact with a flexible upper substrate 905 of a portion of a simplified combination touch, handwriting, and fingerprint sensor, wherein the compressible layer 1025a is a patterned high-modulus material that is sandwiched between the upper substrate 905 and the lower substrate 910. Air gaps 1115 in the compressible layer 1025a allow the upper substrate 905 of the combined sensor device 900 to deform with applied forces, although the deflected area 1110 obtained is limited in part by the small air gaps 1115 in the relatively stiff compressible layer 1025a.

Figure 11B:
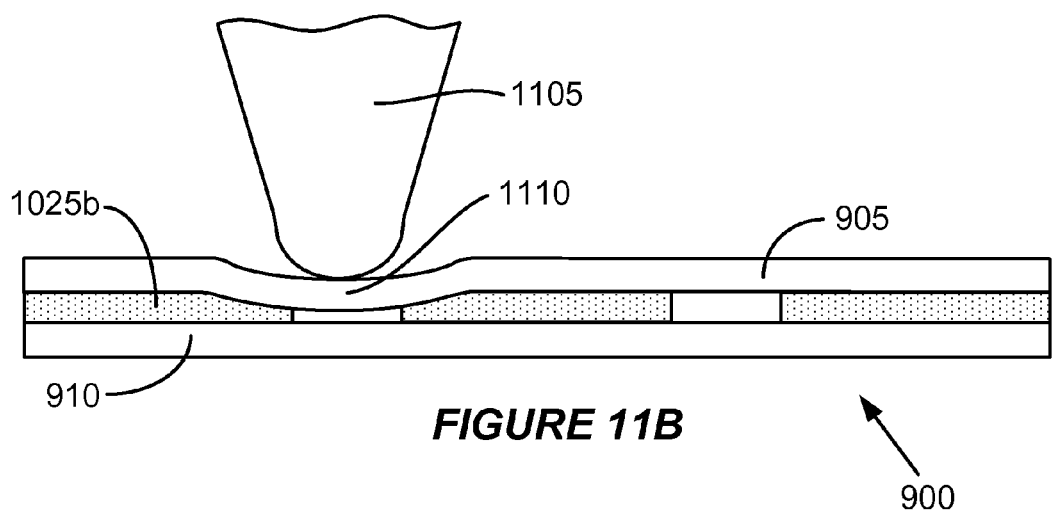
Figure 11C:
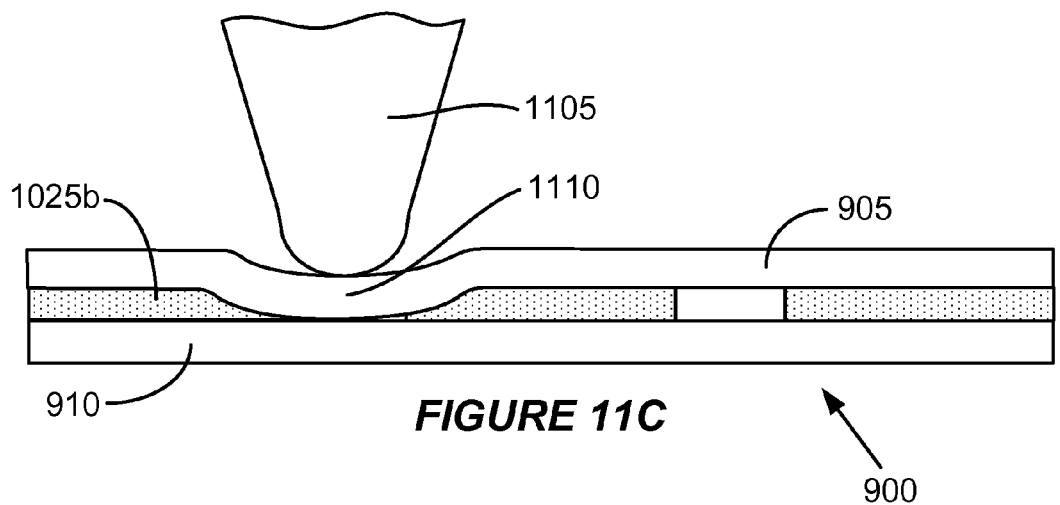

FIG. 11B shows a low-modulus compressible layer 1025b sandwiched between the relatively more flexible upper substrate 905 and the relatively less flexible lower substrate 910. In this example, the deflected area 1110 of the upper substrate 905 from stylus forces is larger due to the ability of the compressible layer 1025b to compress and deform as the stylus tip 1105 is pressed against the outer surface of the upper substrate 905. In the example shown in FIG. 11C, the stylus 1105 has been pressed hard enough for the flexible upper substrate 905 to make (or nearly make) physical contact with the lower substrate 910.

Figure 11D:
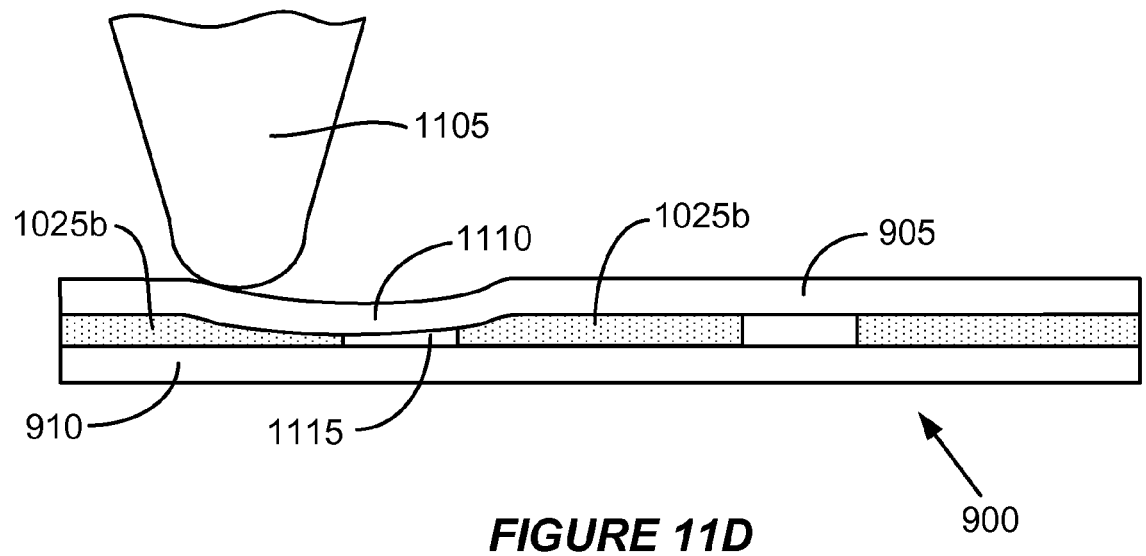

Use of a low-modulus elastomeric compressible layer 1025b also may effectively increase the lateral resolution from applied pressure or force without decreasing the pitch of the row or column electrodes, as illustrated in FIG. 11D. Appreciable deflections of the upper substrate 905 can occur even when the tip of the stylus tip 1105 is not directly above an air gap 1115 in the compressible layer 1025, thus allowing detection of the stylus tip 1105 even if the combined sensor device 900 has relatively wide spacings between adjacent sensing elements. For example, handwriting might be resolved at a resolution of 0.2 mm even if the pitch between adjacent rows or columns were 0.5 mm by averaging the responses from adjacent sensels. By allowing a relatively larger pitch between adjacent rows or columns, such configurations may enable the reduction of the total number of row electrodes and column electrodes for a given resolution, thereby reducing the number of I/Os on the handwriting sensor controller. This reduction can reduce the number of lead-outs and reduce the cost and complexity of the handwriting controller.

An alternative implementation of a combination sensor is shown in FIG. 10C. As compared to the implementations shown in FIGS. 10A and 10B, the air gaps have been removed from the areas 1065 of the handwriting and touch sensor zone 1005. Thus, the optical performance of the handwriting and touch sensor zone 1005 may be enhanced with respect to the implementation of the combined sensor device 900 shown in FIGS. 10A and 10B. The handwriting sensor in the implementation of the combined sensor device 900 shown in FIG. 10C functions as a variable parallel plate capacitor, where heavy touches or deflections of the upper layer are detected from changes in the parallel plate capacitance. This functionality is represented by the variable capacitor 1056 of the circuit diagram 1055c.

FIG. 10D illustrates another example of an alternative implementation. In the example shown in FIG. 10D, the air gaps have been removed in the area 1080 of the fingerprint sensor zone 1010 and replaced with a commercially available FSR material 1085. The FSR material 1085 provides a relatively high value of resistance when not compressed and a relatively low value of resistance when compressed, thereby functioning as a switch though without a direct contact region. This functionality is represented by the variable resistor 1087 of the circuit diagram 1060b. A fixed resistor 1045 such as a vertical resistor or a serpentine resistor may be included in series with the FSR material 1085 in each sensel. Transparent FSR material 1085 that includes either transparent particles or low fill ratios of particles may be used in some implementations. Non-transparent FSR material 1085 may be used in some applications where, for example, the diameter or width of the resistors is sufficiently small (on the order of a few to tens of microns) to avoid excessive occlusion of an underlying display.

Figure 12:
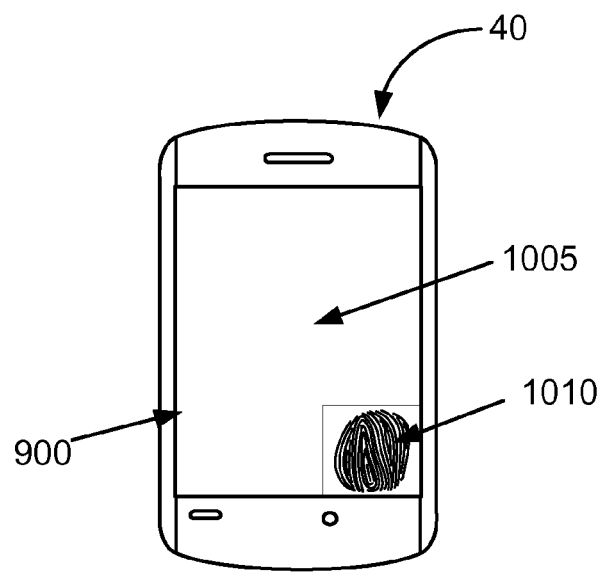
FIG. 12 shows an example of a device that includes a cover glass with a combination touch, handwriting and fingerprint sensor.

FIG. 12 shows an example of a device that includes a cover glass with a combination touch, handwriting and fingerprint sensor. In this example, the cover glass includes an implementation of the combined sensor device 900 and is overlaid on the display of a display device 40, such as a mobile phone. Some examples of the display device 40 are described below with reference to FIGS. 25A and 25B. The combined sensor device 900 can serve as a single or multi-touch sensor, a handwriting input sensor, and a fingerprint image sensor. In this example, the fingerprint sensor zone 1010 is in a dedicated portion above the display. The remaining portion of the combined sensor device 900 is configured as the handwriting and touch sensor zone 1005. In some other configurations, fingerprint sensor zone 1010 may be positioned anywhere throughout the combined sensor device 900. In yet other configurations, the position of fingerprint sensor zone 1010 is software programmable and software selectable.

An example of touch mode operation will now be described with reference to FIG. 10A. When a finger is used to touch anywhere in the handwriting and touch sensor zone 1005, either all or a selected subset of the upper electrodes 1015 on the upper substrate 905 and the lower electrodes 1030b on the lower substrate 910 may be addressed during a scanning sequence. In some implementations, the capacitance between the upper electrodes 1015 and the lower electrodes 1030b may be measured at each of the intersections between row and column electrodes (see FIGS. 9A and 9B). The conducting surface of the finger 1047 interferes with the electric field lines 1050, as shown in FIGS. 10A-10D, and modifies the capacitance between the upper electrodes 1015 and the lower electrodes 1030b. Detecting this change in capacitance allows a reading of which sensels of the handwriting and touch sensor zone 1005 are in the vicinity of the finger. In this example, the electrodes on the upper substrate 905 and the lower substrate 910 that are scanned during touch mode are not necessarily disposed directly above and below each other. In the examples shown in FIGS. 10A-10D, a change in capacitance can be detected between an upper electrode 1015 on the upper substrate 905 and an adjacent lower electrode 1030b of the lower substrate 910. Note that for this PCT measurement, a very light touch or even the proximity of a finger may be detectable, because the capacitance change does not depend on the pressure being applied to the upper substrate 905.

When a pointing device, such as a stylus (either conducting or non-conducting) is placed on the sensor surface, the resultant pressure can be significantly higher than that associated with a finger touch, due to the smaller area of contact between the stylus and the surface. This pressure can be up to two orders of magnitude (or more) greater than the pressure exerted by a finger touch. In some implementations, during the readout process in handwriting mode, a different set of electrodes from those used for the touch mode (such as upper electrodes 1015 and lower electrodes 1030a depicted in FIG. 10A) may be excited and a different circuit may be deployed for the measurement. The different circuit may sense either the closure of a switch for an implementation such as that shown in FIG. 10A, or the change in parallel plate capacitance for an implementation such as that shown in FIGS. 10B-10D.

In some implementations, the addressing and/or measurement circuitry for a touch mode, handwriting mode and/or fingerprint sensing mode may be contained within one or more controller or driver Application Specific Integrated Circuit (ASIC) chips. The ASIC chip or chips may be attached directly to the underside of the upper substrate 905 or connected electrically to the electrodes on the upper substrate 905 and the lower substrate 910 by means such as direct die attach using solder or anisotropic conductive film, or connection through a cable or traces on a flex tape that are coupled to ICs on the tape or on an external printed circuit board.

In some implementations described above, the electrodes scanned during the handwriting mode on the upper substrate 905 and the lower substrate 910 are disposed directly above and below each other (for example, see FIG. 10A). When the stylus tip 1105 (which may be a tip of pen 1042 as shown in FIG. 10A or 10B) is applied with sufficient force, the pressure exerted by the stylus tip 1105 may cause the upper substrate 905 and the compressible layer 1025 to deflect (see FIG. 11C) and may cause the upper electrodes 1015 and the resistor 1035 on the lower electrode 1030a to make physical contact, resulting in a closure of a membrane switch (see FIG. 10A). A large resistance at each switch may be enabled by the inclusion of a fixed resistor 1035. This resistance may substantially lower the current and allow determination of the sensel locations that are being pressed in the handwriting, fingerprint or touch mode when one or more membrane switches are being pressed simultaneously. This may occur, for example, when a palm is resting on the surface of the combined sensor device 900 and a stylus is also applied to the surface. The resistor 1035 may be formed from a resistive layer that is fabricated to be in series with the lower electrodes 1030a. Alternatively, the displacement of the upper substrate 905 with the force or pressure from a stylus or finger on the outer surface can be measured from a change in the parallel plate capacitance between an upper electrode 1015 and a corresponding lower electrode 1030a.

Some implementations allow operation of the combined sensor device 900 in a fingerprint acquisition mode, such as in a specific region of the combined sensor device 900 that is configured to enable this mode. Examples of fingerprint sensor zones 1010 are shown in the far right portion of FIGS. 10A-10D and in the lower right portion of FIG. 12. In some implementations, the fingerprint sensor zones 1010 may be fabricated using the same process flow and materials as those used for fabricating the rest of the combined sensor device 900. However, in some implementations, the fingerprint sensor zone 1010, the upper fingerprint electrodes 1020 and the lower fingerprint electrodes 1040, as well as the resistors 1045 of the lower fingerprint electrodes 1040, may be arranged with a significantly closer pitch or spacing than the upper electrodes 1015 or the lower electrodes 1030 of the handwriting and touch sensor zone 1005. For example, the pitch or spacing in the fingerprint sensor zone 1010 may be on the order of about 10 microns to 100 microns. Such configurations can provide a sensor with sufficiently high resolution to distinguish between the ridges and valleys of a fingerprint.

When a finger is pressed down on the surface of the upper substrate 905 in the fingerprint sensor zone 1010, certain regions of the upper substrate 905 that are directly below the ridges of the fingerprint may deflect and cause the upper fingerprint electrodes 1020 to make contact with the fixed resistors 1045 on the lower fingerprint electrodes 1040. This switch closure may be through a resistor, such as a large value resistor, which can provide for distinguishing which of the many sensor elements are being pressed and which are not. Scanning rows or columns of such a fingerprint sensor array can produce digital output that represents the fingerprint ridges or absence of the same. Such fingerprint sensor implementations can enable scanning of the fingerprint array and acquisition of a fingerprint image.

The use of the digital resistive technique for handwriting and fingerprint recognition can result in a fast scan rate. This is due in part to the "digital" nature of the output from each cell during the scanning process, which can enable high frame rates for fingerprint capture and handwriting recognition.

In some implementations, a force-sensitive membrane switch may be used to locally connect an extra capacitor into a PCT measurement circuit, thus causing a large change in capacitance when the switch is closed with applied pressure from, for example, a finger or a stylus tip. The switches may be formed near the intersections of sensor rows and columns. The extra capacitor may be formed in series with the switch using conductive material to connect with row and column lines. In some implementations, this capacitor can produce a large change in capacitance relative to the change in mutual capacitance of a PCT-only configuration.

One such implementation is depicted in FIGS. 13 and 14. FIG. 13 shows an example of a top view of a force-sensitive switch implementation. FIG. 13 indicates portions of two columns and two rows of such a combined sensor device 900, wherein the column electrodes 1305 have a width 1310 and a spacing or "pitch" 1315. The widths of the column and row electrodes are generally made small, on the order of a few microns, to improve overall transparency of the combined sensor device. The pitch can range from about 10-50 microns, suitable for fingerprint detection, to about 5 mm for lower resolution devices. Alternative implementations may have pitches of less than 50 microns or more than 5 mm. FIG. 14 shows an example of a cross-section through a row of the force-sensitive switch implementation shown in FIG. 13.

In the implementation depicted in FIGS. 13 and 14, a capacitor 1317 is formed over the rows between the row electrodes 1335 and the capacitor top electrode 1320 in each sensel. A connection between the column electrodes 1305 and the capacitors 1317 may be made through a contact 1325 at the intersection of the rows and columns, which may include a fixed resistor in series with the contact. This contact 1325 may be electrically connected to the capacitor top electrode 1320, forming an electrode of a switch that may be open or closed. In some alternative configurations there may be no separate contact 1325—physical contact may be made directly between the column electrode 1305 and the capacitor top electrode 1320. The row electrodes 1335 may be disposed on a substantially transparent lower substrate 910, which may be made of a material such as glass, plastic, etc. In some implementations, the other components depicted in FIGS. 13 and 14 also may be substantially transparent.

In this example, a compressible layer 1025 is disposed between the upper substrate 905 and the capacitor top electrode 1320. The compressible layer 1025 may be an insulator that is formed of a material having a sufficiently low elastic modulus that may be easily compressed and does not interfere with the switch to the capacitor. Here, the upper substrate 905 is a flexible membrane disposed on top of the sensor to protect the surface and yet deflect locally when touched, in order to actuate the switches.

Figure 15A:
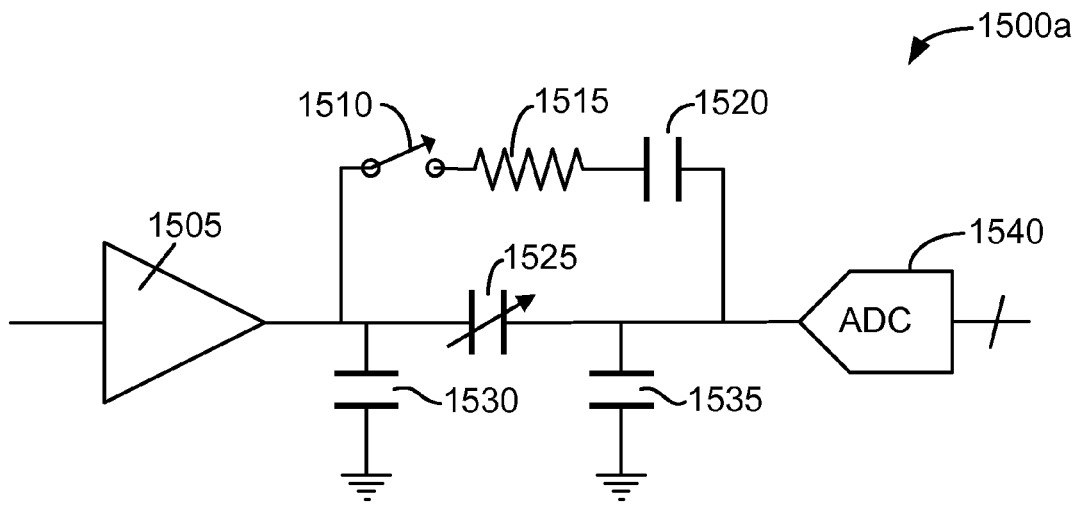
FIG. 15A shows an example of a circuit diagram that represents components of the implementation shown in FIGS. 13 and 14.

FIG. 15A shows an example of a circuit diagram that represents components of the implementation shown in FIGS. 13 and 14. In the circuit 1500a, a signal may be applied at the input 1505 and sensed by the analog-to-digital converter (ADC) 1540. The signal may be modulated by a change in mutual capacitance, $C_m$, when a finger is on or near the flexible membrane. Such changes in $C_m$ are represented by a variable capacitor 1525. The self-capacitances of rows and columns are represented by capacitors 1530 and 1535, respectively. The contacts at the intersection of the rows and columns (see FIGS. 13 and 14) are represented as a switch 1510 having a resistance R1 represented by the resistor 1515 and a capacitance C1 represented by the series capacitor 1520. The resistance R1 also may include the line resistance of the corresponding row or column electrodes. When force (such as a touch) on the flexible upper substrate 905 closes the switch 1510, capacitance C1 is added to the mutual capacitance $C_m$. In some implementations, C1 is substantially larger than $C_m$ because a touch can generally reduce $C_m$ whereas closing the switch 1510 adds capacitance: when the switch is closed, the mutual capacitive effect of the touch may be masked by the value of C1.

In one example, a high-resolution sensor may be formed having row and column widths of 5 um and a pitch of 50 um between rows and columns (for example, see FIGS. 13 and 14). If, for example, the capacitor insulator 1330 is 1000 Å thick and formed of silicon nitride (SiN), and the capacitor top electrodes 1320 cover a 40 um×5 um area (see FIG. 14), a modulation of greater than 60 femtofarads (fF) may be obtained using the parallel-plate capacitor equation $C = e_r e_o A/d$ where $e_r$ is the relative permittivity of the insulator, $e_o$ is the permittivity of free space, A is the area of the top electrodes, and d is the thickness of the dielectric. In some implementations, this can be considered adequate for determination by PCT controller circuitry. Decreasing the length or the width of the capacitor electrodes will decrease the capacitance value, whereas decreasing the thickness of the dielectric insulator will increase the capacitance. In some implementations, the capacitance value can be made appreciably larger by spanning a portion of the sensel area between the row and column electrodes with the capacitor top electrode or by increasing the row and column widths. In some implementations, the value of the capacitance can be reduced by reducing the electrode width or the pitch of the sensel. By changing the dimensions of the capacitor electrodes and the thickness of the insulator, values of capacitance in the range from less than about 10 fF to more than about 0.1 pF may be obtained.

Figure 15B:
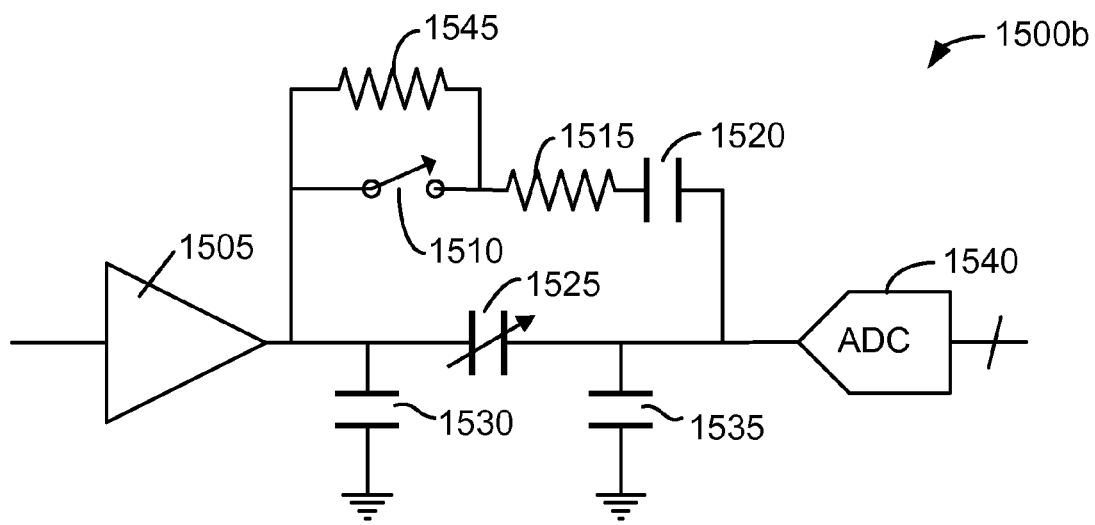
FIG. 15B shows an example of a circuit diagram that represents components of an alternative implementation related to FIGS. 13 and 14.

FIG. 15B shows an example of a circuit diagram that represents components of an alternative implementation related to FIGS. 13 and 14. The circuit 1500b can be used to consider the response times for a sensor such as that depicted in FIGS. 13 and 14. Here, a leakage resistor 1545 having a resistance R2 has been added to the circuit to allow for the discharge of series capacitor 1520 when switch 1510 is open. If, for example, R2 were 100 megaohms and R1 were 10 kilohms, then the frequency response (1/RC) for the C1 value for a 40 um×5 um capacitor as described above would be a minimum of 150 KHz for a closed-to-open transition of the switch 1510 and a maximum value of 1.5 GHz to charge the capacitor though the series resistor 1515 when switch 1510 is closed. The frequency response may be helpful in determining a minimum obtainable frame rate for the combination sensor. The frequency response and frame rate may be increased, if needed, by decreasing the RC time constant with reductions to the resistor values R1 or R2 or with reductions in the capacitance.

In some implementations, the resistor 1515 represents the contact resistance of contact 1325 (e.g., no fixed resistor and no FSR). In some other implementations, the resistor 1515 represents the contact resistance directly between the column electrode 1305 and the capacitor top electrode 1320 as shown in FIG. 14 (e.g., no fixed resistor, no FSR, and no contact 1325). In some implementations, the resistor 1515 may include the resistance of an additional fixed resistor such as a vertical or serpentine fixed resistor (not shown) positioned between a contact 1325 and the capacitor top electrode 1320 in FIG. 14. The fixed resistor may include a thin-film conductive cap disposed thereon serving as the contact 1325 to aid in electrical contact with a column electrode 1305. The resistor 1515 may include a force-sensitive resistor in series with a fixed resistor or in lieu of a fixed resistor. The resistor 1515 may include an ohmic material such as a resistive or metal thin film. Alternatively, the resistor 1515 may include a non-linear device such as a leaky diode or other device. According to some implementations, the resistor 1515 may have a resistance ranging from less than a few ohms to over 100 megaohms. In some implementations, the leakage resistor 1545 may have a value on the order of 100 kilohms or larger.

The switched capacitor configuration described with respect to FIGS. 13 through 15B encompass what may be called digital capacitive touch (DCT), in that a local capacitor near the intersection of a row and a column of a DCT sensor array can be digitally switched in or out, depending on whether a force-actuated switch at the intersection is open or closed. The DCT array, in some configurations, may serve as a fingerprint sensor, a stylus or handwriting sensor, a touch sensor, or a combination thereof without a corresponding PCT array. The DCT array, in some other configurations, may be combined with a PCT array. In one such configuration, one or more capacitive electrodes electrically connected near each intersection between overlapping rows and columns in an array surround a force-actuated capacitive switch located at each intersection (for example, see FIG. 9B). The combined sensor array may use the force-sensitive capacitive switch for stylus detection and the PCT array for light touch or proximity sensing. As noted above, the same PCT detection circuitry may be used for detecting the application of force or pressure from the pressing of a stylus, pen or finger in the DCT aspect, as well as the light touch from a finger or stylus in the PCT aspect. As noted earlier, the designations regarding rows and columns, the manner of overlapping, the various aspect ratios, and other features are intended to be illustrative and not limiting. For example, the rows and columns may be interchanged, the column electrodes may pass over or under the row electrodes, and the pitch or resolution may be changed without loss of generality.

Figure 16:
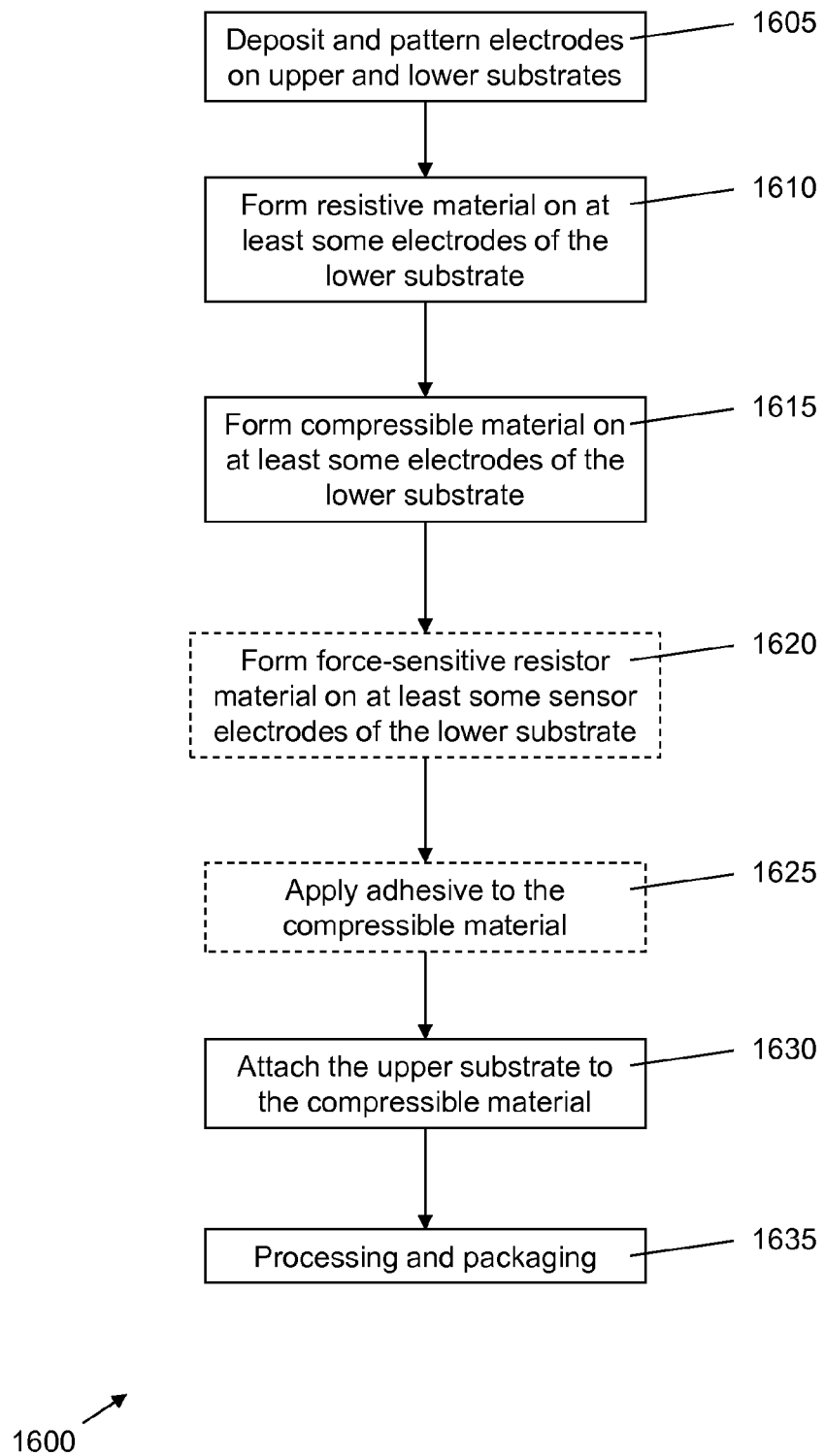
FIG. 16 shows an example of a flow diagram illustrating a manufacturing process for a combined sensor device.

FIG. 16 shows an example of a flow diagram illustrating a manufacturing process for a combined sensor device. FIGS. 17A-17D show examples of partially formed combined sensor devices during various stages of the manufacturing process of FIG. 16. According to some implementations, block 1605 of the process 1600 involves depositing a substantially transparent conductor, such as ITO, on upper and lower substantially transparent substrates. In this example, the lower substrate 910 is a glass substrate. However, in alternative implementations, the lower substrate 910 may be formed of plastic or a similar material. Some such implementations can lend themselves to a roll-to-roll manufacturing process.

Block 1605 also may involve patterning the substantially transparent conductive material into electrodes, using photolithography and etching processes or other "additive" processes such as plating, screen printing, etc. In some implementations, this patterning process results in diamond electrode shapes (or other shapes as appropriate), connected to one another within columns or rows patterned on the upper substrate 905 and the lower substrate 910.

A resistive material may subsequently be deposited (e.g., by sputter deposition) on at least some electrodes of the lower substrate 910 and on or connected to the patterned electrodes, as shown in block 1610. In alternative implementations, resistive material may be deposited on at least some electrodes of the upper substrate 905. The resistive material may be patterned to be in series with all or a subset of the sensing locations on the electrodes. According to some implementations, the resulting resistors may have a resistance on the order of 1 megaohm; other implementations may produce resistors having a smaller or greater resistance such as between 100 kilohm and 10 megaohm.

Figure 17A:
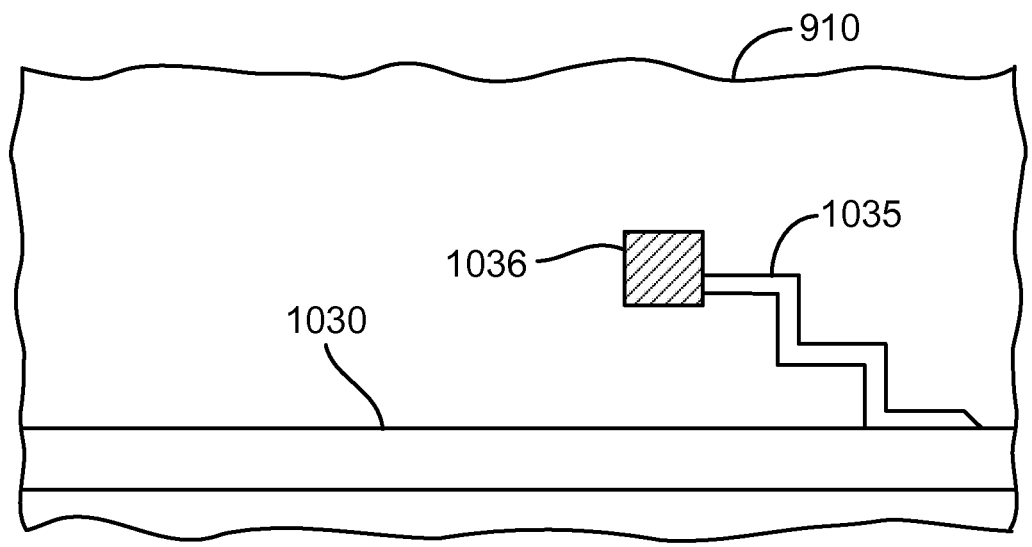
FIGS. 17A-17D show examples of partially formed combined sensor devices during various stages of the manufacturing process of FIG. 16.
Figure 17B:
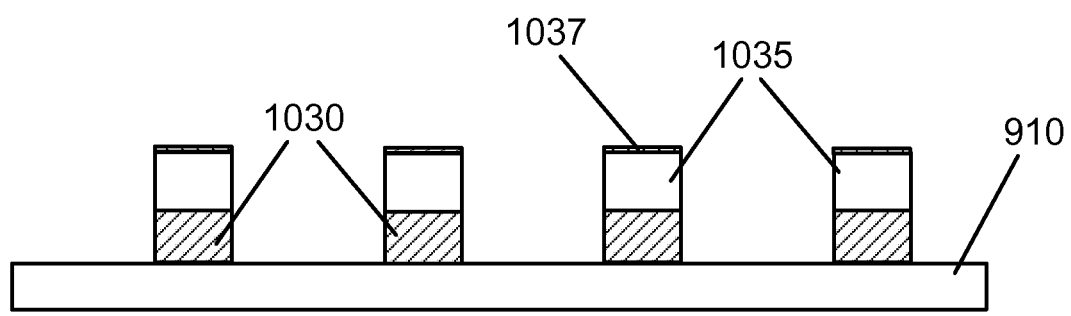

The electrodes and resistors may be patterned in at least two general ways, as shown in FIGS. 17A and 17B. A first option (top view illustrated in FIG. 17A) is to form a serpentine resistor 1035 by patterning the lower electrode material or other resistive material deposited on lower substrate 910 into a thin, narrow sequence of one or more connected segments that conduct in the plane of the film to achieve a sufficiently high resistance. A conductive contact region 1036 formed from the lower electrode material or other suitable material may be included at the end of the resistor 1035. A second option (side view illustrated in FIG. 17B) is to pattern a vertical resistor 1035 directly on top of the lower electrodes 1030, in which case the conduction path is through the resistor in a direction substantially normal to the plane of the film. In some implementations, a thin metal contact region 1037 may be included above the vertical resistor 1035.

Figure 17C:
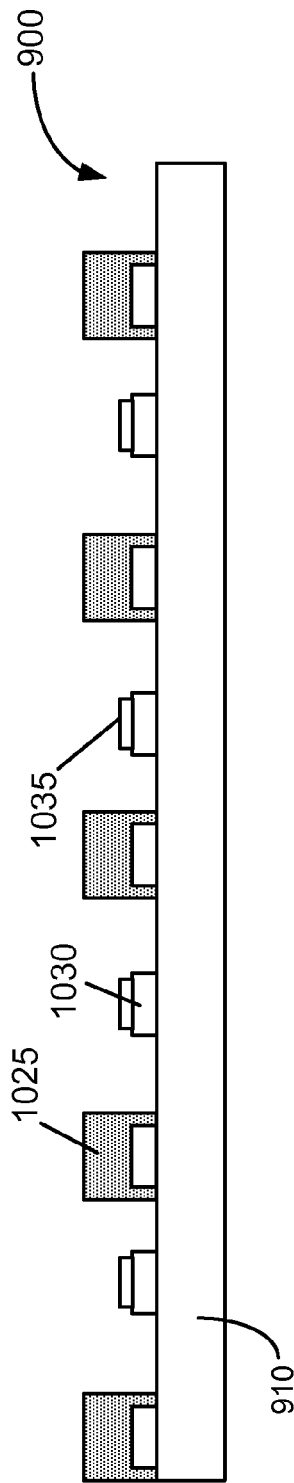

Block 1615 of the process 1600 may involve depositing or otherwise disposing the compressible layer 1025 on the lower substrate 910. In some implementations, the compressible layer 1025 may be a patternable, thin (e.g., 1 to 10 microns) polymer with a low elastic modulus, such as an elastomer. In some implementations that include gaps in the compressible layer 1025 (such as those discussed above with reference to FIGS. 10A-10C), the compressible layer 1025 may be patterned such that the regions above the resistors 1035 are opened up. FIG. 17C provides a cross-sectional view of a portion of a combined sensor device 900 that has been partially fabricated according to one such example. In some other implementations, the regions above resistors 1035 that are opened up may be filled with a force-sensitive resistor material (not shown). In some other implementations with or without the FSR material, an upper surface of vertical or serpentine resistors 1035 may be covered with a thin metal layer.

At this stage of the process 1600, the compressible layer 1025 has been patterned to expose the lower electrodes 1030 on which the resistors 1035 have been formed. In some implementations of the process 1600, FSR material may be formed on fingerprint sensor electrodes of the lower substrate 910 (see optional block 1620), the handwriting and touch sensor electrodes of the lower substrate 910, or both. FIG. 10D provides an example of the force-sensitive resistor material 1085 formed on the lower fingerprint electrodes 1040. The force-sensitive material may be formed on the electrodes by methods such as dispensing, screening, depositing, or patterning. Force-sensitive resistor material also may be included on the handwriting and touch sensor electrodes of the lower substrate 910 (not shown).

Subsequent to the patterning and curing (if needed) of the compressible layer 1025, an additional thin layer of adhesive 1705 (such as ~1-5 microns) may be applied on the surface of the compressible layer 1025 (see optional block 1625) to improve adhesion, taking care not to apply the adhesive on the top surface of the resistors 1035. Methods to apply the adhesive include photolithography, screen printing, squeegeeing, and dispensing. An example of such an adhesive layer 1705 may be seen in FIG. 17D.

Figure 17D:
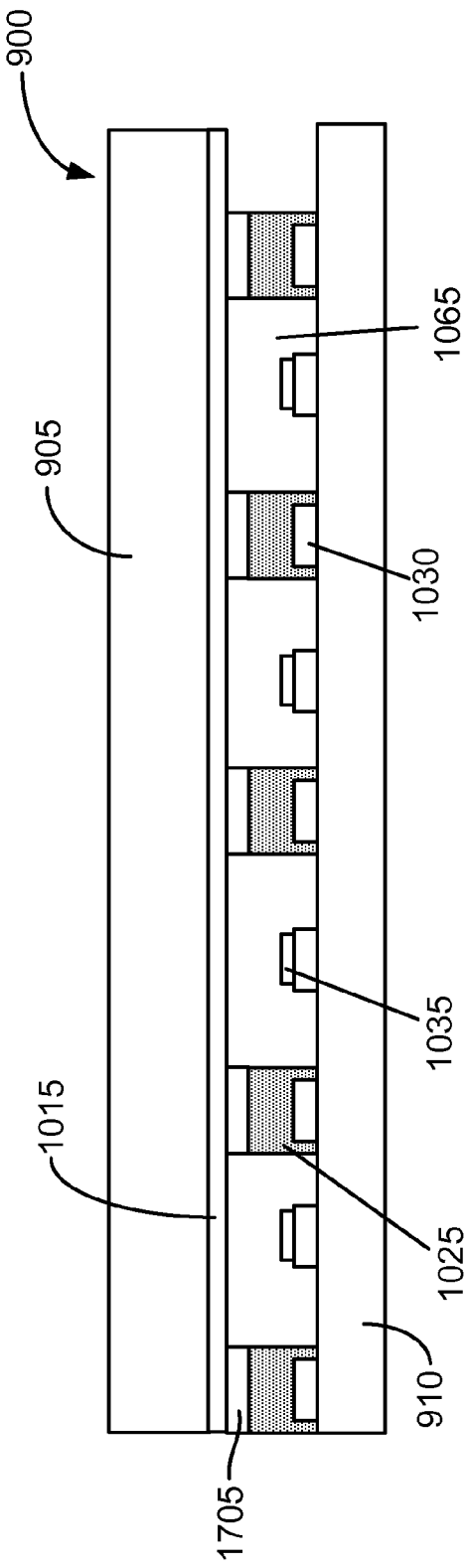

FIG. 17D depicts the apparatus after the upper substrate 905 has been joined to the compressible layer 1025. The upper substrate 905 may be formed of a substantially transparent material and may have substantially transparent upper electrodes 1015 patterned on the underside. The upper substrate 905 may, for example, be formed of a plastic film such as polyethylene terephthalate (PET), polyethylene naphthalate (PEN), polyimide, or a similar material. In this example, the upper electrodes 1015 are made of ITO that has been formed into rows that are continuous in the plane of FIG. 17D. In alternative implementations, the upper electrodes 1015 as well as the lower electrodes 1030 may be patterned into similarly-shaped pads, connected as rows or columns. In some implementations, the two substrates may be joined by bringing the upper substrate 905 into alignment with the lower substrate 910 and attaching the layers via the adhesive 1705 that has been applied over the compressible layer 1025. Other techniques may be used, such as hot pressing the two layers together, mechanical clamping the periphery of the substrates, or an adhesive-free method.

Implementations such as those depicted in FIGS. 17C and 17D include air gaps in the compressible layer 1025 around the electrodes on which resistors have been formed. Such air gaps are depicted in areas 1065 of FIG. 17D. Air gaps can result in higher levels of undesirable reflectance from the air-substrate interfaces. Details are described above with reference to Equation 1. Accordingly, in some implementations, the air gap regions may be spatially limited, so that the air gaps do not materially impact the overall optical transmission of the stack. For example, the air gap regions may be limited to an area in the range of 1-5% of the total area of the sensor. Alternatively, the air gaps may be limited to the region of the fingerprint imaging area only, which may be a limited region of lower optical transmission, and therefore may be on the cover glass but not directly above the display area.

In alternative implementations, such as the examples described with reference to FIGS. 10C and 10D, the compressible layer 1025 also may be deposited on at least some of the lower electrodes 1030 on which the resistors 1035 have been formed. In some such implementations, there are no air gaps in the handwriting and touch sensor zone 1005. However, other electrodes on which resistors have been formed (such as in the fingerprint sensor zone 1010) may or may not have the compressible layer 1025 deposited on them. In still other implementations, however, the fingerprint sensor zone 1010 may include no air gaps. As shown in FIG. 10D, such implementations may include FSR material 1085 in the fingerprint sensor zone 1010. In some other implementations, the FSR material 1085 also may be included above lower electrodes 1030 in the handwriting and touch sensor zone 1005, with or without fixed vertical or serpentine resistors 1035.

Some implementations of the process 1600 involve a process flow with relatively few masking steps. Some such implementations involve two masking steps for depositing material on the lower substrate 910 and a single masking step for depositing material on the upper substrate 905. Structures may be formed on at least the upper substrate 905 using roll-to-roll manufacturing processes. For implementations wherein the lower substrate 910 is plastic or a similar material, a roll-to-roll manufacturing process may be used for depositing material on the lower substrate 910. In such implementations, the lower substrate 910 may be thicker than the upper substrate 905. In some examples, the upper substrate 905 may be laminated onto the lower substrate 910 to form the sensor stacks described above. The resultant combined sensor device 900 may be inexpensive, light, thin and highly suitable for mobile and other handheld electronic devices. In some implementations, this laminate of an upper plastic layer and a lower plastic layer may be further laminated onto or otherwise attached to a substantially transparent and relatively more rigid substrate, such as a glass substrate. In some implementations, the substantially transparent substrate may be a display substrate such as the transparent substrate 20 described above.

In this implementation, block 1635 involves processing and packaging. Block 1635 may involve the singulation of individual combined sensor devices 900 from large substrates such as large plates of glass or long rolls of plastic having multiple combined sensor devices 900 formed thereon by cutting, cleaving, sawing, or other suitable methods. Singulation of sensor devices from larger substrates may be performed prior to block 1635, such as prior to attaching the upper substrate (see block 1630) or prior to applying adhesive to the compressible material (see block 1625). Block 1635 may involve configuring combined sensor devices 900 for electrical communication with one or more sensor controllers, such as the combined sensor controller 77 described below with reference to FIG. 25B. Block 1635 may involve attaching combined sensor devices 900 to a display device 40 such as described elsewhere herein. Block 1635 may involve packaging individual combined sensor devices 900 for shipment or storage.

Figure 18A:
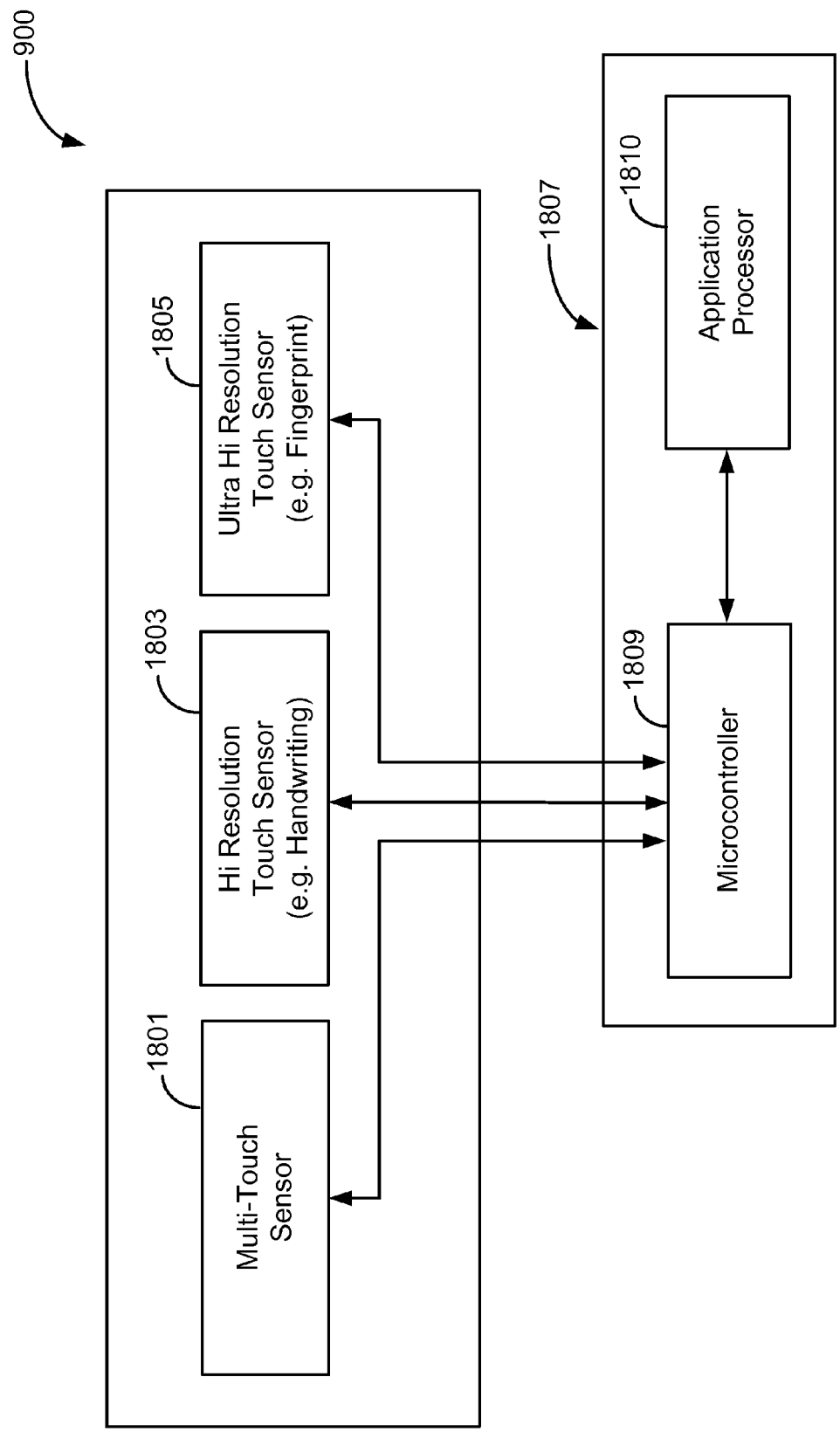
FIG. 18A shows an example of a block diagram that illustrates a high-level architecture of a combined sensor device.

FIG. 18A shows an example of a block diagram that illustrates a high-level architecture of a combined sensor device. In this example, a multi-touch sensor 1801, a high resolution handwriting sensor 1803, and a fingerprint sensor 1805 are integrated into the combined sensor device 900. A cover glass included with the combined sensor device 900 can be overlaid onto many displays, including but not limited to LCD, OLED and reflective displays. Some such displays may be displays suitable for mobile devices and some may be suitable for other devices, such as consumer electronic devices, depending on the implementation. The multi-touch sensor 1801, such as a PCT sensor, and the high-resolution handwriting sensor 1803, such as a parallel-plate capacitive displacement sensor or a DRT sensor, may be interleaved at the intersection of rows and columns of an addressable sensor device as described above with respect to FIGS. 9A and 9B and FIGS. 10A-10D. The fingerprint sensor 1805 with even higher resolution may be included in a preselected region over a portion of the display area, such as in the example shown in FIG. 12. Alternatively, the multi-touch sensor 1801 and the high-resolution handwriting sensor 1803 may serve as a fingerprint sensor 1805 anywhere above the display area when the combined sensor device has sufficient resolution.

In the example shown in FIG. 18A, the control system 1807 includes at least one microcontroller 1809 and at least one application processor 1810. In some implementations, hardware, software and/or firmware for all sensors of the combined sensor device 900 may be integrated on a single microcontroller 1809, whereas in other implementations separate microcontrollers 1809 may be used for touch sensing, handwriting sensing and fingerprint sensing functionality. Applications for all sensors may be integrated on a single application processor 1810 or on multiple application processors 1810. These processors may reside, for example, within a display device or within a mobile device.

Here, the sensors in the combined sensor device 900 communicate with the microcontroller 1809, which in turn communicates with application processor 1810. The communication between these devices may go in both directions. In some implementations, the microcontroller 1809 drives the sensors of the combined sensor device 900 and receives sense data from the sensors. The application processor 1810 may be configured both to monitor the output of the microcontroller 1809 and to send commands to the microcontroller 1809. The microcontroller 1809 may, for example, be located on the lower substrate 910, on an attached flex cable, or on an electrically connected printed circuit board. In some implementations, the microcontroller 1809 also may be configured to control a display and/or to perform other functions.

Some implementations may be provided via application software stored in one or more tangible, machine-readable media. Such media may be part of the applications processor 1810 or may be separate media accessible by the applications processor 1810. The application software may include instructions for controlling one or more devices to perform various functions. For example, the application software may include instructions to activate the fingerprint sensor zone 1010 for fingerprint sensing only when fingerprint sensing is needed. Otherwise, the fingerprint sensor zone 1010 may be de-activated or activated for multi-touch and/or handwriting functionality, depending on the implementation.

Alternatively, or additionally, the application software may include instructions to reduce power consumption by turning off sensors, turning off parts of the microcontroller 1809 and/or employing first-level screening at a reduced frame rate on a low-resolution sensor before activating power-hungry higher-resolution sensors. For example, the application software may include instructions for reducing power consumption by aggregating sensels (or aggregating rows or columns of the combined sensor device 900) electronically using the microcontroller 1809, so that the combined sensor device 900 performs at a lower resolution and may consume less power and provide a higher signal until higher resolution is needed.

In some implementations, the combined sensor device 900 can be configured to function in either a touch mode or a handwriting mode (which also may be referred to herein as a stylus mode), instead of being configured to function in both modes simultaneously. It may be advantageous not to have the combined sensor device 900 function in both modes simultaneously. For example, when a user is writing on the combined sensor device 900 with a stylus, it may be preferable to avoid sensing the user's palm or fingers that also may be resting on the device. Operating the combined sensor device 900 to function as a handwriting sensor may influence and/or interfere with the combined sensor device 900's functionality as a touch sensor, and vice versa. Accordingly, some implementations provide separate drive and/or sense subsystems for touch and handwriting mode functionality. Some implementations provide drive and/or sense subsystems that may be switched quickly between touch mode functionality and handwriting mode functionality.

Figure 18B:
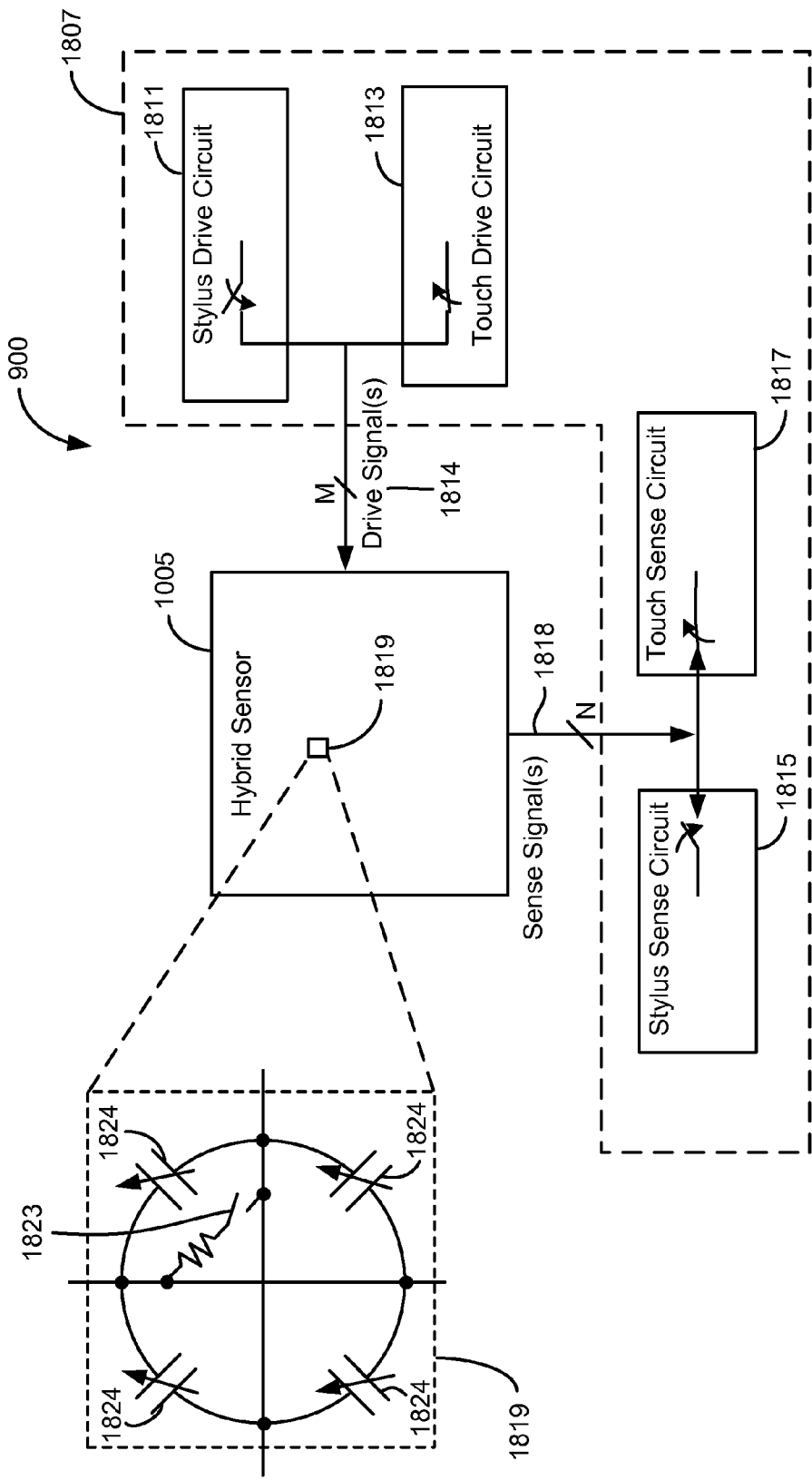
FIG. 18B shows an example of a block diagram that illustrates a control system for a combined sensor device.

FIG. 18B shows an example of a block diagram that illustrates a control system for a combined sensor device. In this example, the control system 1807 includes a stylus drive circuit 1811 and a touch drive circuit 1813. When the combined sensor device 900 is being operated in a handwriting mode, the stylus drive circuit 1811 sends one or more drive signals 1814 to the handwriting and touch sensor zone 1005. When the combined sensor device 900 is being operated in a touch mode, the touch drive circuit 1813 sends the drive signals 1814 to the handwriting and touch sensor zone 1005. However, in some alternative implementations, the drive signals 1814 are substantially the same whether the combined sensor device 900 is being operated in a handwriting mode or in a touch mode.

In this example, the control system 1807 includes a stylus sense circuit 1815 and a touch sense circuit 1817. When the combined sensor device 900 is being operated in a handwriting mode, the stylus sense circuit 1815 processes one or more sense signals 1818 from the handwriting and touch sensor zone 1005. When the combined sensor device 900 is being operated in a touch mode, the touch sense circuit 1817 processes the sense signals 1818 from the handwriting and touch sensor zone 1005. In some implementations, the control system 1807 may include a single circuit that can be switched from a touch configuration to a handwriting configuration. Some examples are described below.

FIG. 18B also shows an example of a circuit diagram representing components of a sensel 1819 in the handwriting and touch sensor zone 1005. In this enlarged view of the sensel 1819, the resistance of a switch 1823 is schematically depicted, as well as the mutual capacitance 1824 between associated electrodes of the sensel 1819.

Figure 18C:
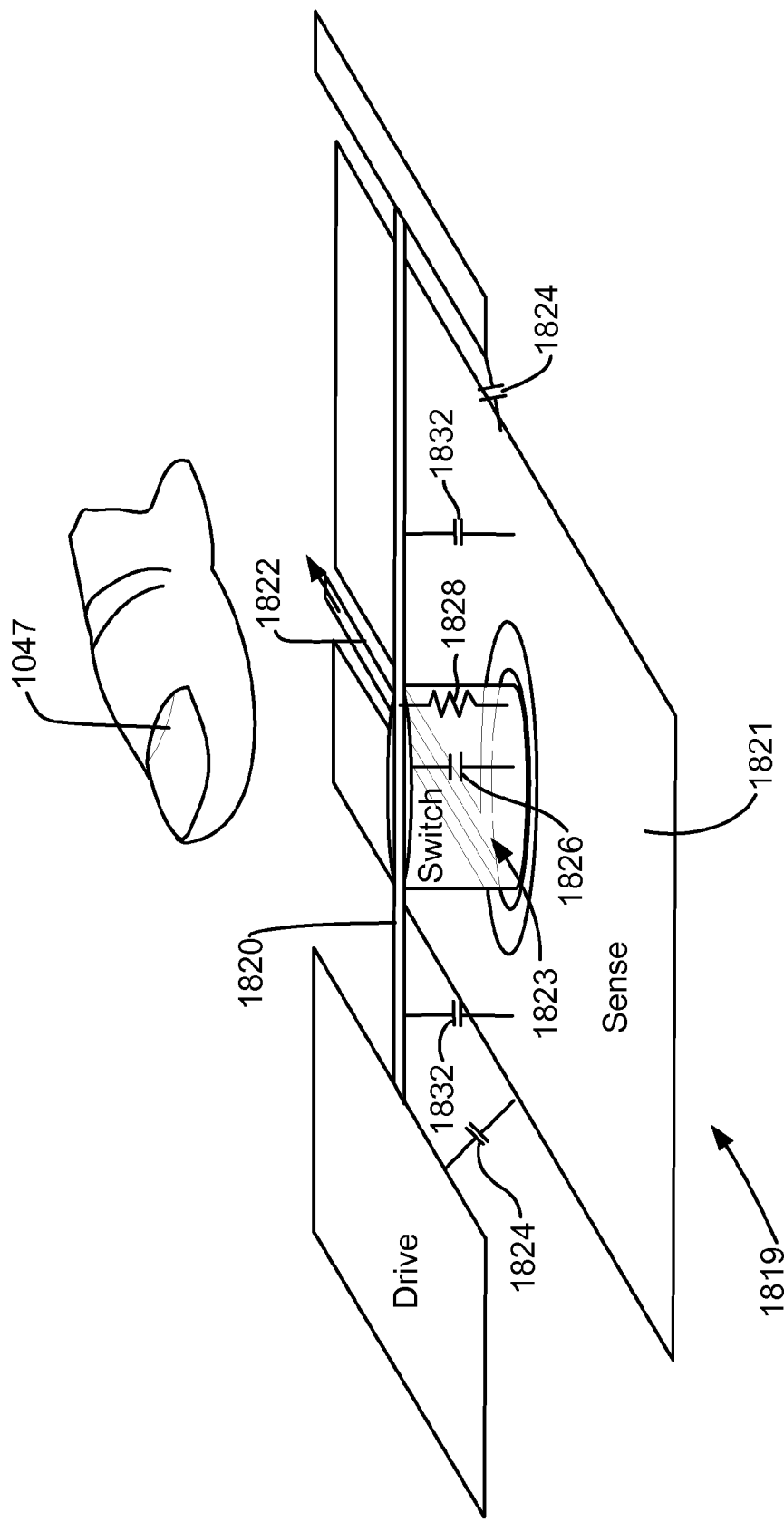
FIG. 18C shows an example representation of physical components and their electrical equivalents for a sensel in a combined sensor device.

FIG. 18C shows an example representation of physical components and their electrical equivalents for a sensel in a combined sensor device. In this example, the sensel 1819 includes a switch 1823 formed in an overlapping region between a drive electrode 1820 and a sense electrode 1821. The switch 1823 is represented by a switch capacitance 1826 and a leakage resistance 1828 positioned between the drive electrode 1820 and the sense electrode 1821 that accounts for small amounts of leakage current that can flow through switch 1823 when the switch is open. The leakage resistor 1828 may have a value on the order of 1 megaohms or larger. A fixed resistor 1822 may be positioned between the drive electrode 1820 and the sense electrode 1821, electrically connected in series with the contacts of the sensel switch 1823. The fixed resistor 1822 may be a serpentine resistor, a vertical resistor, a high-resistivity film, a leaky diode, or other linear or non-linear resistive element. The fixed resistor 1822 may be in the range of a hundred kilohms to 10 megaohms or larger. In this example, the switch 1823 includes a serpentine fixed resistor 1822, which may be similar to the configuration depicted in FIG. 17A.

When the finger 1047, a stylus, etc., presses on the switch 1823, portions of the drive electrode 1820 are brought closer to the sense electrode 1821, increasing a parallel capacitance 1832 between the drive electrode 1820 and the sense electrode 1821. A sufficiently high applied pressure or force will close the switch 1823. The proximity of the finger 1047, a conductive stylus, etc., also may result in a change in interelectrode mutual capacitances 1824 between adjacent drive electrodes 1820 and sense electrodes 1821.

Figure 18D:
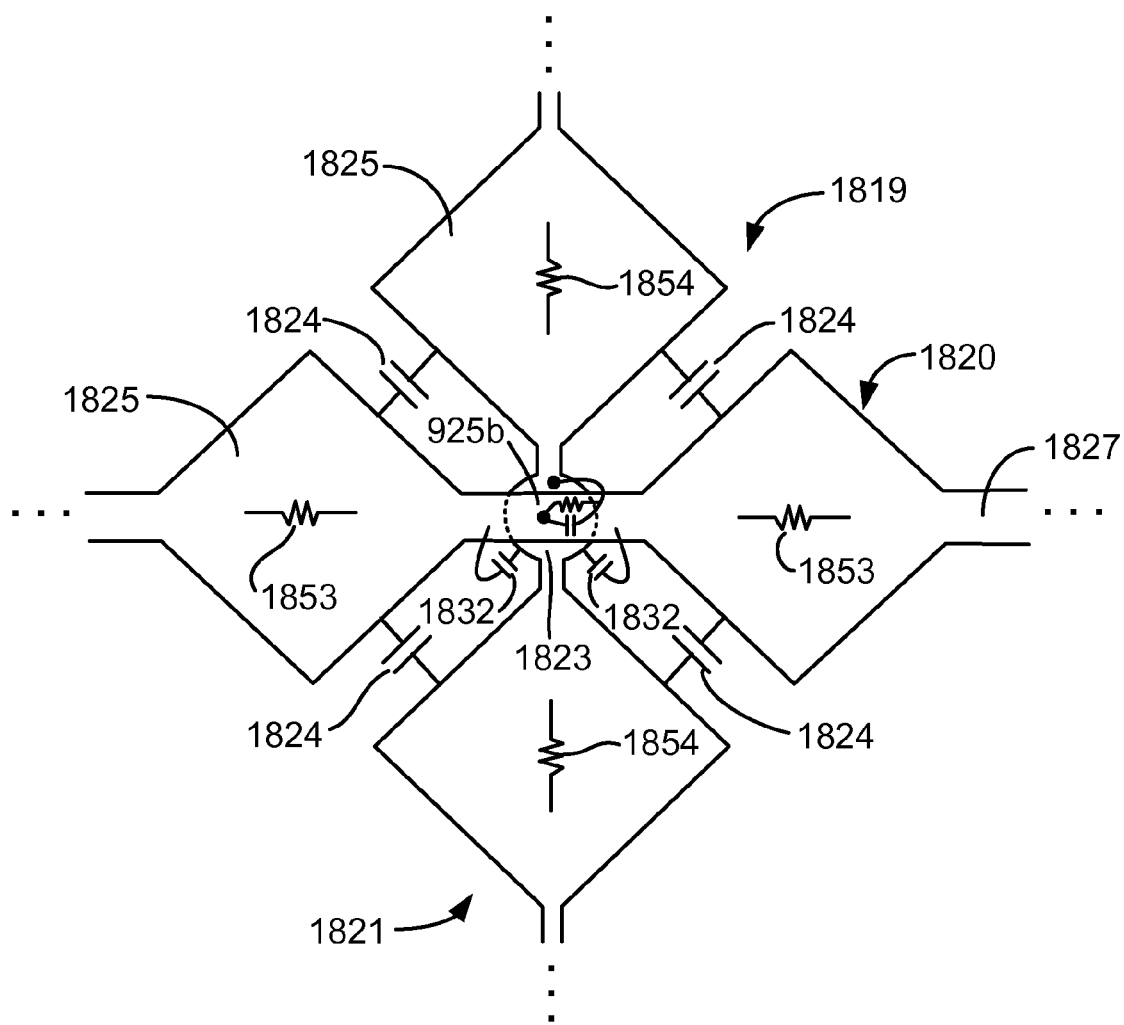
FIG. 18D shows an example of an alternative sensel of a combined sensor device.

FIG. 18D shows an example of an alternative sensel of a combined sensor device. The configuration shown in FIG. 18D is similar to that of FIG. 9B, which is described above. In this example, the drive electrodes 1820 and the sense electrodes 1821 include diamond-shaped sections 1825 and narrow portions 1827. In this example, the switches 1823 are formed in the overlapping regions 925b (see also FIG. 9B).

The parallel capacitance 1832 is formed between the drive electrode 1820 and the sense electrode 1821 in the overlapping regions 925b. The total mutual capacitance of the sensel 1819 is equal to the sum of each of the individual interelectrode mutual capacitances 1824 between adjacent drive electrodes 1820 and sense electrodes 1821. In this example, the total mutual capacitance is about four times the interelectrode mutual capacitance. Each of the diamond-shaped sections 1825 of the drive electrodes 1820 has a sensel drive resistance 1853 and each of the diamond-shaped sections 1825 of the sense electrodes 1821 has a sensel sense resistance 1854.

Figure 18E:
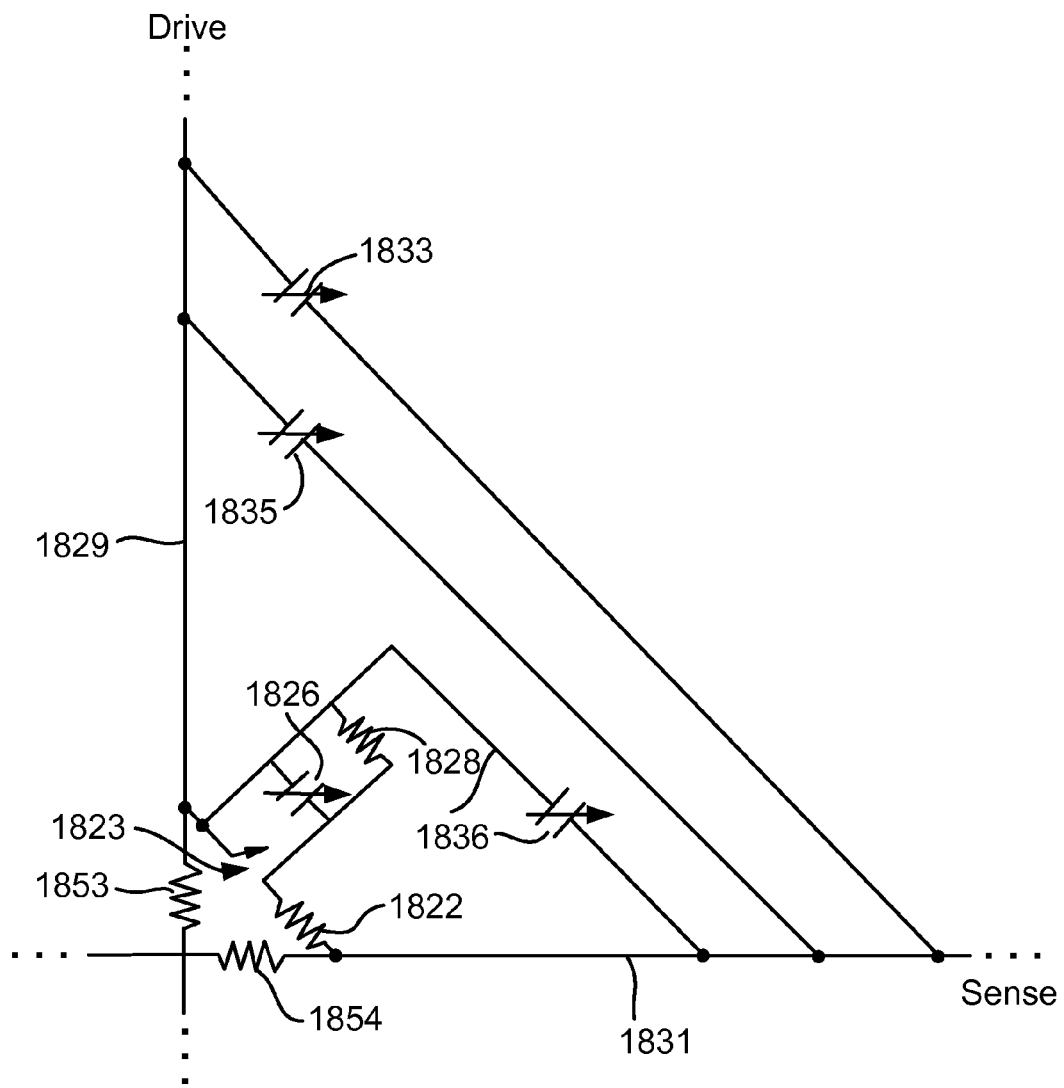
FIG. 18E shows an example of a schematic diagram representing equivalent circuit components of a sensel in a combined sensor device.

FIG. 18E shows an example of a schematic diagram representing equivalent circuit components of a sensel in a combined sensor device. The axis 1829 represents various levels of applied drive signals, such as the drive signals 1814 from the stylus drive circuit 1811 or the touch drive circuit 1813 (for example, see FIG. 18B). The axis 1831 represents various levels of responsive sense signals, e.g., the sense signals 1818 to the stylus sense circuit 1815 or the touch sense circuit 1817 of FIG. 18B.

Mutual capacitance component 1833 may represent the mutual capacitance between the drive electrodes 1820 and the sense electrode 1821 and the changes caused by the proximity of the finger 1047, as shown in FIG. 18C. Parasitic capacitance component 1835 represents self-capacitance of an electrode, such as sense electrode 1821 of FIG. 18C, and the changes caused by the proximity of the finger 1047 or of another conductive body. Parallel capacitance component 1836 represents the parallel-plate capacitance, and changes such as that caused by the pressure of finger 1047, a stylus, etc., causing the drive electrode 1820 to be moved closer to the sense electrode 1821 of FIG. 18C. The position of the switch 1823 represents the closure or non-closure of the switch 1823. In one example, mutual capacitance component 1833 has a value of about 0.5 pF; parasitic capacitance component 1835 has a value between about 0.5 pF and 20 pF; parallel capacitance component 1836 has a value of about 0.5 pF; and switch 1823 has a value of about 10 gigaohm when open and about 1 kilohm when closed. A person having ordinary skill in the art will readily understand that other capacitance and resistance values are also possible depending on the desired implementation. In some alternative implementations, the switch 1823 will have a value of less than 100 ohms (such as when the fixed resistor is omitted) when closed. In some other implementations, the switch 1823 will have a value effectively equal to the fixed resistor when closed.

Some implementations described herein provide a single circuit that can be switched between a touch mode configuration and a handwriting mode configuration. For example, a single circuit may be configured to perform the functions of the stylus sense circuit 1815 and the touch sense circuit 1817 of FIG. 18B.

Figure 18F:
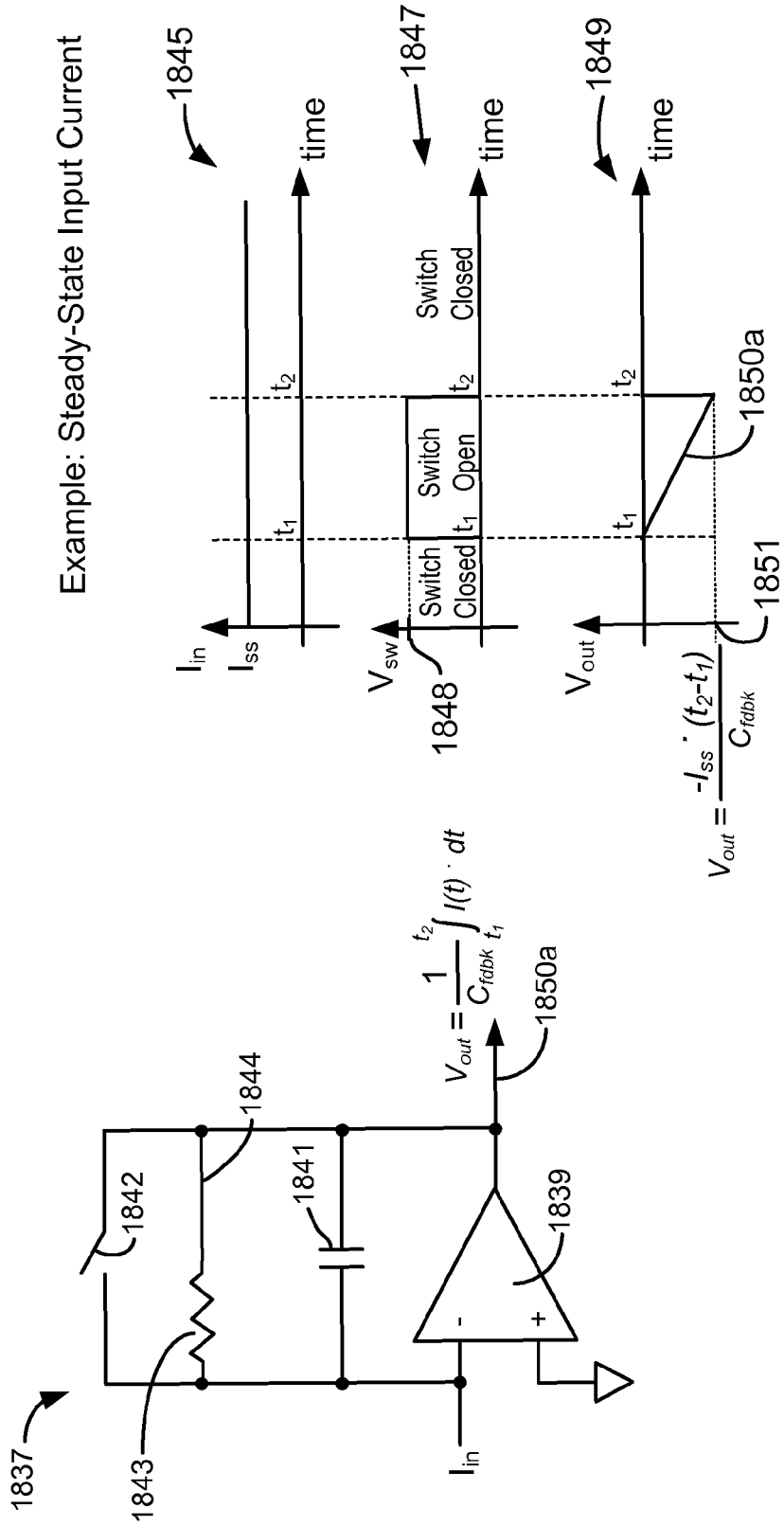
FIG. 18F shows an example of an operational amplifier circuit for a combined sensor device that may be configured for handwriting or stylus mode sensing.

FIG. 18F shows an example of an operational amplifier circuit for a combined sensor device that may be configured for handwriting or stylus mode sensing. When operating in handwriting mode, the circuit 1837 is configured to function as an integrator with reset capability. The circuit 1837 may be configured to generate relatively large output voltages from the relatively small input currents that result from handwriting sensing of the combined sensor device 900 when one or more switches 1823 are closed.

In this example, the circuit 1837 includes an operational amplifier 1839, a feedback capacitor 1841 and a feedback resistor 1843, as well as switches 1842 and 1844. In one example, the feedback capacitor 1841 has a value between about 6 pF and 20 pF, and the feedback resistor 1843 has a value of about 5 megaohm or higher. However, the circuit 1837 may be implemented with other capacitance and resistance values and have other configurations that provide similar functionality. For example, alternative implementations may include a transistor (such as a metal oxide semiconductor field effect transistor (MOSFET)) operating in the off state instead of feedback resistor 1843. Instead of the switch 1842, some implementations may include a lossy device such as a high-value resistor or an NMOS or PMOS transistor with a known resistance. Moreover, some implementations may include an additional resistor in series with the switch 1842.

When operating in the stylus mode, the switch 1844 can be left open and the switch 1842 can be opened and closed. The graphs 1845, 1847 and 1849 show examples of steady-state input current operation. The graph 1845 indicates input current over time. In this example, the current is held constant at a steady-state value $I_{ss}$. At time $t_1$, the switch 1842 is opened. Referring to the graph 1847, it may be seen that to open switch 1842, the voltage applied to switch 1842 is changed to switch open voltage 1848. The switch open voltage 1848 may vary according to the particular implementation. In some implementations, the switch open voltage 1848 may be 1.8V, whereas in other implementations the switch open voltage 1848 may be 3.3V, 5V, 10V, 20V or some other voltage.

The graph 1849 indicates the output voltage that results from opening the switch 1842. In this example, because the input current is constant, the output voltage 1850a increases linearly between time $t_1$, when the switch 1842 is opened, and time $t_2$, when the switch 1842 is closed again. The time interval $(t_2-t_1)$ during which the switch 1842 is open may be, for example, on the order of 0.1 to 10 μsec, or even less. In this example, the output voltage 1850a reaches a maximum output voltage 1851. Here, the maximum output voltage 1851 is opposite in sign from the switch open voltage 1848 and has a lower absolute value than the switch open voltage 1848. When the switch 1842 is closed (at time $t_2$), the capacitor 1841 may be discharged and the output voltage 1850a is reset.

Figure 18G:
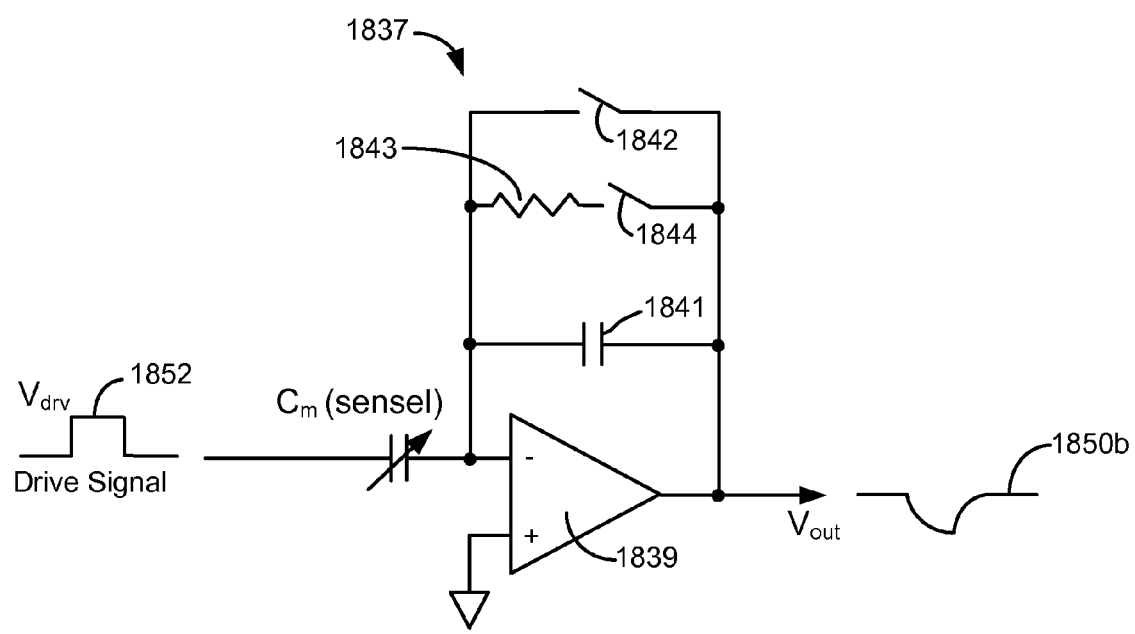
FIG. 18G shows an example of the operational amplifier circuit of FIG. 18F configured for touch mode sensing.

FIG. 18G shows an example of the operational amplifier circuit of FIG. 18F configured for touch mode sensing. In this configuration, the switch 1844 is closed, which allows the circuit 1837 to function as a charge amplifier for detecting changes in mutual capacitance $C_m$ between adjacent drive electrodes 1820 and sense electrodes 1821 (for example, see FIGS. 18C and 18D). In this example, drive signal 1852 is a square wave having a voltage $V_{drv}$.

An example of the resulting output voltage 1850b is shown in FIG. 18G. The output voltage 1850b is not a linear response like that of the output voltage 1850a, but instead is an inverted and non-linear response to the leading and trailing edges of the drive signal 1852. This response follows from the basic relationship between the current into a capacitor I=C dV/dt, where I is the current, C is the capacitance of the capacitor and dV/dt is the derivative of voltage with respect to time.

A PCT sensor can exhibit shorted sensels when, for example, a sensel is pressed with a finger or a stylus and the sensel switch is closed. This condition has the potential to create larger-than-normal signals that can saturate the operational amplifier 1839 of the circuit 1837. While a saturated state can be sensed and identified, saturation recovery time can be problematic for array sensing systems. Amplifier recovery time is usually not known with a high degree of confidence, typically being characterized in a testing facility. If the operational amplifier 1839 remains saturated, subsequent sensel measurements may be corrupted. Thus, recovery time can have a significant impact on the achievable scan rate of a sensor array.

In addition, the circuit 1837 may have feedback components with large time constants that also can contribute to a long recovery period. In some implementations, the circuit 1837 may include a large feedback resistor (such as the resistor 1843) to provide DC feedback to stabilize the circuit 1837. A large feedback resistor in parallel with the capacitor 1841 can create a larger time constant that can inhibit sensor scan rates.

Accordingly, some implementations of the circuit 1837 are configured to inhibit or prevent saturation of the operational amplifier 1839. Some such implementations provide a low-impedance path to bleed off charge of the capacitor 1841, allowing for fast re-set of the circuit 1837 and/or fast recovery from a saturated state of the operational amplifier 1839.

Figure 18H:
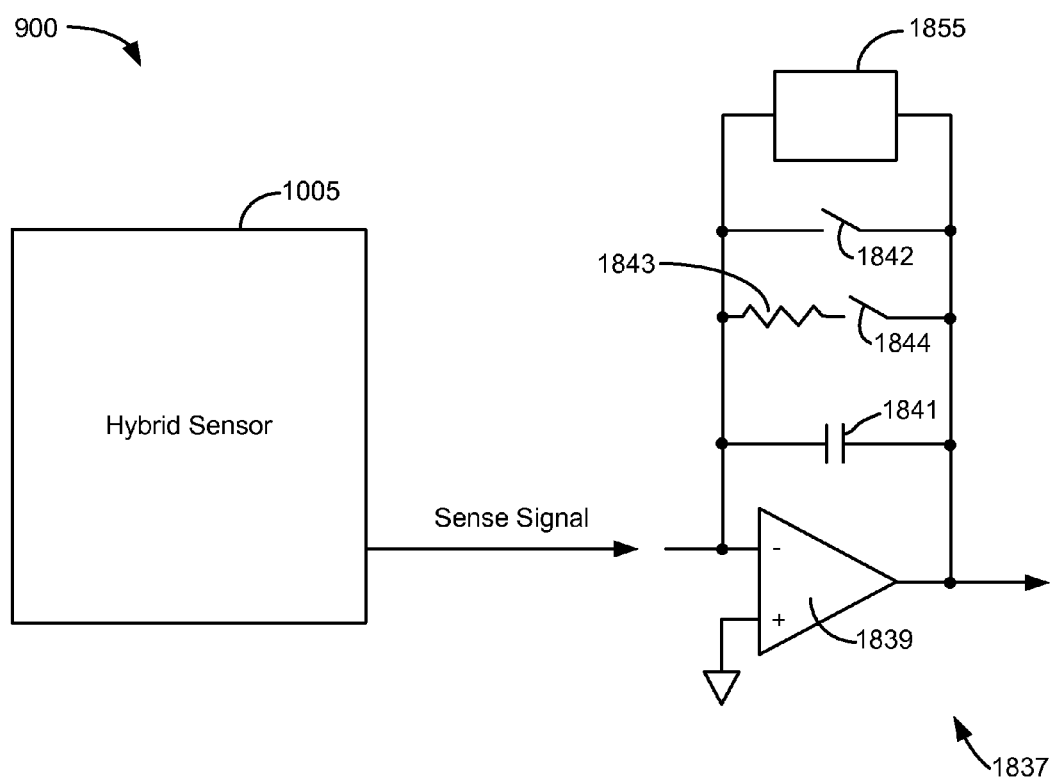
FIG. 18H shows an example of an operational amplifier circuit for a combined sensor device that includes a clamp circuit.

FIG. 18H shows an example of an operational amplifier circuit for a combined sensor device that includes a clamp circuit. The clamp circuit 1855 may be configured to inhibit or prevent saturation of the operational amplifier 1839 by limiting the output voltage of the circuit 1837. In this example, the clamp circuit 1855 is disposed in parallel with other components of the circuit 1837.

Figure 18I:
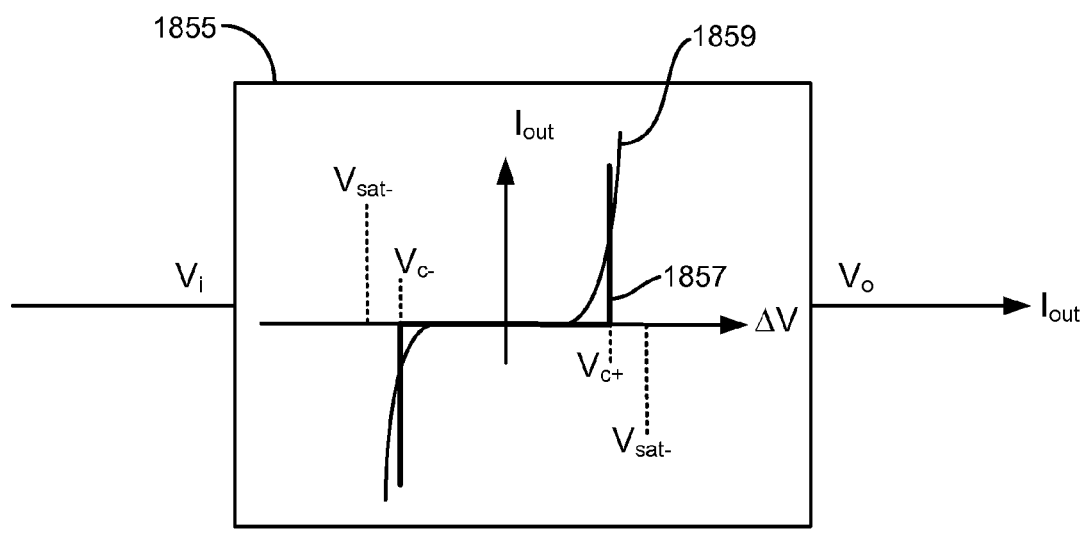
FIG. 18I shows examples of clamp circuit transfer functions.

FIG. 18I shows examples of clamp circuit transfer functions. The function 1857 is an ideal clamp circuit transfer function, whereas the function 1859 is an example of an actual clamp circuit transfer function. Both of the functions 1857 and 1859 indicate a very high impedance while the clamp circuit 1855 is operating within the clamp voltage range ($V_{c-}<V_o<V_{c+}$). The clamp circuit 1855 may be configured with clamp voltages $V_{c-}$ and $V_{c+}$ with absolute values that are less than those of the corresponding saturation voltages $V_{sat-}$ and $V_{sat+}$.

Within the clamp voltage range, the circuit 1837 can operate in a touch mode with little or no influence from the clamp circuit 1855. When the operational amplifier is "clamped" (when $V_{out}$ reaches or exceeds $V_{c+}$ or $V_{c-}$), the impedance of the clamp circuit 1859 is very low, as shown by the significant increase in the absolute value of $I_{out}$. If the impedance of the clamp circuit 1855 is made very low, this essentially shorts the feedback components of the circuit 1837, thereby allowing the feedback capacitor 1841 to discharge (see FIG. 18H).

Figure 18J:
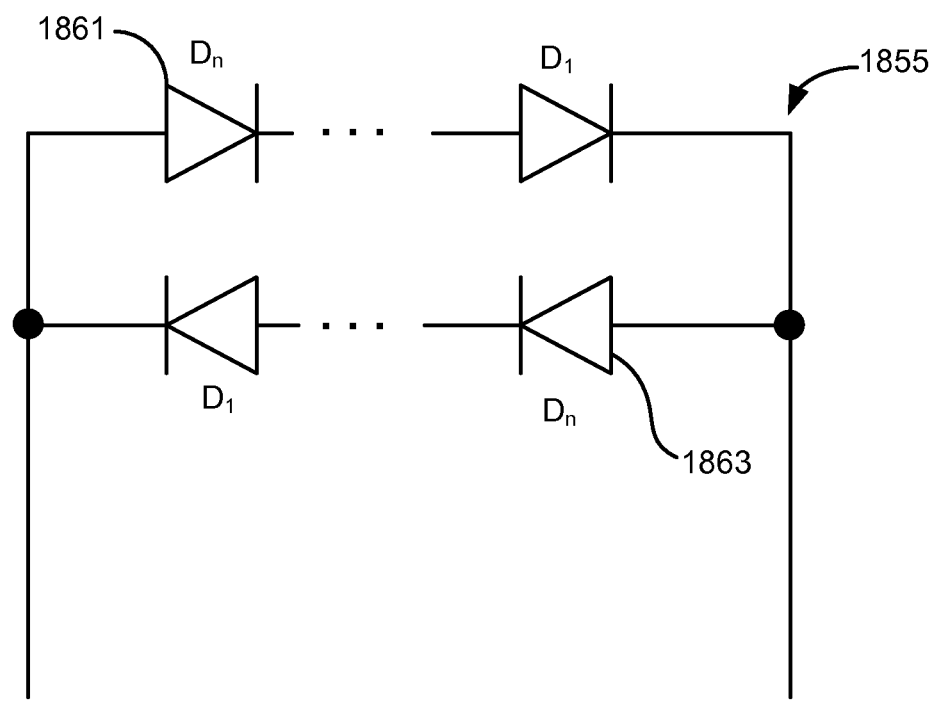
FIG. 18J shows an example of a circuit diagram for a clamp circuit.

FIG. 18J shows an example of a circuit diagram for a clamp circuit. In the configuration depicted in FIG. 18J, the clamp circuit 1855 includes n diodes 1861 arranged in series and having a first forward direction. The diodes 1861 are disposed in parallel with the diodes 1863. In this example, there are n diodes 1863 arranged in series and having a second forward direction that is opposite to that of the diodes 1861. In some implementations, the forward voltage of each of the diodes 1861 and 1863 may be on the order of 1V or less, e.g., 0.2V, 0.3V or 0.6V. The value of n, as well as the forward voltage of the diodes 1861 and 1863, may vary according to the implementation. The clamp circuit transfer function of a clamp circuit 1855 having a relatively larger number of diodes, each with a relatively lower forward voltage, will approximate an ideal clamp circuit transfer function more closely than a clamp circuit 1855 having a relatively smaller number of diodes, each with a relatively higher forward voltage.

However, the clamp circuit 1855 may be configured in various other ways. In some alternative implementations, at least one of the diodes 1861 and 1863 may be a Zener diode. In some such implementations, one of the diodes 1861 is a Zener diode having a first forward direction and one of the diodes 1863 is a Zener diode having a second and opposing forward direction. In some such implementations, each of the Zener diodes may be paired, in series, with a Schottky diode having an opposing forward direction. In some implementations, the Schottky diodes may have forward voltage drops of about 0.2V or 0.3V. The Zener breakdown voltage of the corresponding Zener diodes may be substantially higher. For example, in a ±5V analog system, the Zener breakdown voltage may be 4.2V in one implementation.

In some implementations described herein, the lower substrate may form at least a portion of the cover glass apparatus of a display device. In some such implementations, the signal lines may be formed on the upper surface of the cover glass, rather than underneath the cover glass. Such a configuration has implications for the design of the sensing elements in the array, because these elements may be routed outside the array and attached to integrated circuits (ICs) that are configured to address and sense the signals from the various sensing elements in the array.

Previous approaches (such as covering these routing wires or attaching ICs on the top side of the cover glass and covering them with black border epoxy) may not be optimal. One reason is that the epoxy may result in topography on the touch surface that may be felt by the user.

Accordingly, some implementations described herein provide novel routing configurations. Some implementations involve the use of a flexible upper substrate 905 of a combined sensor device 900 as a platform for direct attachment of one or more ICs, including but not limited to ASICs. The flexible upper substrate 905 may be wrapped around the edge of the lower substrate 910 (the edge of a glass substrate or another such substantially transparent substrate). Some such implementations involve wrapping the sensing wires and routing leads, and attaching ICs to these leads in a manner that enables the cover glass to extend all the way to the edge of a mobile display device, such as a smart phone device. The IC(s) may be directly attached to the wrap-around portion of the upper substrate 905, thus enabling a minimal edge border on the device, eliminating or minimizing the need for a bezel, and reducing cost by integrating the cover layer and flexible printed circuit. Some such implementations may not result in a topography that can be felt by a user.

Figure 19:
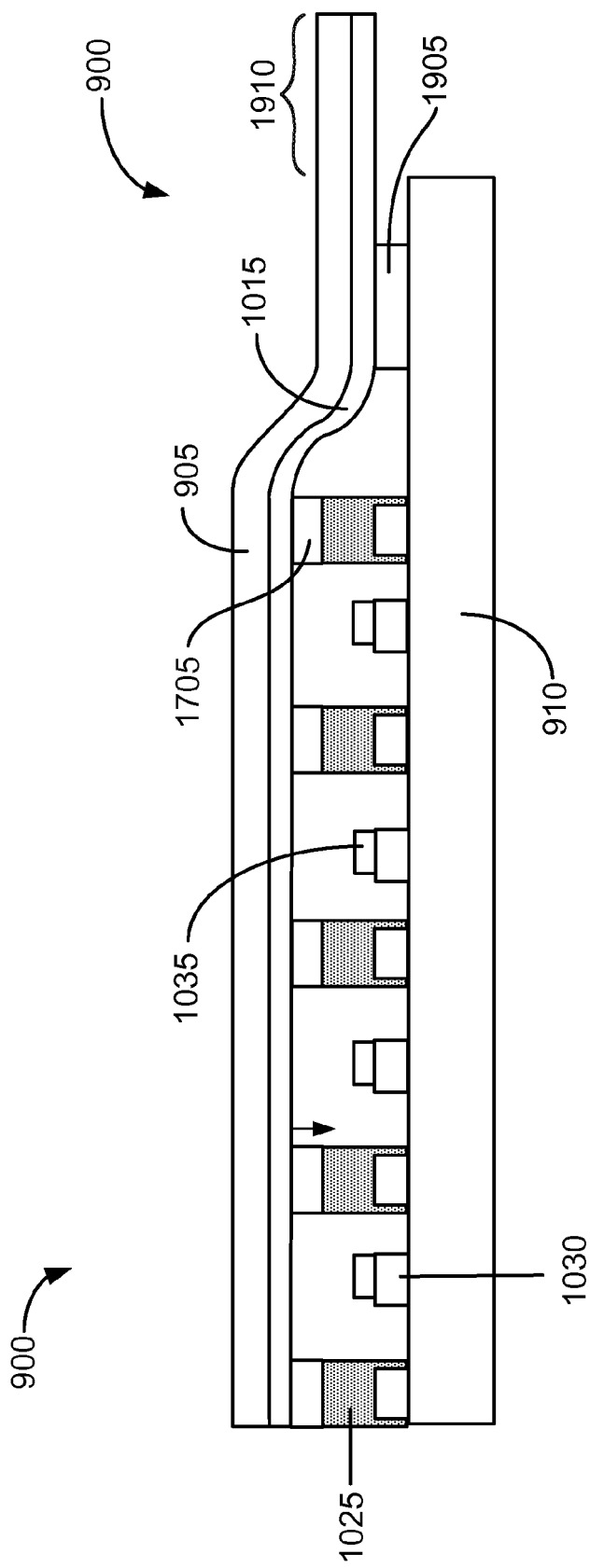
FIG. 19 shows an example of a cross-section of a portion of an alternative combined sensor device.

Some examples will now be described with reference to FIGS. 19 through 21B. FIG. 19 shows an example of a cross-section of a portion of an alternative combined sensor device. In this implementation, the lower substrate 910 is formed of glass and the upper substrate 905 is formed of a flexible and substantially transparent material, such as a clear polyimide. Here, conductive material (metallization in this example) has been patterned into the upper electrodes 1015 on the upper substrate 905. The upper electrodes 1015 on the underside of the upper substrate 905 may be used to route the sensor's signal lines. The portion 1910 of the upper substrate 905 (which is not drawn to scale) may be configured to wrap around the edge of the lower substrate 910 in some implementations, such as the implementation shown in FIG. 21B. In the example shown in FIG. 19, the lower electrodes 1030 on the lower substrate 910 may be bonded electrically to upper electrodes 1015 or other electrical traces or circuitry on the upper substrate 905 using an anisotropic conductive film (ACF) 1905 or a similar connection scheme.

Figure 20:
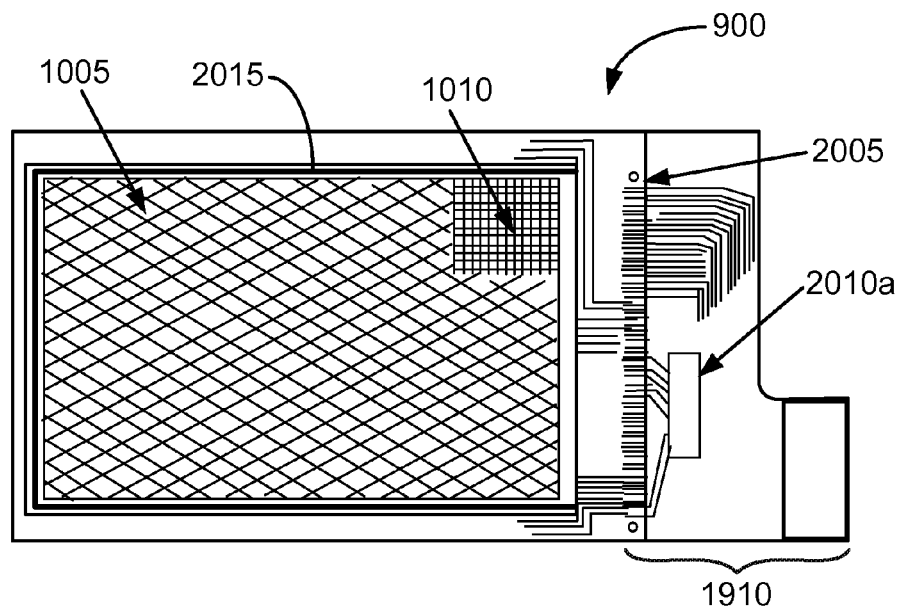
FIG. 20 shows an example of a top view of routing for a combined sensor device.

FIG. 20 shows an example of a top view of routing for a combined sensor device. The combined sensor device 900 illustrated in FIG. 20 includes both flex-on-glass (FOG) 2005 and chip-on-flex (COF) 2010a configurations. FIG. 20 also indicates the handwriting and touch sensor zone 1005 and the fingerprint sensor zone 1010 of the combined sensor device 900. A ground ring 2015 may be included around portions of the handwriting, touch and fingerprint sensor zones 1005 and 1010 to isolate noise coupling from the system and to minimize false touches. While fingerprint sensor zone 1010 is shown as physically distinct from handwriting and touch sensor zone 1005, in some implementations with sufficiently high resolution in the handwriting and touch zone, the two zones merge and are indistinguishable. Software may be used to allocate a portion of the combined sensor device 900 for fingerprint detection. When combined with an underlying display device, the software may be used to display a box or other suitable designator for prompting a user where (and when) to place a finger on the sensor device.

Figure 21A:
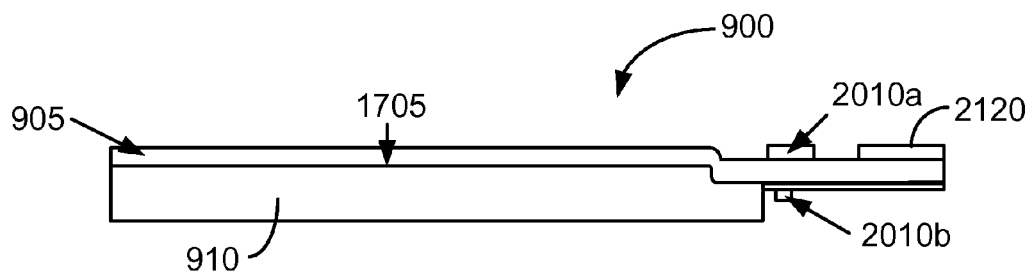
FIG. 21A shows an example of a cross-sectional view through the combined sensor device shown in FIG. 20.

FIG. 21A shows an example of a cross-sectional view of the device through the combined sensor device shown in FIG. 20. In this example, the upper substrate 905 is bonded to the lower substrate 910 with the adhesive layer 1705. An additional COF 2010b may be seen in this view of the combined sensor device 900. Additional components such as passive devices (not shown) and connective traces for signals, power, ground, and external connectors may be included on an extended portion of the upper substrate 905 along with a controller or other integrated circuits such as COF 2010a and 2010b. Electrical or connective vias (not shown) may be included in the flexible upper substrate 905 to aid in connectivity of any electrical and electronic components. A stiffener 2120 such as a Kapton® tape may be attached to an extended portion of upper substrate 905.

Figure 21B:
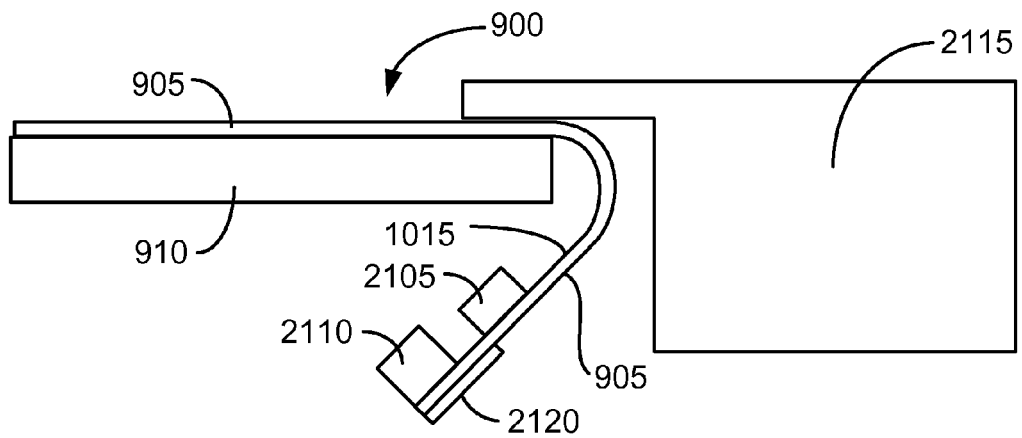
FIG. 21B shows an example of a cross-sectional view of a wrap-around implementation.

FIG. 21B shows an example of a cross-sectional view of a wrap-around implementation. In the combined sensor device 900 illustrated in FIG. 21B, the flexible upper substrate 905 is wrapped around the edge of the lower substrate 910. FIG. 21B depicts the connection of IC 2105, which is an ASIC in this example, to the upper electrodes 1015 on the inside (lower side) of the upper substrate 905. The IC 2105 may, for example, be configured for controlling the combined sensor device 900 to provide touch sensor, handwriting sensor and/or fingerprint sensor functionality. An electrical connector 2110 is attached to the upper electrodes 1015 or to other traces on one or both sides of upper substrate 905 in this example. A bezel 2115 is shown in FIG. 21B. However, other implementations may not include the bezel 2115.

Here, the signal lines that address the electrodes on the lower substrate 910 are routed and connected to corresponding upper electrodes 1015 on the underside of the flexible upper substrate 905. According to some such implementations, both the cost and the complexity of the combined sensor device 900 may be reduced by integrating the functionality of the flexible upper substrate 905 with that of a flexible printed circuit.

Using devices such as those described above, an array of applications can be enabled. Some such implementations involve using a mobile handheld device as a user authentication-based secure gateway to enable transactions and/or physical access. Some implementations involve using a fingerprint sensor as part of a user authentication system, such as for commercial or banking transactions. In some implementations, a handwriting input function may be used for signature recognition and related applications. Alternatively, or additionally, some implementations involve using the handwriting input feature to automatically capture notes and stylus input from people in an enterprise, such as students an educational setting, employees in a corporate setting, etc.

For example, there is a growing trend to enable use of a mobile device for commercial transactions, in a manner similar to that in which a credit card is used. In this usage model, a user may simply input a PIN number into a cellular telephone that is equipped with a communication interface such as Near Field Communication (NFC) configured to communicate with payment terminals.

One challenge with this model is that of user authentication. PINS and passwords may be ineffective for preventing unauthorized access. A stolen mobile device or cellular telephone could result in improper usage of the device or phone for credit or debit transactions.

Figure 22:
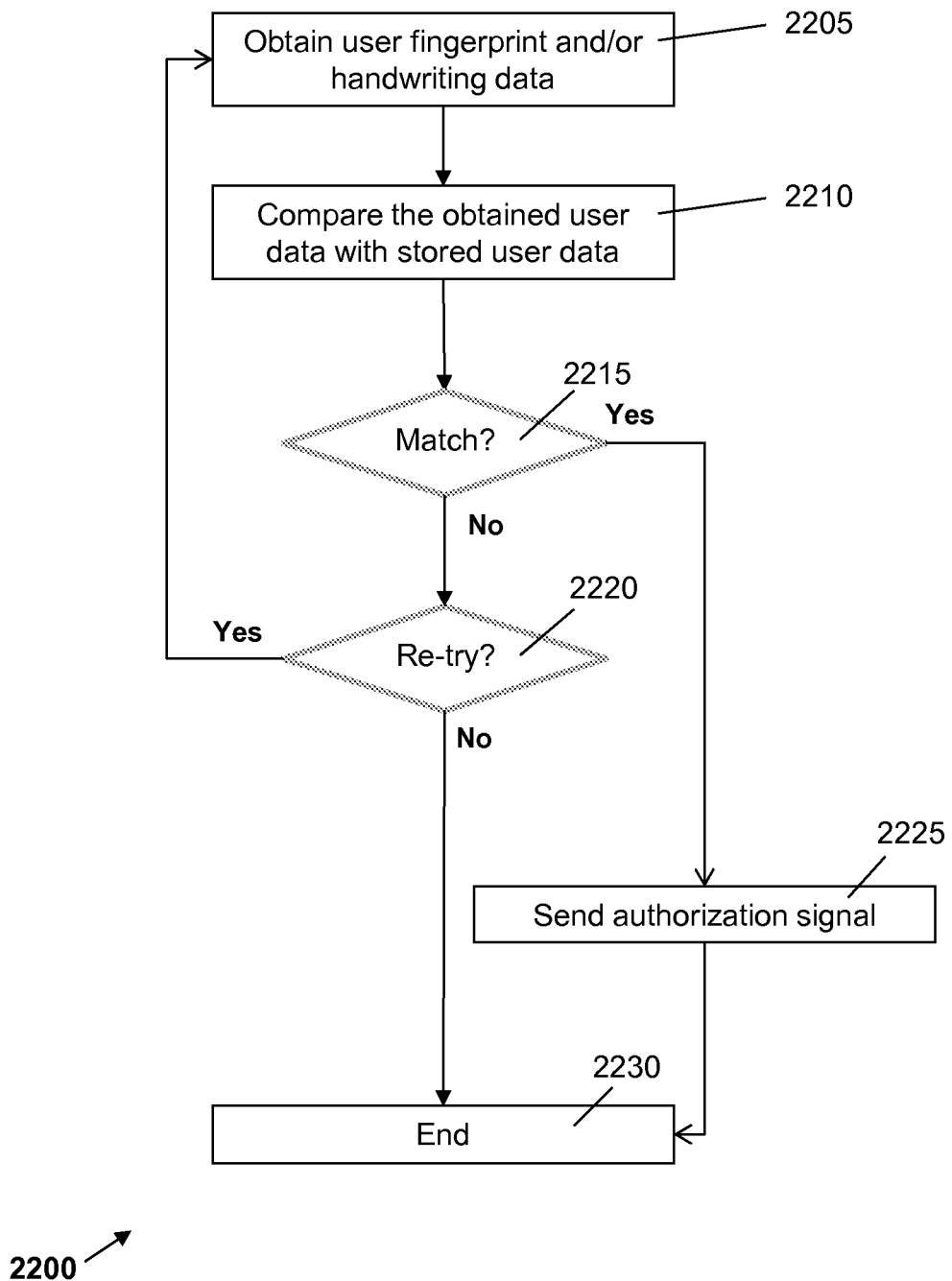
FIG. 22 shows an example of a flow diagram illustrating a fingerprint-based user authentication process.

Some implementations provided herein relate to the use of a built-in fingerprint sensor, such as the fingerprint sensor of the combined sensor device 900, to enable local user authentication. FIG. 22 shows an example of a flow diagram illustrating a fingerprint-based user authentication process. The process 2200 may involve using a cellular telephone as a fingerprint-based user authentication system to enable transactions and/or physical access.

According to some such implementations, the user may be enrolled on a mobile device, such as a cellular telephone, by providing one or more fingerprints. In some such implementations, the mobile device includes a combined sensor device 900. Alternatively, or additionally, the user may provide handwriting data. The fingerprint and/or handwriting data may be encrypted and stored securely within the mobile device. However, some alternative implementations provide for authentication by a remote device, such as a server. Such implementations may involve storing the fingerprint and/or handwriting data in a remote device. Moreover, some implementations involve acquiring fingerprint and/or handwriting data from more than one person, so that more than one person may be authenticated using the same mobile device.

During an authentication process, the user provides fingerprint and/or handwriting data to the mobile device, such as through one or more sensors integrated in a cover glass apparatus of the mobile device (block 2205). The user may do so, for example, when the user wishes to make a commercial transaction using the mobile device. The obtained fingerprint and/or handwriting data may be processed securely, either within the mobile device or via a remote device such as an authentication server, and compared to the previously enrolled and stored fingerprint and/or handwriting data (block 2210). In block 2210, the mobile device or the authentication server determines whether there is a match between the obtained fingerprint and/or handwriting data and the stored fingerprint and/or handwriting data.

If and only if there is a match will the transaction be permitted. If no match is found in block 2215, the process 2200 may allow the user to try again, e.g., for a limited number of times (block 2220). If the user cannot provide matching fingerprint and/or handwriting data within this number of times, the process may end (block 2230). In some implementations, the mobile device or the authentication server may send a notification to, e.g., a financial institution and/or to local governmental authorities if improper data is received. In this example, either the mobile device or the authentication server is configured to send an authorization signal to another device if the transaction is permitted (block 2225). Examples of such devices include the mobile device 40 and the payment terminal 2310 shown in FIG. 23A.

Figure 23A:
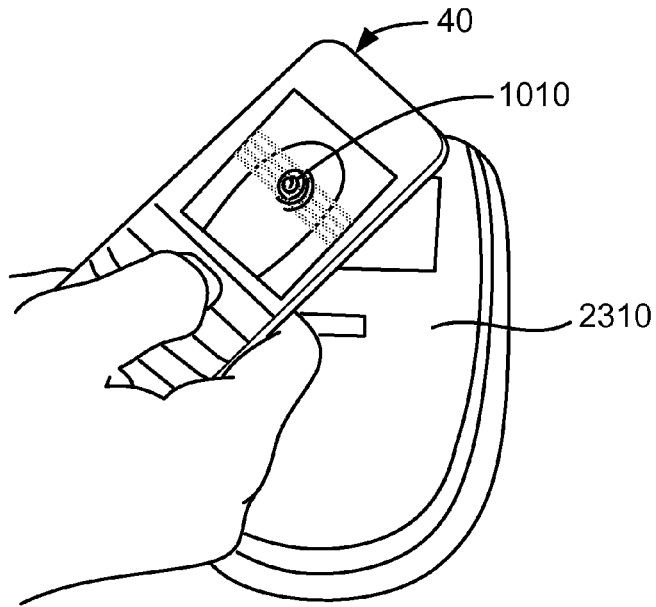
FIG. 23A shows an example of a mobile device that may be configured for making secure commercial transactions.

FIG. 23A shows an example of a mobile device that may be configured for making commercial transactions. In this example, the mobile device is a fingerprint-secured cellular telephone that is configured for wireless communication with the payment terminal 2310, such as via NFC. The cellular telephone is an instance of the display device 40, described elsewhere herein, and may include a combined sensor device 900 such as that described above. Alternatively, the cellular telephone may include a fingerprint sensor zone 1010 that is not part of a combined sensor device 900.

According to some implementations, a user may provide fingerprint data to the mobile device according to a process such as that described above with reference to FIG. 22. If there is a match between the stored and recently-provided fingerprint data, the transaction can be permitted. For example, the payment terminal 2310 of FIG. 23A may send a signal to a corresponding device of a financial institution indicating that a payment should be authorized. The financial institution may or may not approve the payment, depending on factors such as the availability of funds or credit. FIG. 23A shows a mobile device used to authorize a payment at a payment terminal in physical proximity to the phone. In some other implementations, the mobile device can be used to authorize payments made remotely, such as an e-commerce transaction made via a web browser or other application running on the mobile device, or to authorize a payment made through a separate system, such as an e-commerce transaction made via a web browser or other application running on a personal computer under the control of a user. Referring to FIGS. 22 and 23A, the authorization signal of block 2225 can be used to control the release of data on the mobile device itself, such as a control bit to authorize transmission of payment or credit card information to payment terminal 2310. In another implementation, the authorization signal of block 2225 may be sent to another device or process server, such as a device or server of a financial institution indicating that a payment should be authorized.

Many physical facilities in corporate and government locations are secured electronically, and are accessed using wireless radio frequency identification (RFID) cards, key fobs, etc., that operate on specific wireless frequencies, such as 128 kHz. These are short-range devices that draw energy by inductively coupling power from a card reader or a similar device located near a door. If an RFID card or key fob falls into the wrong hands, security could be compromised at these access points.

Figure 23B:
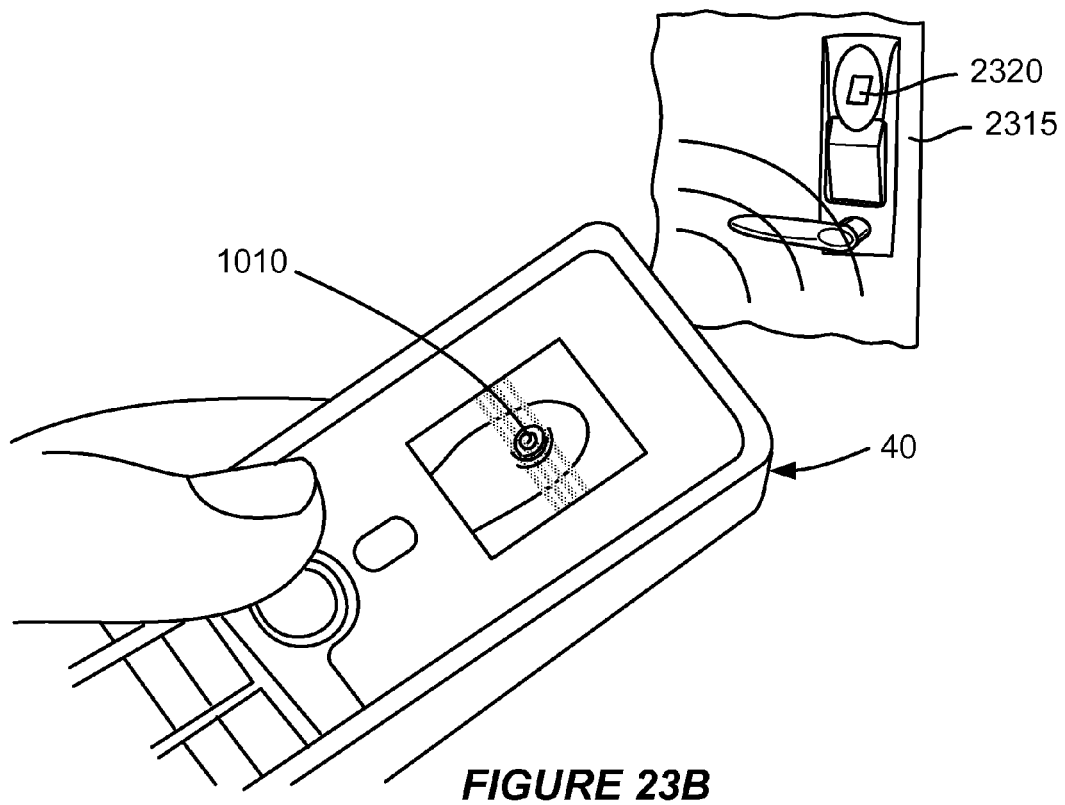
FIG. 23B shows an example of using a fingerprint-secured mobile device for physical access applications.

Instead of using a separate RFID card or key fob, some implementations involve the use of a fingerprint-secured mobile device, such as a fingerprint-secured cellular telephone, to gain access to such physical facilities. FIG. 23B shows an example of using of a fingerprint-secured mobile device for physical access applications. The mobile device is an instance of the display device 40, described elsewhere herein, and may include a combined sensor device 900.

In some such implementations, a fingerprint-secured mobile device may be used for opening an NFC-enabled access point 2320, such as a door 2315 of a building, an automobile, a locker, a safe, etc., that may be electronically locked. In some implementations, the access point may be configured for communication with other devices, such as an authentication server, via a network. The fingerprint sensor zone 1010 of the mobile device 40 may be used to implement (at least in part) an authentication process for the user before the mobile device 40 initiates its communications with the access point 2320. The authentication procedure may be similar to that described above for the secure payment gateway; however, the application enabled is that of physical access, rather than a transaction.

Mobile devices are becoming a ubiquitous means for storage, transmission, and playback of documents, music, videos, and other digital assets. In order to preserve digital and other rights, and to prevent unauthorized access, distribution and copying of such digital assets, some implementations involve the use of a fingerprint sensor and/or a handwriting sensor to be "married" to the asset in question. In this manner, only the person (or persons) authorized to access the digital asset can access the asset through the use of the fingerprint sensor and/or the handwriting sensor, which may be sensors of a combined sensor device 900 described herein.

In many enterprises, including corporate, government, educational and other settings, it may be beneficial to have an individual write notes on the screen of a mobile device. A device such as a tablet with a large screen can substitute as a notepad, allowing meeting notes, interactive discussions between colleagues and other important discoveries to be automatically captured. One such device is depicted in FIG. 24A.

Figure 24A:
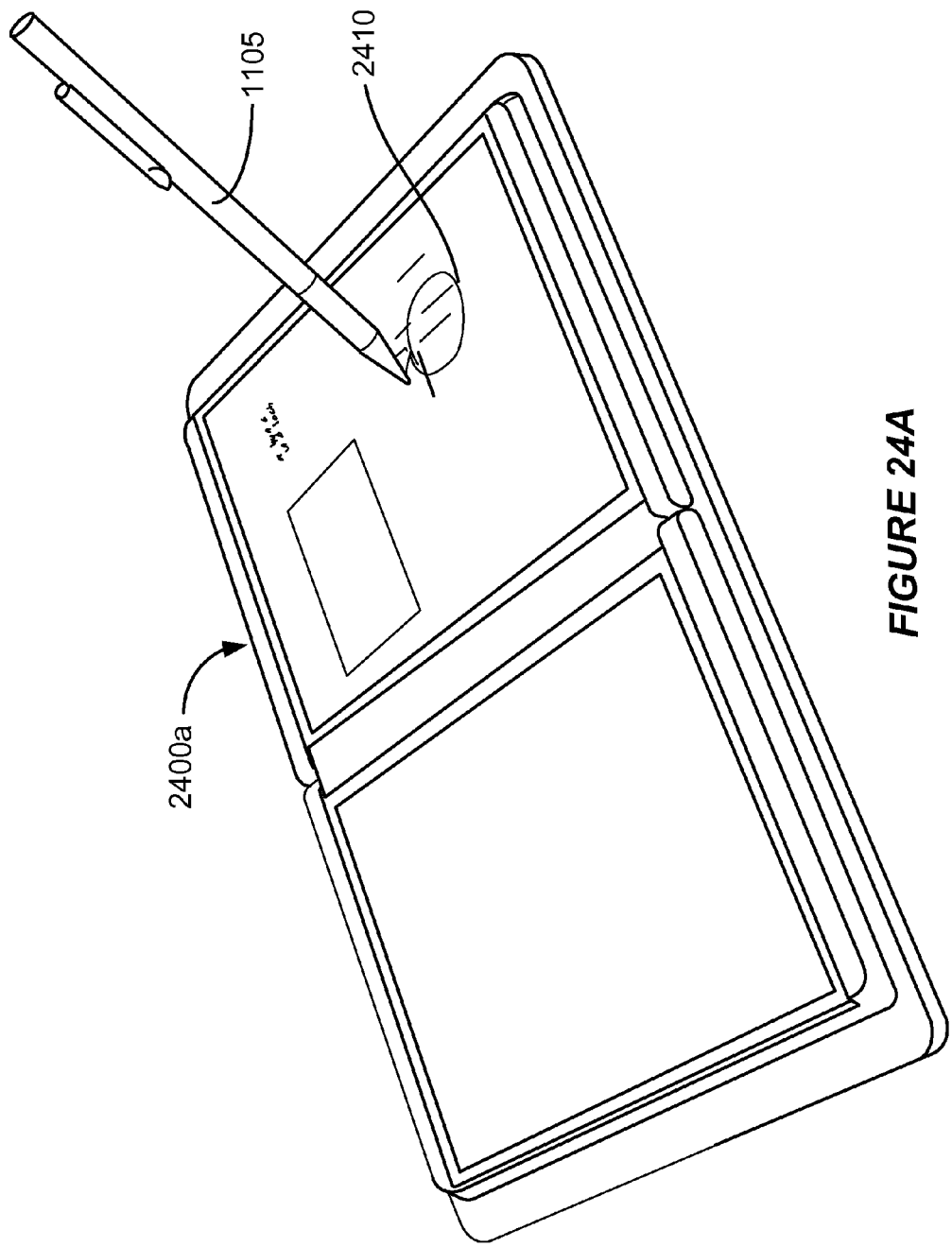
FIG. 24A shows an example of a secure tablet device.

FIG. 24A shows an example of a secure tablet device. The tablet device 2400a of FIG. 24A may be configured for wireless communication with a network, such as a network maintained by an enterprise. The tablet device 2400a may include a combined sensor device 900 such as described elsewhere herein. Such network communications can facilitate storage of information captured by the tablet device 2400a on an enterprise's database of documents. Due to the often confidential and private nature of the information contained within these devices, access to such tablets and phones should be restricted only to the authorized user(s). Otherwise, loss of such devices can result in unauthorized usage and compromise of the data contained within.

Some such implementations provide access control according to a handwriting recognition process and/or a fingerprint recognition process. Access to the tablet device 2400a may be controlled according to an analysis of a user's handwriting on the tablet device 2400a and/or according to fingerprint data received from a fingerprint sensor provided on the cover glass apparatus, as described above. In the example depicted in FIG. 24A, the stylus tip 1105 can be used to provide the handwriting data 2410 via the tablet device 2400a. Such data may be used for an authentication process similar to that described above with reference to FIG. 22.

Figure 24B:
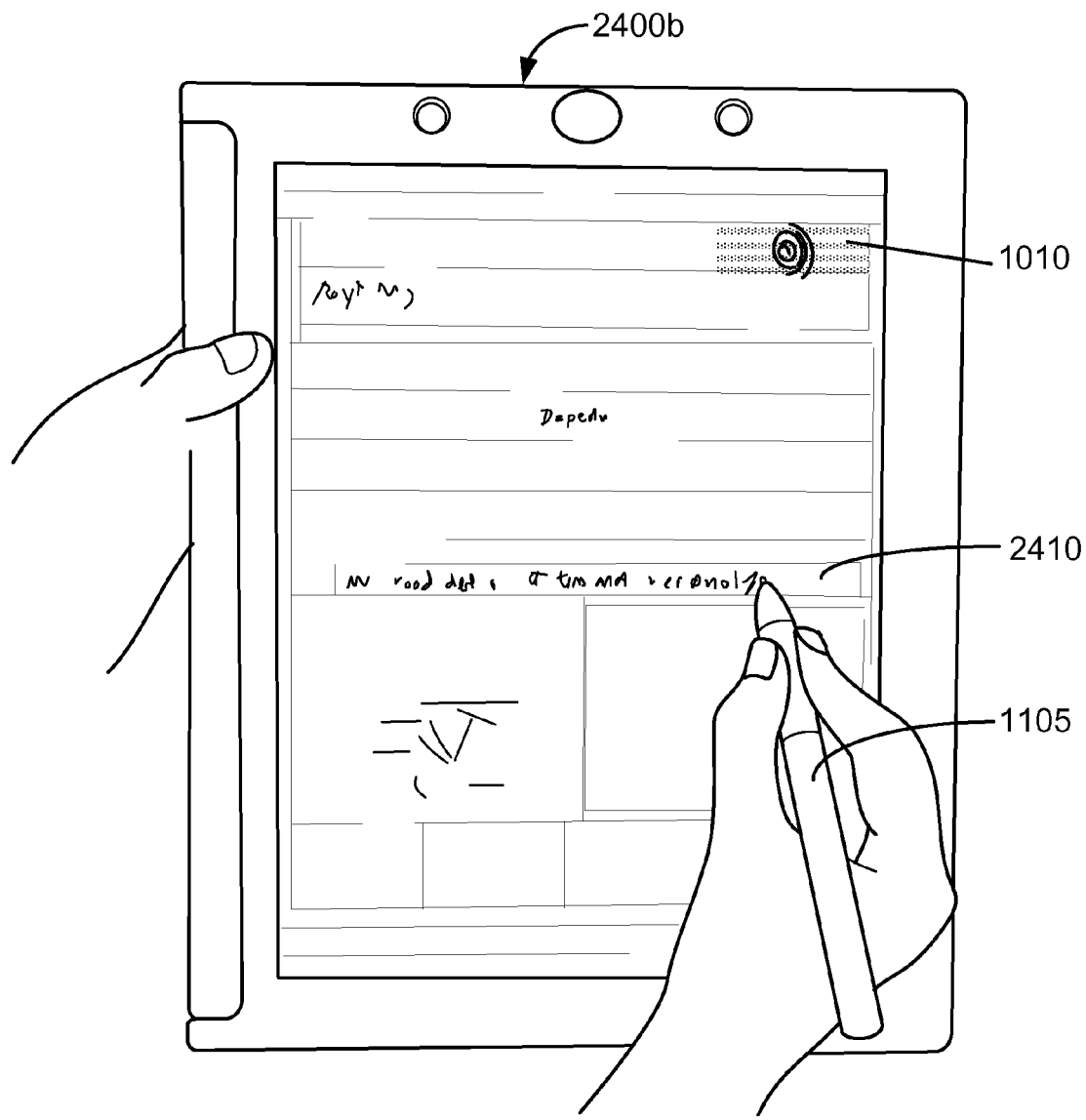
FIG. 24B shows an example of an alternative secure tablet device.

FIG. 24B shows an example of an alternative secure tablet device. The screen of the tablet device 2400b illustrated in FIG. 24B may act as the handwriting input device or notepad. The tablet device 2400b may include a combined sensor device 900 such as described elsewhere herein. As shown in FIG. 24B, access to the tablet device 2400b may be controlled according to a handwriting authentication procedure: here, the stylus tip 1105 can be used to provide the handwriting data 2410. Alternatively, or additionally, access to the tablet device 2400b may be controlled according to a fingerprint authentication procedure using fingerprint data acquired via the fingerprint sensor zone 1010. The tablet device 2400b may or may not be configured for finger touch sensing, depending on the particular implementation. Information may be automatically captured on the screen and, in some implementations, may be wirelessly synchronized with an enterprise's database. Alternatively, or additionally, such data can be stored locally. Some such data may subsequently be synchronized with the enterprise's database, such as through a wired or wireless interface.

Figure 25A:
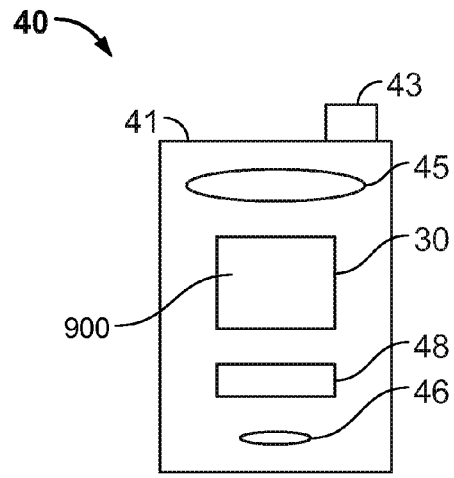
FIGS. 25A and 25B show examples of system block diagrams illustrating a display device that includes a combined sensor device.
Figure 25B:
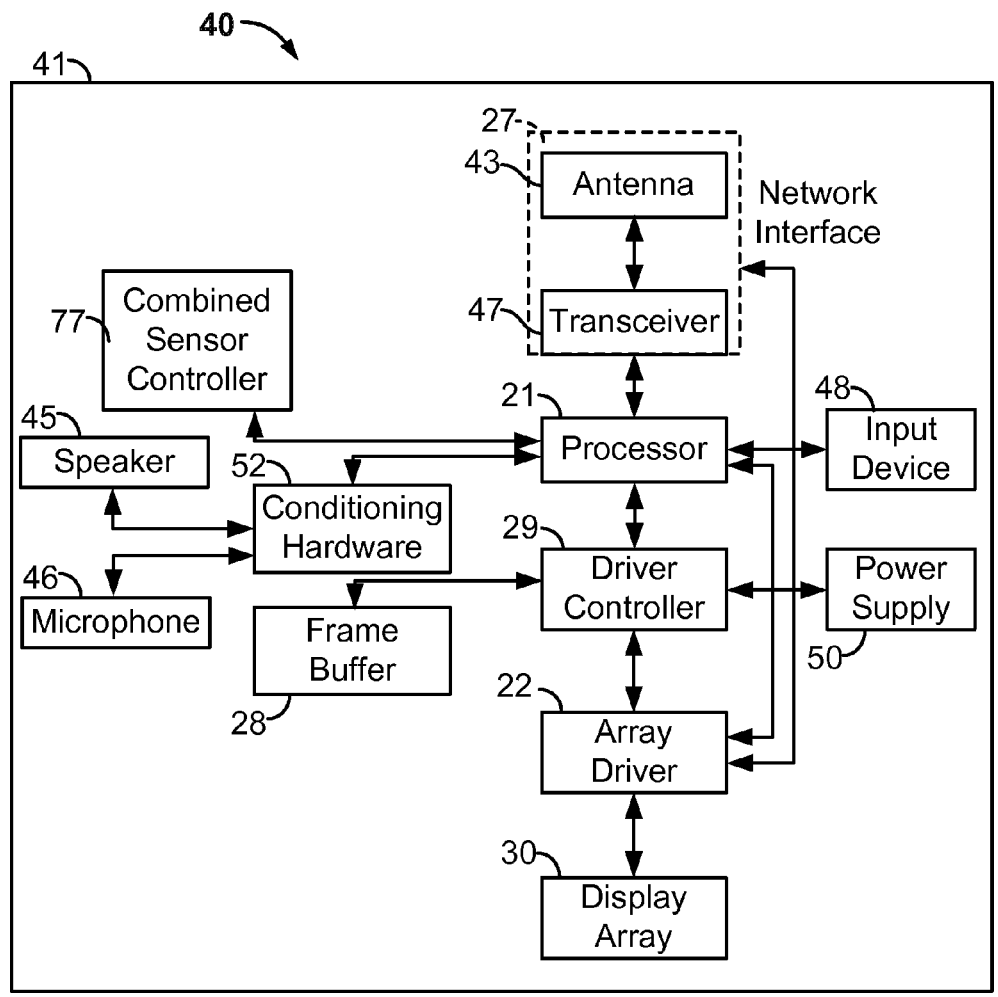

FIGS. 25A and 25B show examples of system block diagrams illustrating a display device that includes a combined sensor device. The display device 40 can be, for example, a smart phone, a cellular phone, or a mobile telephone. However, the same components of the display device 40 or slight variations thereof are also illustrative of various types of display devices such as televisions, tablets, e-readers, handheld devices and portable media players.

The display device 40 includes a housing 41, a display 30, a combined sensor device 900, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein. The combined sensor device 900 may be a device substantially as described herein.

The components of the display device 40 are schematically illustrated in FIG. 25B. The display device 40 includes a housing 41 and can include additional components at least partially enclosed therein. For example, the display device 40 includes a network interface 27 that includes an antenna 43 which is coupled to a transceiver 47. The network interface 27 may be a source for image data that could be displayed on the display device 40. Accordingly, the network interface 27 is one example of an image source module. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. In some implementations, a power supply 50 can provide power to substantially all components in the particular display device 40 design.

In this example, the display device 40 also includes a combined sensor controller 77. The combined sensor controller 77 may be configured for communication with the combined sensor device 900 and/or configured for controlling the combined sensor device 900. The combined sensor controller 77 may be configured to determine a touch location of a finger, a conductive or non-conductive stylus, etc., proximate the combined sensor device 900. The combined sensor controller 77 may be configured to make such determinations based, at least in part, on detected changes in capacitance in the vicinity of the touch location. The combined sensor controller 77 also may be configured to function as a handwriting sensor controller and/or as a fingerprint sensor controller. The combined sensor controller 77 may be configured to supply touch sensor, handwriting sensor, fingerprint sensor and/or user input signals to the processor 21.

Although the combined sensor controller 77 is depicted in FIG. 25B as being a single device, the combined sensor controller 77 may be implemented in one or more devices. In some implementations, separate sensor controllers may be configured to provide touch, handwriting and fingerprint sensing functionality. Such sensor controllers may, for example, be implemented in separate integrated circuits. In some such implementations, the addressing and/or measurement circuitry for touch mode, handwriting mode and/or fingerprint sensing mode may be contained within one or more controller or driver ASIC chips. In some alternative implementations, however, the processor 21 (or another such device) may be configured to provide some or all such sensor controller functionality.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (such as an IMOD controller). Additionally, the array driver 22 can be a conventional driver or a bi-stable display driver (such as an IMOD display driver). Moreover, the display array 30 can be a conventional display array or a bi-stable display array (such as a display including an array of IMODs). In some implementations, the driver controller 29 can be integrated with the array driver 22. Such an implementation can be useful in highly integrated systems, for example, mobile phones, portable-electronic devices, watches or other small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 may include a rechargeable battery, such as a nickel-cadmium battery or a lithium-ion battery. In implementations using a rechargeable battery, the rechargeable battery may be chargeable using power coming from, for example, a wall socket of a photovoltaic device or array. Alternatively, the rechargeable battery can be wirelessly chargeable. The power supply 50 also can include a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations. The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other possibilities or implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of an IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus, comprising:
a substantially transparent substrate;
a handwriting and touch sensor formed in a first zone of the substantially transparent substrate, the handwriting and touch sensor including a first plurality of substantially transparent electrodes;
a fingerprint sensor formed in a second zone of the substantially transparent substrate, the fingerprint sensor including a second plurality of substantially transparent electrodes; and
a control system configured for communication with the first plurality of substantially transparent electrodes and the second plurality of substantially transparent electrodes, the control system being further configured for controlling the apparatus to function as the touch sensor, the handwriting sensor, and the fingerprint sensor, wherein the control system is configured to control the apparatus to function as the touch sensor according to changes in capacitance received via the first plurality of substantially transparent electrodes, wherein the control system is configured to control the apparatus to function as the fingerprint sensor according to changes in resistance received via the second plurality of substantially transparent electrodes and wherein at least part of the control system is configured to be switchable from a touch mode configuration to a handwriting mode configuration.

2. The apparatus of claim 1, wherein the control system is configured to reduce power consumption by employing first level screening at a reduced frame rate on the touch sensor before activating the fingerprint sensor.

3. The apparatus of claim 1, wherein the control system is further configured to:
determine when the fingerprint sensor is not in use; and
deactivate the fingerprint sensor when the fingerprint sensor is not in use.

4. The apparatus of claim 1, wherein the control system is configured to control the apparatus to function as a handwriting sensor according to changes in parallel plate capacitance received via the first plurality of substantially transparent electrodes.

5. The apparatus of claim 1, wherein the control system is configured to control the apparatus to function as a handwriting sensor according to an indication, received via the first plurality of substantially transparent electrodes, that a switch is open or closed.

6. The apparatus of claim 1, wherein the second plurality of substantially transparent electrodes has a smaller pitch than the first plurality of substantially transparent electrodes.

7. The apparatus of claim 1, wherein the control system is configured to activate or deactivate fingerprint sensor functionality according to one or more fingerprint sensor indicia.

8. The apparatus of claim 1, wherein the control system is further configured to activate or deactivate handwriting sensor functionality according to one or more handwriting sensor indicia.

9. The apparatus of claim 1, wherein the control system is further configured to reduce power consumption by aggregating rows or columns of the first plurality of substantially transparent electrodes or of the second plurality of substantially transparent electrodes.

10. The apparatus of claim 1, wherein the control system includes an operational amplifier circuit.

11. The apparatus of claim 10, wherein the operational amplifier circuit is configured to be switchable from an integrator configuration to a charge amplifier configuration.

12. The apparatus of claim 1, further comprising:
a display;
a processor that is configured to communicate with the display and with the control system, the processor being configured to process image data; and
a memory device that is configured to communicate with the processor.

13. The apparatus of claim 12, further comprising:
a driver circuit configured to send at least one signal to the display; and
a controller configured to send at least a portion of the image data to the driver circuit.

14. The apparatus of claim 12, further comprising:
an image source module configured to send the image data to the processor, wherein the image source module includes at least one of a receiver, a transceiver, and a transmitter.

15. The apparatus of claim 12, further comprising:
an input device configured to receive input data and to communicate the input data to the processor.

16. An apparatus, comprising:
a substantially transparent substrate;
a handwriting and touch sensor formed in a first zone of the substantially transparent substrate, the handwriting and touch sensor including a first plurality of substantially transparent electrodes;
a fingerprint sensor formed in a second zone of the substantially transparent substrate, the fingerprint sensor including a second plurality of substantially transparent electrodes; and
a control system configured for communication with the first plurality of substantially transparent electrodes and the second plurality of substantially transparent electrodes, the control system being further configured for controlling the apparatus to function as the touch sensor, the handwriting sensor, and the fingerprint sensor, wherein the control system is configured to control the apparatus to function as the handwriting sensor according to first indications of changes in parallel plate capacitance or according to second indications of the opening or closure of a switch, the first and second indications being received via the first plurality of substantially transparent electrodes and wherein:
the control system is configured to be switchable between functioning in a first state and functioning in a second state;
the control system is configured to control the apparatus to function as a touch sensor by processing the first indications when functioning in the first state; and
the control system is configured to control the apparatus to function as a handwriting sensor by processing the second indications when functioning in the second state.

17. The apparatus of claim 16, wherein the control system is further configured to:
receive one or more fingerprint sensor indicia; and
determine whether to activate or deactivate fingerprint sensor functionality according to the fingerprint sensor indicia.

18. The apparatus of claim 16, wherein the control system is further configured to:
receive one or more handwriting sensor indicia; and
determine whether to activate or deactivate handwriting sensor functionality according to the handwriting sensor indicia.

19. The apparatus of claim 16, wherein the control system is further configured to reduce power consumption by aggregating rows or columns of the first plurality of substantially transparent electrodes.

20. An apparatus, comprising:
a substantially transparent substrate;
a handwriting and touch sensor formed in a first zone of the substantially transparent substrate, the handwriting and touch sensor including first substantially transparent electrodes;
a fingerprint sensor formed in a second zone of the substantially transparent substrate, the fingerprint sensor including second substantially transparent electrodes; and
control means for:
communicating with the first and second electrodes; and
controlling the apparatus to function as the touch sensor, the handwriting sensor, and the fingerprint sensor, wherein:
the control means includes means for controlling the apparatus to function as the touch sensor according to changes in capacitance received via the first electrodes;
the control means includes means for controlling the apparatus to function as the fingerprint sensor according to changes in resistance received via the second electrodes; and
at least part of the control means is configured to be switchable from a touch mode configuration to a handwriting mode configuration.

21. The apparatus of claim 20, wherein the control means further includes means for:
receiving one or more fingerprint sensor indicia; and
determining whether to activate or deactivate fingerprint sensor functionality according to the fingerprint sensor indicia.

22. The apparatus of claim 20, wherein the control means further includes means for:
receiving one or more handwriting sensor indicia; and
determining whether to activate or deactivate handwriting sensor functionality according to the handwriting sensor indicia.

23. The apparatus of claim 20, wherein the control means further includes means for aggregating rows or columns of the first plurality of substantially transparent electrodes.

24. An apparatus, comprising:
a substantially transparent substrate;
a handwriting and touch sensor formed in a first zone of the substantially transparent substrate, the handwriting and touch sensor including first substantially transparent electrodes;
a fingerprint sensor formed in a second zone of the substantially transparent substrate, the fingerprint sensor including second substantially transparent electrodes; and
control means for communication with the first and second electrodes and for controlling the apparatus to function as the touch sensor, the handwriting sensor, and the fingerprint sensor, wherein the control means includes means for controlling the apparatus to function as the handwriting sensor according to first indications of changes in parallel plate capacitance or according to second indications of the opening or closure of a switch, the first and second indications being received via the first electrodes wherein:
the control means is configured to be switchable between functioning in a first state and functioning in a second state;
the control means is configured to control the apparatus to function as a touch sensor by processing the first indications when functioning in the first state; and the control means is configured to control the apparatus to function as a handwriting sensor by processing the second indications when functioning in the second state.

25. The apparatus of claim 24, wherein the control means is further configured to:
receive one or more fingerprint sensor indicia; and
determine whether to activate or deactivate fingerprint sensor functionality according to the fingerprint sensor indicia.

26. The apparatus of claim 24, wherein the control means is further configured to:
receive one or more handwriting sensor indicia; and
determine whether to activate or deactivate handwriting sensor functionality according to the handwriting sensor indicia.

* * * * *